United States Patent
Scheidt et al.

(10) Patent No.: US 12,440,476 B2
(45) Date of Patent: Oct. 14, 2025

(54) AGENTS THAT TARGET TELOMERASE REVERSE TRANSCRIPTASE (TERT) FOR TREATING CANCER AND SENSITIZING CANCER CELLS TO GENOTOXIC THERAPY

(71) Applicants: Northwestern University, Evanston, IL (US); The University of Chicago, Chicago, IL (US)

(72) Inventors: Karl A. Scheidt, Evanston, IL (US); Stephen J. Kron, Chicago, IL (US); Yue Liu, Chicago, IL (US)

(73) Assignees: Northwestern University, Evanston, IL (US); The University of Chicago, Chicago, IL (US)

( * ) Notice: Subject to any disclaimer, the term of this patent is extended or adjusted under 35 U.S.C. 154(b) by 0 days.

(21) Appl. No.: 18/778,617

(22) Filed: Jul. 19, 2024

(65) Prior Publication Data

US 2024/0374574 A1 Nov. 14, 2024

Related U.S. Application Data

(63) Continuation of application No. PCT/US2023/060942, filed on Jan. 19, 2023.

(60) Provisional application No. 63/301,036, filed on Jan. 19, 2022.

(51) Int. Cl.
| | | |
|---|---|---|
| A61K 31/4192 | (2006.01) | |
| A61K 45/06 | (2006.01) | |
| A61P 37/06 | (2006.01) | |

(52) U.S. Cl.
CPC .......... *A61K 31/4192* (2013.01); *A61K 45/06* (2013.01); *A61P 37/06* (2018.01)

(58) Field of Classification Search
CPC .................................................. A61K 31/4192
See application file for complete search history.

(56) References Cited

U.S. PATENT DOCUMENTS

| | | | |
|---|---|---|---|
| 6,166,178 A | 12/2000 | Cech et al. | |
| 10,196,641 B2 | 2/2019 | Gryaznov et al. | |
| 10,774,071 B2 | 9/2020 | Aktoudianakis et al. | |
| 11,279,720 B2 | 3/2022 | Gryaznov et al. | |
| 11,518,750 B2 * | 12/2022 | Scheidt | A61K 31/351 |
| 2009/0203636 A1 | 8/2009 | Bondarev | |
| 2016/0030536 A1 | 2/2016 | Weiner et al. | |
| 2017/0101464 A1 | 4/2017 | Saha et al. | |
| 2021/0070725 A1 | 3/2021 | Scheidt et al. | |
| 2021/0269807 A1 | 9/2021 | Wang et al. | |
| 2022/0168333 A1 | 6/2022 | Huang et al. | |

FOREIGN PATENT DOCUMENTS

| | | |
|---|---|---|
| ES | 2696828 T3 | 1/2019 |
| WO | 2010064705 A1 | 6/2010 |
| WO | 2020252195 A1 | 12/2020 |

OTHER PUBLICATIONS

Betori et al., "Targeted Covalent Inhibition of Telomerase", ACS Chemical Biology, vol. 15, No. 3, pp. 706-717 (2020).*
Oweida, Ayman, et al. "Ionizing radiation sensitizes tumors to PD-L1 immune checkpoint blockade in orthotopic murine head and neck squamous cell carcinoma." Oncoimmunology 6.10 (2017): e1356153.
Pannunzio NR, Watanabe G, and Lieber MR. Nonhomologous DNA endjoining for repair of DNA double-strand breaks. J Biol Chem. 2018;293(27):10512-23.
Patel, P.L., Suram, A., Mirani, N., Bischof, O., and Herbig, U. (2016). Derepression of hTERT gene expression promotes escape from oncogene-induced cellular senescence. Proc Natl Acad Sci U S A 113, E5024-5033.
Patsoukis, N., Wang, Q., Strauss, L., and Boussiotis, V.A. (2020). Revisiting the PD-1 pathway. Sci Adv 6.
Pauken, K.E., Torchia, J.A., Chaudhri, A., Sharpe, A.H., and Freeman, G.J. (2021). Emerging concepts in PD-1 checkpoint biology. Semin Immunol, 101480.
Pérez, M. d. R.; Dubner, D.; Michelin, S.; Leteurtre, F.; Carosella, E. D.; Gisone, P. A., Radiation-induced up-regulation of telomerase in KG1a cells is influenced by dose-rate and radiation quality. International Journal of Radiation Biology 2002, 78 (12), 1175-1183.
Pestana, A., Vinagre, J., Sobrinho-Simões, M., and Soares, P. (2017). TERT biology and function in cancer: beyond immortalisation. J Mol Endocrinol 58, R129-r146.
Peters, S., Felip, E., Dafni, U., Belka, C., Guckenberger, M., Irigoyen, A., Nadal, E., Becker, A., Vees, H., Pless, M., et al. (2019). Safety evaluation of nivolumab added concurrently to radiotherapy in a standard first line chemo-radiotherapy regimen in stage III non-small cell lung cancer-The ETOP NICOLAS trial. Lung Cancer 133, 83-87.
Pirzio LM, Freulet-Marriere MA, Bai Y, Fouladi B, Murnane JP, Sabatier L, and Desmaze C. Human fibroblasts expressing hTERT show remarkable karyotype stability even after exposure to ionizing radiation. Cytogenet Genome Res. 2004; 104(1-4):87-94.
Poynter, K. R.; Sachs, P. C.; Bright, A. T.; Breed, M. S.; Nguyen, B. N.; Elmore, L. W.; Holt, S. E., Genetic inhibition of telomerase results in sensitization and recovery of breast tumor cells. Mol Cancer Ther 2009, 8 (5), 1319-27.
Pubchem, Bethesda (MD): National Library of Medicine (US), National Center for Biotechnolgoy Information; 2024, PubChem Compound Summary for CID 82277832, 3-methylideneoxan-4-one, Oct. 20, 2014.
Ram, R.; Uziel, O.; Eldan, O.; Fenig, E.; Beery, E.; Lichtenberg, S.; Nordenberg, Y.; Lahav, M., Ionizing Radiation Up-regulates Telomerase Activity in Cancer Cell Lines by Post-translational Mechanism via Ras/Phosphatidylinositol 3-Kinase/Akt Pathway. Clinical Cancer Research 2009, 15 (3), 914-923.

(Continued)

*Primary Examiner* — Kevin E Weddington
(74) *Attorney, Agent, or Firm* — Quarles & Brady LLP

(57) ABSTRACT

Disclosed herein are agents that target telomerase reverse transcriptase (TERT) for treating cancer and sensitizing cancer cells to genotoxic therapy. The methods include inhibiting induction of an immunosuppressive factor in a subject in need thereof, the method comprising administering an inhibitor of TERT to the subject.

9 Claims, 26 Drawing Sheets

(56) References Cited

OTHER PUBLICATIONS

Reyes-Uribe P, Adrianzen-Ruesta MP, Deng Z, Echevarria-Vargas I, Mender I, Saheb S, Liu Q, Altieri DC, Murphy ME, Shay JW, Lieberman PM, and Villanueva J. Exploiting TERT dependency as a therapeutic strategy for NRAS-mutant melanoma. Oncogene. 2018;37(30):4058-72.
Ribas, A. (2015). Adaptive Immune Resistance: How Cancer Protects from Immune Attack. Cancer Discov 5, 915-919.
Roake CM, and Artandi SE. Regulation of human telomerase in homeostasis and disease. Nat Rev Mol Cell Biol. 2020;21(7):384-97.
Rodríguez-Ruiz, M.E., Vanpouille-Box, C., Melero, I., Formenti, S.C., and Demaria, S. (2018). Immunological Mechanisms Responsible for Radiation-Induced Abscopal Effect. Trends Immunol 39, 644-655.
Ruden, M., and Puri, N. (2013). Novel anticancer therapeutics targeting telomerase. Cancer Treat Rev 39, 444-456.
Sallmyr, A., and Tomkinson, A.E. (2018). Repair of DNA double-strand breaks by mammalian alternative end-joining pathways. J Biol Chem 293, 10536-10546.
Santos, J.H., Meyer, J.N., Skorvaga, M., Annab, L.A., and Van Houten, B. (2004). Mitochondrial hTERT exacerbates free-radical-mediated mtDNA damage. Aging Cell 3, 399-411.
Sauerwald, A., Sandin, S., Cristofari, G., Scheres, S.H., Lingner, J., and Rhodes, D. (2013). Structure of active dimeric human telomerase. Nat Struct Mol Biol 20, 454-460.
Schmidt, J.C., and Cech, T.R. (2015). Human telomerase: biogenesis, trafficking, recruitment, and activation. Genes & development 29, 1095-1105.
Segal-Bendirdjian E, and Geli V. Non-canonical Roles of Telomerase: Unraveling the Imbroglio. Front Cell Dev Biol. 2019;7:332.
Sharma, G. G.; Gupta, A.; Wang, H.; Scherthan, H.; Dhar, S.; Gandhi, V.; Iliakis, G.; Shay, J. W.; Young, C. S. H.; Pandita, T. K., hTERT associates with human telomeres and enhances genomic stability and DNA repair. Oncogene 2003, 22 (1), 131-146.
Sharma, N.K., Reyes, A., Green, P., Caron, M.J., Bonini, M.G., Gordon, D.M., Holt, I.J., and Santos, J.H. (2012). Human telomerase acts as a hTR-independent reverse transcriptase in mitochondria. Nucleic acids research 40, 712-725.
Shay JW. Role of telomeres and telomerase in aging and cancer. Cancer discovery. 2016;6(6):584-93.
Shay, J.W., and Wright, W.E. (2011). Role of telomeres and telomerase in cancer. Paper presented at: Seminars in cancer biology (Elsevier).
Singhapol C, Pal D, Czapiewski R, Porika M, Nelson G, and Saretzki GC. Mitochondrial telomerase protects cancer cells from nuclear DNA damage and apoptosis. PLoS One. 2013;8(1):e52989.
Sishc, B. J.; Nelson, C. B.; McKenna, M. J.; Battaglia, C. L. R.; Herndon, A.; Idate, R.; Liber, H. L.; Bailey, S. M., Telomeres and Telomerase in the Radiation Response: Implications for Instability, Reprograming, and Carcinogenesis. Frontiers in Oncology 2015, 5 (257).
Smith-Sonneborn, J. (2019). Telomerase Biology Associations offer Keys to Cancer and Aging Therapeutics. Curr Aging Sci.
Spiotto, M., Fu, Y.X., and Weichselbaum, R.R. (2016). The intersection of radiotherapy and immunotherapy: mechanisms and clinical implications. Sci Immunol 1.
Spranger, S., Spaapen, R.M., Zha, Y., Williams, J., Meng, Y., Ha, T.T., and Gajewski, T.F. (2013). Up-regulation of PD-L1, Ido, and T(regs) in the melanoma tumor microenvironment is driven by CD8(+) T cells. Sci Transl Med 5, 200ra116.
Stewart, S.A., Hahn, W.C., O'Connor, B.F., Banner, E.N., Lundberg, A.S., Modha, P., Mizuno, H., Brooks, M.W., Fleming, M., Zimonjic, D.B., et al. (2002). Telomerase contributes to tumorigenesis by a telomere length-independent mechanism. P Natl Acad Sci USA 99, 12606-12611.
STN/Chemical Abstracts registry No. RN1937361-27-7, Jun. 23, 2016.
Strahl, C.; Blackburn, E. H., Effects of reverse transcriptase inhibitors on telomere length and telomerase activity in two immortalized human cell lines. Mol Cell Biol 1996, 16 (1), 53-65.
Su, C.; Luo, Y.; Yang, Y.; Yi, Y., ShRNA-mediated silencing of hTERT promote apoptosis and senescence in human ovarian cancer cells. Translational Cancer Research 2019, 8 (2), 567-573.
Tamakawa, R. A.; Fleisig, H. B .; Wong, J. M. Y., Telomerase Inhibition Potentiates the Effects of Genotoxic Agents in Breast and Colorectal Cancer Cells in a Cell Cycle-Specific Manner. Cancer Research 2010, 70 (21), 8684-8694.
Taube, J.M., Anders, R.A., Young, G.D., Xu, H., Sharma, R., McMiller, T.L., Chen, S., Klein, A.P., Pardoll, D.M., Topalian, S.L., et al. (2012). Colocalization of inflammatory response with B7-h1 expression in human melanocytic lesions supports an adaptive resistance mechanism of immune escape. Sci Transl Med 4, 127ra137.
Theelen, W., Peulen, H.M.U., Lalezari, F., van der Noort, V., de Vries, J.F., Aerts, J., Dumoulin, D.W., Bahce, I., Niemeijer, A.N., de Langen, A.J., et al. (2019). Effect of Pembrolizumab After Stereotactic Body Radiotherapy vs Pembrolizumab Alone on Tumor Response in Patients With Advanced Non-Small Cell Lung Cancer: Results of the PEMBRO-RT Phase 2 Randomized Clinical Trial. JAMA Oncol 5, 1276-1282.
Thompson CAH, and Wong JMY. Non-canonical Functions of Telomerase Reverse Transcriptase: Emerging Roles and Biological Relevance. Curr Top Med Chem. 2020;20(6):498-507.
Thompson, C. A. H.; Gu, A.; Yang, S. Y.; Mathew, V.; Fleisig, H. B.; Wong, J. M. Y., Transient Telomerase Inhibition with Imetelstat Impacts DNA Damage Signals and Cell-Cycle Kinetics. Molecular Cancer Research 2018, 16 (8), 1215-1225.
Twomey, J.D., and Zhang, B. (2021). Cancer Immunotherapy Update: FDA-Approved Checkpoint Inhibitors and Companion Diagnostics. Aaps j 23, 39.
Twyman-Saint Victor, C., Rech, A.J., Maity, A., Rengan, R., Pauken, K.E., Stelekati, E., Benci, J.L., Xu, B., Dada, H., Odorizzi, P.M., et al. (2015). Radiation and dual checkpoint blockade activate nonredundant immune mechanisms in cancer. Nature 520, 373-377.
Ueno, T., Takahashi, H., Oda, M., Mizunuma, M., Yokoyama, A., Goto, Y., Mizushina, Y., Sakaguchi, K., and Hayashi, H. (2000). Inhibition of human telomerase by rubromycins: implication of spiroketal system of the compounds as an active moiety. Biochemistry 39, 5995-6002.
Uziel, O., Beery, E., Dronichev, V., Samocha, K., Gryaznov, S., Weiss, L., Slavin, S., Kushnir, M., Nordenberg, Y., Rabinowitz, C., et al. (2010). Telomere shortening sensitizes cancer cells to selected cytotoxic agents: in vitro and in vivo studies and putative mechanisms. PLoS One 5, e9132.
Vaziri, H., and Benchimol, S. (1998). Reconstitution of telomerase activity in normal human cells leads to elongation of telomeres and extended replicative life span. Current biology : CB 8, 279-282.
Vinay DS, Ryan EP, Pawelec G, Talib WH, Stagg J, Elkord E, Lichtor T, Decker WK, Whelan RL, Kumara HMCS, Signori E, Honoki K, Georgakilas AG, Amin A, Helferich WG, Boosani CS, Guha G, Ciriolo MR, Chen S, Mohammed SI, Azmi AS, Keith WN, Bilsland A, Bhakta D, Halicka D, Fujii H, Aquilano K, Ashraf SS, Nowsheen S, Yang X, Choi BK, Kwon BS. Immune evasion in cancer: Mechanistic basis and therapeutic strategies. Semin Cancer Biol. Dec. 2015;35 Suppl:S185-S198. doi: 10.1016/j.semcancer. 2015.03.004. Epub Mar. 25, 2015. PMID: 25818339.
Wang K, Wang RL, Liu JJ, Zhou J, Li X, Hu WW, Jiang WJ, and Hao NB. The prognostic significance of hTERT overexpression in cancers: A systematic review and meta-analysis. Medicine (Baltimore). 2018;97(35):e11794.
Wang Y, Sun C, Mao A, Zhang X, Zhou X, Wang Z, and Zhang H. Radiosensitization to X-ray radiation by telomerase inhibitor MST-312 in human hepatoma HepG2 cells. Life Sci. 2015;123:43-50.
Ward, R. A., et al. (2013) Structure- and Reactivity-Based Development of Covalent Inhibitors of the Activating and Gatekeeper Mutant Forms of the Epidermal Growth Factor Receptor (EGFR), J. Med. Chem. 56, 7025-7048.
Ward, R. J.; Autexier, C., Pharmacological telomerase inhibition can sensitize drug-resistant and drug-sensitive cells to chemotherapeutic treatment. Mol Pharmacol 2005, 68 (3), 779-86.

(56) References Cited

OTHER PUBLICATIONS

Ghanim, G. E.; Fountain, A. J.; van Roon, A.-M.M.; Rangan, R.; Das, R.; Collins, K.; Nguyen, T. H. D., Structure of human telomerase holoenzyme with bound telomeric DNA. Nature 2021, 593 (7859), 449-453.
Ghosh A, Saginc G, Leow SC, Khattar E, Shin EM, Yan TD, Wong M, Zhang Z, Li G, Sung WK, Zhou J, Chng WJ, Li S, Liu E, and Tergaonkar V. Telomerase directly regulates NF-kappaB-dependent transcription. Nat Cell Biol. 2012; 14(12):1270-81.
Golden, E.B., Marciscano, A.E., and Formenti, S.C. (2020). Radiation Therapy and the In Situ Vaccination Approach. Int J Radiat Oncol Biol Phys 108, 891-898.
Gomez, D.L., Armando, R.G., Cerrudo, C.S., Ghiringhelli, P.D., and Gomez, D.E. (2016). Telomerase as a Cancer Target. Development of New Molecules. Curr Top Med Chem 16, 2432-2440.
Goytisolo FA, Samper E, Martin-Caballero J, Finnon P, Herrera E, Flores JM, Bouffler SD, and Blasco MA. Short telomeres result in organismal hypersensitivity to ionizing radiation in mammals. J Exp Med. 2000;192(11):1625-36.
Greider, C. W.; Blackburn, E. H., Identification of a specific telomere terminal transferase activity in tetrahymena extracts. Cell 1985, 43 (2, Part 1), 405-413.
Gupta, A., Probst, H.C., Vuong, V., Landshammer, A., Muth, S., Yagita, H., Schwendener, R., Pruschy, M., Knuth, A., and van den Broek, M. (2012). Radiotherapy promotes tumor-specific effector CD8+ T cells via dendritic cell activation. J Immunol 189, 558-566.
Gupta, R., Dong, Y., Solomon, P.D., Wettersten, H.I., Cheng, C.J., Min, J.N., Henson, J., Dogra, S.K., Hwang, S.H., Hammock, B.D., et al. (2014). Synergistic tumor suppression by combined inhibition of telomerase and CDKN1A. Proc Natl Acad Sci U S A 111, E3062-3071.
Gurung, R. L.; Lim, S. N.; Low, G. K. M.; Hande, M. P., MST-312 Alters Telomere Dynamics, Gene Expression Profiles and Growth in Human Breast Cancer Cells. Lifestyle Genomics 2014, 7 (4-6), 283-298.
Guterres AN, and Villanueva J. Targeting telomerase for cancer therapy. Oncogene. 2020;39(36):5811-24.
Hahn, W. C. et al. Inhibition of telomerase limits the growth of human cancer cells. Nat. Med. 5, 1164-1170 (1999).
Hannen, R.; Bartsch, J. W., Essential roles of telomerase reverse transcriptase hTERT in cancer stemness and metastasis. FEBS Letters 2018, 592 (12), 2023-2031ogy and Physiology 2020, 47 (3), 357-364.
Honeychurch, J., and Illidge, T.M. (2017). The influence of radiation in the context of developing combination immunotherapies in cancer. Ther Adv Vaccines Immunother 5, 115-122.
International Search Report and Written Opinion for International Patent Application No. PCT/US2023/060942, dated Apr. 14, 2023.
Jafri, M. A.; Ansari, S. A.; Alqahtani, M. H.; Shay, J. W., Roles of telomeres and telomerase in cancer, and advances in telomerase-targeted therapies. Genome Medicine 2016, 8 (1), 69.
Khattar E, Kumar P, Liu CY, Aknclar SC, Raju A, Lakshmanan M, Maury JJ, Qiang Y, Li S, Tan EY, Hui KM, Shi M, Loh YH, and Tergaonkar V. Telomerase reverse transcriptase promotes cancer cell proliferation by augmenting tRNA expression. J Clin Invest. 2016;126(10):4045-60.
Kitazawa, Y., Fujino, M., Wang, Q., Kimura, H., Azuma, M., Kubo, M., Abe, R., and Li, X.K. (2007). Involvement of the programmed death-1/programmed death-1 ligand pathway in CD4+CD25+ regulatory T-cell activity to suppress alloimmune responses. Transplantation 83, 774-782.
Kondo Y, Kondo S, Tanaka Y, Haqqi T, Barna BP, and Cowell JK. Inhibition of telomerase increases the susceptibility of human malignant glioblastoma cells to cisplatin-induced apoptosis. Oncogene. 1998;16(17):2243-8.
Kovalenko, O.A., Caron, M.J., Ulema, P., Medrano, C., Thomas, A.P., Kimura, M., Bonini, M.G., Herbig, U., and Santos, J.H. (2010). A mutant telomerase defective in nuclear-cytoplasmic shuttling fails to immortalize cells and is associated with mitochondrial dysfunction. Aging cell 9, 203-219.

Kumar, N., and Sethi, G. (2023). Telomerase and hallmarks of cancer: An intricate interplay governing cancer cell evolution. Cancer Lett 578, 216459.
Lamy E, Goetz V, Erlacher M, Herz C, and Mersch-Sundermann V. hTERT: another brick in the wall of cancer cells. Mutat Res. 2013;752(2):119-28.
Li, A., Barsoumian, H.B., Schoenhals, J.E., Caetano, M.S., Wang, X., Menon, H., Valdecanas, D.R., Niknam, S., Younes, A.I., Cortez, M.A., et al. (2019). IDO1 Inhibition Overcomes Radiation-Induced "Rebound Immune Suppression" by Reducing Nos. of IDO1-Expressing Myeloid-Derived Suppressor Cells in the Tumor Microenvironment. Int J Radiat Oncol Biol Phys 104, 903-912.
Li, S., Rosenberg, J.E., Donjacour, A.A., Botchkina, I.L., Hom, Y.K., Cunha, G.R., and Blackburn, E.H. (2004). Rapid inhibition of cancer cell growth induced by lentiviral delivery and expression of mutant-template telomerase RNA and anti-telomerase short-interfering RNA. Cancer research 64, 4833-4840.
Lim, C.J., and Cech, T.R. (2021). Shaping human telomeres: from shelterin and CST complexes to telomeric chromatin organization. Nat Rev Mol Cell Biol 22, 283-298.
Lim, J.Y., Gerber, S.A., Murphy, S.P., and Lord, E.M. (2014). Type I interferons induced by radiation therapy mediate recruitment and effector function of CD8(+) T cells. Cancer Immunol Immunother 63, 259-271.
Lipinska, N.; Romaniuk, A.; Paszel-Jaworska, A.; Toton, E.; Kopczynski, P.; Rubis, B., Telomerase and drug resistance in cancer. Cell Mol Life Sci 2017, 74 (22), 4121-4132.
Liu N, Ding D, Hao W, Yang F, Wu X, Wang M, Xu X, Ju Z, Liu JP, Song Z, Shay JW, Guo Y, and Cong YS. hTERT promotes tumor angiogenesis by activating VEGF via interactions with the Sp1 transcription factor. Nucleic Acids Res. 2016;44(18):8693-703.
Liu, Ning, et al. "Role of telomerase in the tumour microenvironment." Clinical and Experimental Pharmacology and Physiology 47.3 (2020): 357-364.
Wu, L.; Fidan, K.; Um, J.-Y.; Ahn, K. S., Telomerase: Key regulator of inflammation and cancer. Pharmacological Research 2020, 155, 104726.
Liu, R.; Liu, J.; Wang, S.; Wang, Y.; Zhang, T.; Iiu, Y.; Geng, X .; Wang, F., Combined treatment with emodin and a telomerase inhibitor induces significant telomere damage/dysfunction and cell death. Cell Death & Disease 2019, 10 (7), 527.
Liu, Y., Betori, R.C., Pagacz, J., Frost, G.B., Efimova, E.V., Wu, D., Wolfgeher, D.J., Bryan, T.M., Cohen, S.B., Scheidt, K.A., et al. (2022). Targeting telomerase reverse transcriptase with the covalent inhibitor NU-1 confers immunogenic radiation sensitization. Cell Chem Biol 29, 1517-1531.e1517.
Low KC, and Tergaonkar V. Telomerase: central regulator of all of the hallmarks of cancer. Trends in biochemical sciences. 2013;38(9):426-34.
Lu C, Fu W, and Mattson MP. Telomerase protects developing neurons against DNA damage-induced cell death. Brain Res Dev Brain Res. 2001; 131(1-2):167-71.
Maciejowski, J., and de Lange, T. (2017). Telomeres in cancer: tumour suppression and genome instability. Nat Rev Mol Cell Biol 18, 175-186. 10.1038/nrm.2016.171.
Maida, Y., and Masutomi, K. (2011). RNA-dependent RNA polymerases in RNA silencing. Biol Chem 392, 299-304.
Maida, Y., Yasukawa, M., Furuuchi, M., Lassmann, T., Possemato, R., Okamoto, N., Kasim, V., Hayashizaki, Y., Hahn, W.C., and Masutomi, K. (2009). An RNA-dependent RNA polymerase formed by TERT and the Rmrp Rna. Nature 461, 230-U104.
Martínez, P., and Blasco, M.A. (2011). Telomeric and extra-telomeric roles for telomerase and the telomere-binding proteins. Nature Reviews Cancer 11, 161.
Martínez, P.; Blasco, M. A., Replicating through telomeres: a means to an end. Trends Biochem Sci 2015, 40 (9), 504-15.
Marusic, L., Anton, M., Tidy, A., Wang, P., Villeponteau, B., and Bacchetti, S. (1997). Reprogramming of telomerase by expression of mutant telomerase RNA template in human cells leads to altered telomeres that correlate with reduced cell viability. Mol Cell Biol 17, 6394-6401.
Massard, C., Zermati, Y., Pauleau, A.L., Larochette, N., Metivier, D., Sabatier, L., Kroemer, G., and Soria, J.C. (2006). hTERT: a

(56) References Cited

OTHER PUBLICATIONS novel endogenous inhibitor of the mitochondrial cell death pathway. Oncogene 25, 4505-4514. 10.1038/sj.onc.1209487.

Masutomi, K.; Possemato, R.; Wong, J. M. Y.; Currier, J. L.; Tothova, Z.; Manola, J. B.; Ganesan, S.; Lansdorp, P. M.; Collins, K.; Hahn, W. C., The telomerase reverse transcriptase regulates chromatin state and DNA damage responses. Proceedings of the National Academy of Sciences of the United States of America 2005, 102 (23), 8222-8227.

Matsumura, S., Wang, B., Kawashima, N., Braunstein, S., Badura, M., Cameron, T.O., Babb, U.S., Schneider, R.J., Formenti, S.C., Dustin, M.L., et al. (2008). Radiation-induced CXCL16 release by breast cancer cells attracts effector T cells. J Immunol 181, 3099-3107.

McLaughlin, M., Patin, E.C., Pedersen, M., Wilkins, A., Dillon, M.T., Melcher, A.A., and Harrington, K.J. (2020). Inflammatory microenvironment remodelling by tumour cells after radiotherapy. Nat Rev Cancer 20, 203-217.

Mender I, Zhang A, Ren Z, Han C, Deng Y, Siteni S, Li H, Zhu J, Vemula A, Shay JW, and Fu YX. Telomere Stress Potentiates STING-Dependent Anti-tumor Immunity. Cancer Cell. 2020;38(3):400-11.e6.

Meng, E.; Taylor, B.; Ray, A.; Shevde, L. A.; Rocconi, R. P., Targeted inhibition of telomerase activity combined with chemotherapy demonstrates synergy in eliminating ovarian cancer spheroid-forming cells. Gynecol Oncol 2012, 124 (3), 598-605.

Mueller, Sel. Org. React. Database (SORD) 2005, 20140701.

Naasani, I., et al. (1998) Telomerase inhibition, telomere shortening, and senescence of cancer cells by tea catechins, Biochem. Biophys. Res. Commun. 249, 391-396.

Neidle, S., Human telomeric G-quadruplex: The current status of telomeric G-quadruplexes as therapeutic targets in human cancer. FEBS Journal 2010, 277 (5), 1118-1125.

Nguyen, T.H.D., Tam, J., Wu, R.A., Greber, B.J., Toso, D., Nogales, E., and Collins, K. (2018). Cryo-EM structure of substrate-bound human telomerase holoenzyme. Nature 557, 190-195.

Nuta, O., Rothkamm, K., and Darroudi, F. (2020). The Role of Telomerase in Radiation-Induced Genomic Instability. Radiat Res.

Wettersten, H.I., Hee Hwang, S., Li, C., Shiu, E.Y., Wecksler, A.T., Hammock, B.D., and Weiss, R.H. (2013). A novel p21 attenuator which is structurally related to sorafenib. Cancer Biol Ther 14, 278-285.

Wong KK, Chang S, Weiler SR, Ganesan S, Chaudhuri J, Zhu C, Artandi SE, Rudolph KL, Gottlieb GJ, Chin L, Alt FW, and DePinho RA. Telomere dysfunction impairs DNA repair and enhances sensitivity to ionizing radiation. Nat Genet. 2000;26(1):85-8.

Wright, W.D., Shah, S.S., and Heyer, W.D. (2018). Homologous recombination and the repair of DNA double-strand breaks. J Biol Chem 293, 10524-10535.

Xi, L., and Cech, T.R. (2014). Inventory of telomerase components in human cells reveals multiple subpopulations of hTR and hTERT. Nucleic Acids Res 42, 8565-8577.

Xin Yu, J., Hodge, J.P., Oliva, C., Neftelinov, S.T., Hubbard-Lucey, V.M., and Tang, J. (2020). Trends in clinical development for PD-1/PD-L1 inhibitors. Nat Rev Drug Discov 19, 163-164.

Xu, T., Xu, Y., Liao, C.P., Lau, R., and Goldkorn, A. (2010). Reprogramming murine telomerase rapidly inhibits the growth of mouse cancer cells in vitro and in vivo. Molecular cancer therapeutics 9, 438-449.

Yang, X., Li, Z., Yang, L., Lei, H., Yu, H., Liao, Z., Zhou, F., Xie, C., and Zhou, Y. (2015). Knockdown of telomeric repeat binding factor 2 enhances tumor radiosensitivity regardless of telomerase status. J Cancer Res Clin Oncol 141, 1545-1552.

Yi M, Niu M, Xu L, Luo S, Wu K. Regulation of PD-L1 expression in the tumor microenvironment. J Hematol Oncol. Jan. 7, 2021;14(1):10. doi: 10.1186/s13045-020-01027-5. PMID: 33413496; PMCID: PMC7792099.

Yuan, X.; Larsson, C.; Xu, D., Mechanisms underlying the activation of TERT transcription and telomerase activity in human cancer: old actors and new players. Oncogene 2019, 38 (34), 6172-6183.

Yuan, X.; Xu, D., Telomerase Reverse Transcriptase (TERT) in Action: Cross-Talking with Epigenetics. Int J Mol Sci 2019, 20 (13).

Zeng J, See AP, Phallen J, Jackson CM, Belcaid Z, Ruzevick J, Durham N, Meyer C, Harris TJ, Albesiano E, Pradilla G, Ford E, Wong J, Hammers HJ, Mathios D, Tyler B, Brem H, Tran PT, Pardoll D, Drake CG, Lim M. Anti-PD-1 blockade and stereotactic radiation produce long-term survival in mice with intracranial gliomas. Int J Radiat Oncol Biol Phys. Jun. 1, 2013;86(2):343-9. doi: 10.1016/j.ijrobp.2012.12.025. Epub Feb. 22, 2013. PMID: 23462419; PMCID: PMC3963403.

Zhang, X., Mar, V., Zhou, W., Harrington, L., and Robinson, M.O. (1999). Telomere shortening and apoptosis in telomerase-inhibited human tumor cells. Genes Dev 13, 2388-2399.

Zhou, C., and Liu, S. (2022). Evaluation of the efficacy of MST-312, as a telomerase inhibitor, in the treatment of patients with multiple myeloma after stem cell transplantation. Cell Mol Biol (Noisy-le-grand) 67, 115-120.

Zou, Y., Cong, Y.S., and Zhou, J. (2020). Implications of telomerase reverse transcriptase in tumor metastasis. BMB Rep 53, 458-465.

Abdisalaam, S., Bhattacharya, S., Mukherjee, S., Sinha, D., Srinivasan, K., Zhu, M., Akbay, E.A., Sadek, H.A., Shay, J. W., and Asaithamby, A. (2020). Dysfunctional telomeres trigger cellular senescence mediated by cyclic GMP-AMP synthase. J Biol Chem 295, 11144-11160.

Akiyama M, Yamada O, Kanda N, Akita S, Kawano T, Ohno T, Mizoguchi H, Eto Y, Anderson KC, and Yamada H. Telomerase overexpression in K562 leukemia cells protects against apoptosis by serum deprivation and double-stranded DNA break inducing agents, but not against DNA synthesis inhibitors. Cancer Lett. 2002;178(2):187-97.

Arai, K., Masutomi, K., Khurts, S., Kaneko, S., Kobayashi, K., and Murakami, S. (2002). Two independent regions of human telomerase reverse transcriptase are important for its oligomerization and telomerase activity. J Biol Chem 277, 8538-8544.

Artandi, S.E., and DePinho, R.A. (2010). Telomeres and telomerase in cancer. Carcinogenesis 31, 9-18.

Bajaj S, Kumar MS, Peters GJ, and Mayur YC. Targeting telomerase for its advent in cancer therapeutics. Med Res Rev. 2020;40(5):1871-919.

Barcellos-Hoff, M. H., et al. "Transforming growth factor-beta activation in irradiated murine mammary gland." The Journal of clinical investigation 93.2 (1994):892-899.

Barczak, W.; Sobecka, A.; Golusinski, P.; Masternak, M. M.; Rubis, B.; Suchorska, W. M.; Golusinski, W., hTERT gene knockdown enhances response to radio- and chemotherapy in head and neck cancer cell lines through a DNA damage pathway modification. Sci Rep 2018, 8 (1), 5949.

Barker, H.E., Paget, J.T., Khan, A.A., and Harrington, K.J. (2015). The tumour microenvironment after radiotherapy: mechanisms of resistance and recurrence. Nat Rev Cancer 15, 409-425.

Begus-Nahrmann Y, Hartmann D, Kraus J, Eshraghi P, Scheffold A, Grieb M, Rasche V, Schirmacher P, Lee HW, Kestler HA, Lechel A, and Rudolph KL. Transient telomere dysfunction induces chromosomal instability and promotes carcinogenesis. J Clin Invest. 2012;122(6):2283-8.

Bellucci, R., Martin, A., Bommarito, D., Wang, K., Hansen, S.H., Freeman, G.J., and Ritz, J. (2015). Interferon-y-induced activation of JAK1 and JAK2 suppresses tumor cell susceptibility to NK cells through upregulation of PD-L1 expression. Oncoimmunology 4, e1008824.

Benci, J.L., Xu, B., Qiu, Y., Wu, T.J., Dada, H., Twyman-Saint Victor, C., Cucolo, L., Lee, D.S.M., Pauken, K.E., Huang, A.C., et al. (2016). Tumor Interferon Signaling Regulates a Multigenic Resistance Program to Immune Checkpoint Blockade. Cell 167, 1540-1554.e1512.

Berardinelli F, Coluzzi E, Sgura A, and Antoccia A. Targeting telomerase and telomeres to enhance ionizing radiation effects in in vitro and in vivo cancer models. Mutat Res Rev Mutat Res. 2017;773:204-19.

Betori, R. C.; Liu, Y.; Mishra, R. K.; Cohen, S. B.; Kron, S. J.; Scheidt, K. A., Targeted Covalent Inhibition of Telomerase, ChemRxiv. Preprint, posted on Jul. 2019.

(56) References Cited

OTHER PUBLICATIONS

Bodnar, A.G., Ouellette, M., Frolkis, M., Holt, S.E., Chiu, C.P., Morin, G.B., Harley, C.B., Shay, J.W., Lichtsteiner, S., and Wright, W.E. (1998). Extension of life-span by introduction of telomerase into normal human cells. Science 279, 349-352.

Breen, W.G., Leventakos, K., Dong, H., and Merrell, K.W. (2020). Radiation and immunotherapy: emerging mechanisms of synergy. J Thorac Dis 12, 7011-7023.

Bryan, C.; Rice, C.; Hoffman, H.; Harkisheimer, M.; Sweeney, M.; Skordalakes, E., Structural Basis of Telomerase Inhibition by the Highly Specific BIBR1532. Structure (London, England : 1993) 2015, 23 (10), 1934-1942.

Ceccaldi, R., Rondinelli, B., and D'Andrea, A.D. (2016). Repair Pathway Choices and Consequences at the Double-Strand Break. Trends in cell biology 26, 52-64.

Cha, Jong-Ho, et al. "Mechanisms controlling PD-L1 expression in cancer." Molecular cell 76.3 (2019): 359-370.

Chan, J., Dodani, S.C., and Chang, C.J. (2012). Reaction-based small-molecule fluorescent probes for chemoselective bioimaging. Nat Chem 4, 973-984.

Chang HHY, Pannunzio NR, Adachi N, and Lieber MR. Non-homologous DNA end joining and alternative pathways to double-strand break repair. Nat Rev Mol Cell Biol. 2017;18(8):495-506.

Chang, E., Pelosof, L., Lemery, S., Gong, Y., Goldberg, K.B., Farrell, A.T., Keegan, P., Veeraraghavan, J., Wei, G., Blumenthal, G.M., et al. (2021). Systematic Review of PD-1/PD-L1 Inhibitors in Oncology: From Personalized Medicine to Public Health. Oncologist 26, e1786-e1799.

Chen S, Crabill GA, Pritchard TS, McMiller TL, Wei P, Pardoll DM, Pan F, Topalian SL. Mechanisms regulating PD-L1 expression on tumor and immune cells. J Immunother Cancer. Nov. 15, 2019;7(1):305. doi: 10.1186/s40425-019-0770-2. PMID: 31730010; PMCID: PMC6858680.

Chen X, Tang WJ, Shi JB, Liu MM, and Liu XH. Therapeutic strategies for targeting telomerase in cancer. Med Res Rev. 2020;40(2):532-85.

Chen, B., Alvarado, D.M., Iticovici, M., Kau, N.S., Park, H., Parikh, P.J., Thotala, D., and Ciorba, M.A. (2020). Interferon-Induced IDO1 Mediates Radiation Resistance and Is a Therapeutic Target in Colorectal Cancer. Cancer Immunol Res 8, 451-464.

Chiodi, I., and Mondello, C. (2012). Telomere-independent functions of telomerase in nuclei, cytoplasm, and mitochondria. Front Oncol 2, 133.

Colebatch, A.J., Dobrovic, A., and Cooper, W.A. (2019). TERT gene: its function and dysregulation in cancer. J Clin Pathol 72, 281-284.

Cunningham, A. P.; Love, W. K.; Zhang, R. W.; Andrews, L. G.; Tollefsbol, T. O., Telomerase inhibition in cancer therapeutics: molecular-based approaches. Current medicinal chemistry 2006, 13 (24), 2875-2888.

Cytlak, U.M., Dyer, D.P., Honeychurch, J., Williams, K.J., Travis, M.A., and Illidge, T.M. (2022). Immunomodulation by radiotherapy in tumour control and normal tissue toxicity. Nat Rev Immunol 22, 124-138.

Damm, K., Hemmann, U., Garin-Chesa, P., Hauel, N., Kauffmann, I., Priepke, H., Niestroj, C., Daiber, C., Enenkel, B., Guilliard, B., et al. (2001). A highly selective telomerase inhibitor limiting human cancer cell proliferation. Embo j 20, 6958-6968.

De Cian, A.; Cristofari, G.; Reichenbach, P.; De Lemos, E.; Monchaud, D.; Teulade-Fichou, M. P.; Shin-Ya, K.; Lacroix, L.; Lingner, J.; Mergny, J. L., Reevaluation of telomerase inhibition by quadruplex ligands and their mechanisms of action. Proc. Natl. Acad. Sci. U S A 2007, 104 (44), 17347-17352.

de Lange, T., Shelterin-Mediated Telomere Protection. Annual Review of Genetics 2018, 52 (1), 223-247.

Deng, L., Liang, H., Burnette, B., Beckett, M., Darga, T., Weichselbaum, R.R., and Fu, Y.X. (2014a). Irradiation and anti-PD-L1 treatment synergistically promote antitumor immunity in mice. J Clin Invest 124, 687-695.

Deng, L., Liang, H., Xu, M., Yang, X., Burnette, B., Arina, A., Li, X.D., Mauceri, H., Beckett, M., Darga, T., et al. (2014b). STING-Dependent Cytosolic DNA Sensing Promotes Radiation-Induced Type I Interferon-Dependent Antitumor Immunity in Immunogenic Tumors. Immunity 41, 843-852.

Dikmen, Z.G., Gellert, G.C., Jackson, S., Gryaznov, S., Tressler, R., Dogan, P., Wright, W.E., and Shay, J.W. (2005). In vivo inhibition of lung cancer by GRN163L: a novel human telomerase inhibitor. Cancer Res 65, 7866-7873.

Ding, D., Xi, P., Zhou, J., Wang, M., and Cong, Y.S. (2013). Human telomerase reverse transcriptase regulates MMP expression independently of telomerase activity via NF-KB-dependent transcription. Faseb j 27, 4375-4383.

Doksani, Y., and de Lange, T. (2014). The role of double-strand break repair pathways at functional and dysfunctional telomeres. Cold Spring Harbor perspectives in biology 6, a016576.

Dong, X., Liu, A., Zer, C., Feng, J., Zhen, Z., Yang, M., and Zhong, L. (2009). siRNA inhibition of telomerase enhances the anti-cancer effect of doxorubicin in breast cancer cells. BMC Cancer 9, 133.

Donlon, N.E., Power, R., Hayes, C., Reynolds, J.V., and Lysaght, J. (2021). Radiotherapy, immunotherapy, and the tumour microenvironment: Turning an immunosuppressive milieu into a therapeutic opportunity. Cancer Lett 502, 84-96.

Dovedi, S.J., Adlard, A.L., Lipowska-Bhalla, G., McKenna, C., Jones, S., Cheadle, E.J., Stratford, I.J., Poon, E., Morrow, M., Stewart, R., et al. (2014). Acquired resistance to fractionated radiotherapy can be overcome by concurrent PD-L1 blockade. Cancer Res 74, 5458-5468.

Dovedi, S.J., and Illidge, T.M. (2015). The antitumor immune response generated by fractionated radiation therapy may be limited by tumor cell adaptive resistance and can be circumvented by PD-L1 blockade. Oncoimmunology 4, e1016709.

Drissi, R., Wu, J., Hu, Y., Bockhold, C., and Dome, U.S. (2011). Telomere shortening alters the kinetics of the DNA damage response after ionizing radiation in human cells. Cancer Prev Res (Phila) 4, 1973-1981.

Efimova EV, Ricco N, Labay E, Mauceri HJ, Flor AC, Ramamurthy A, Sutton HG, Weichselbaum RR, and Kron SJ. HMG-CoA Reductase Inhibition Delays DNA Repair and Promotes Senescence After Tumor Irradiation. Mol Cancer Ther. 2018;17(2):407-18.

Efimova, E. V.; Takahashi, S.; Shamsi, N. A.; Wu, D.; Labay, E.; Ulanovskaya, O. A.; Weichselbaum, R. R.; Kozmin, S. A.; Kron, S. J., Linking Cancer Metabolism to DNA Repair and Accelerated Senescence. Molecular Cancer Research 2016, 14 (2), 173.

Feuerhahn, S.; Chen, L. Y.; Luke, B.; Porro, A., No. DDRama at chromosome ends: TRF2 takes centre stage. Trends Biochem Sci 2015, 40 (5), 275-85.

Finnon, P.; Silver, A. R.; Bouffler, S. D., Upregulation of telomerase activity by X-irradiation in mouse leukaemia cells is independent of Tert, Terc, Tnks and Myc transcription. Carcinogenesis 2000, 21 (4), 573-8.

Fleisig, H. B.; Hukezalie, K. R.; Thompson, C. A.; Au-Yeung, T. T.; Ludlow, A. T.; Zhao, C. R.; Wong, J. M., Telomerase reverse transcriptase expression protects transformed human cells against DNA-damaging agents, and increases tolerance to chromosomal instability. Oncogene 2016, 35 (2), 218-27.

Formenti, S.C., and Demaria, S. (2012). Radiation therapy to convert the tumor into an in situ vaccine. Int J Radiat Oncol Biol Phys 84, 879-880.

Ganesan, K.; Xu, B., Telomerase Inhibitors from Natural Products and Their Anticancer Potential. International journal of molecular sciences 2017, 19 (1), 13.

Gao, J., and Pickett, H.A. (2022). Targeting telomeres: advances in telomere maintenance mechanism-specific cancer therapies. Nat Rev Cancer 22, 515-532.

Genescà, A., Martín, M., Latre, L., Soler, D., Pampalona, J., and Tusell, L. (2006). Telomere dysfunction: a new player in radiation sensitivity. Bioessays 28, 1172-1180.

\* cited by examiner

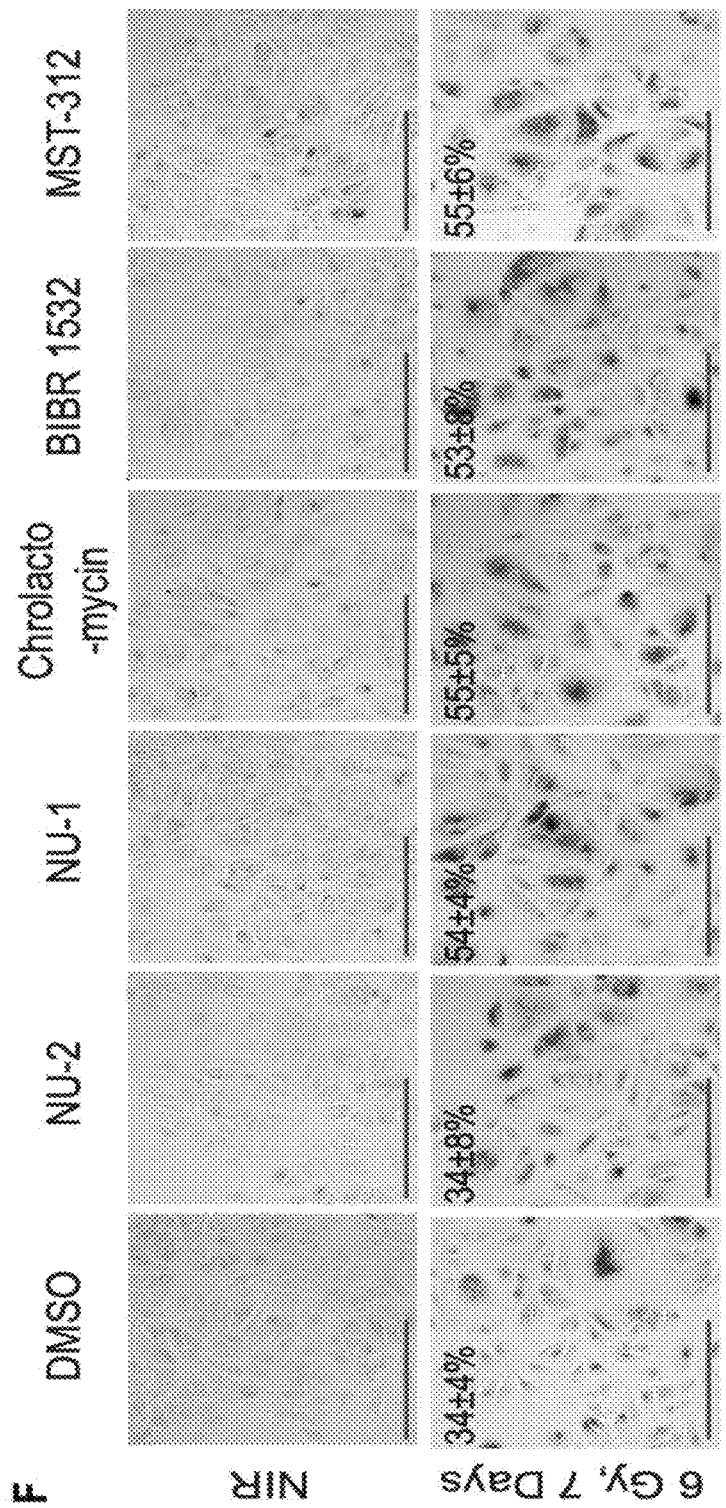

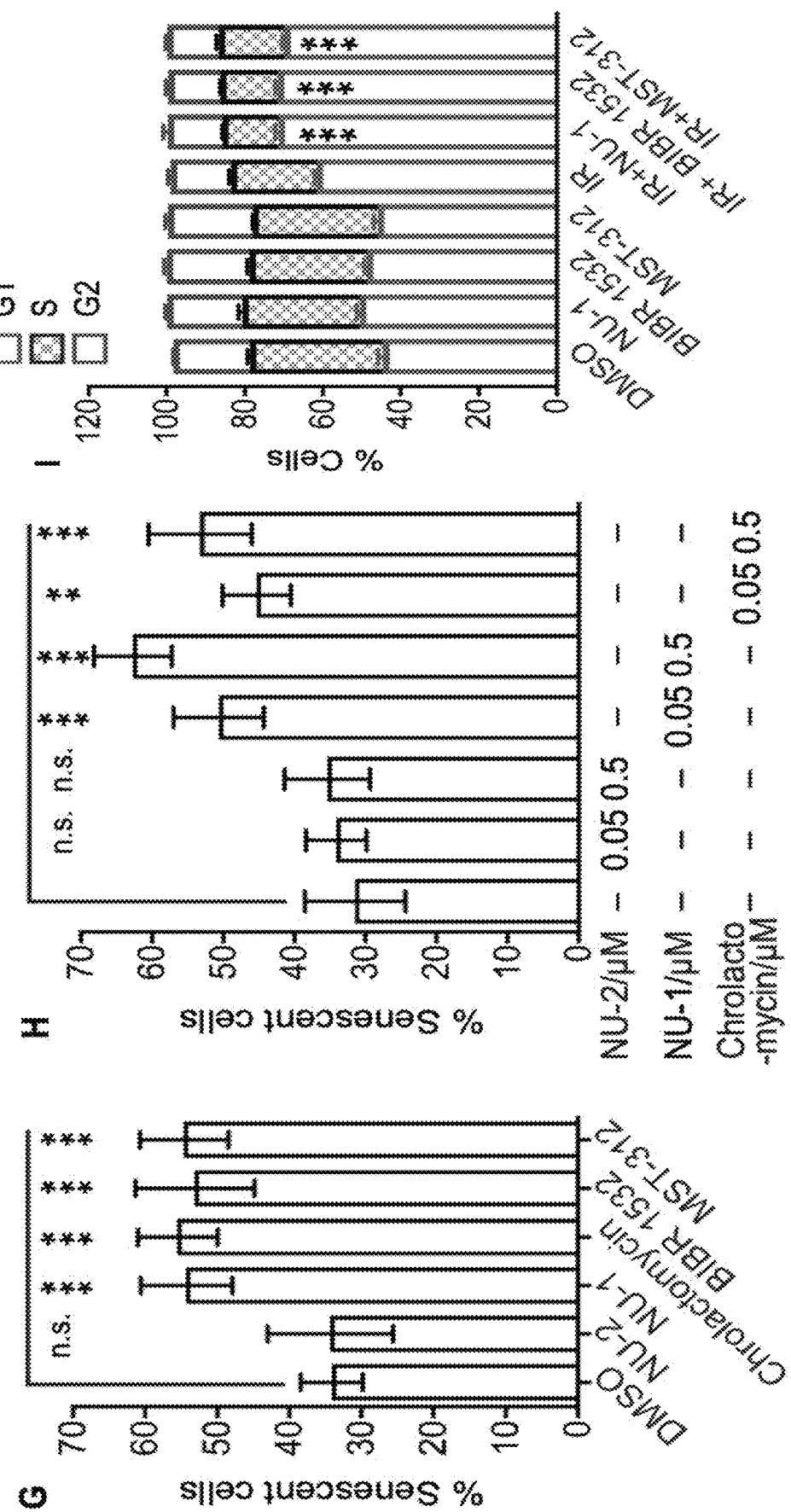

AGENTS THAT TARGET TELOMERASE REVERSE TRANSCRIPTASE (TERT) FOR TREATING CANCER AND SENSITIZING CANCER CELLS TO GENOTOXIC THERAPY

CROSS-REFERENCE TO RELATED APPLICATIONS

The present application is a continuation of PCT/US2023/060942, filed Jan. 19, 2023, which claims priority to U.S. Provisional Patent Application No. 63/301,036, filed Jan. 19, 2022, the entire contents of each are hereby incorporated by reference.

STATEMENT REGARDING FEDERALLY SPONSORED RESEARCH

This invention was made with government support under R01 CA254047 awarded by the National Cancer Institute, a part of the National Institutes of Health. The government has certain rights in the invention.

BACKGROUND OF THE INVENTION

The disclosed technology relates to compounds, compositions, and methods for treating and/or preventing diseases and disorders associated with telomerase activity. One aspect of the technology relates to compounds, compositions, and methods for treating and/or preventing cell proliferative diseases and disorders that are associated with telomerase reverse transcriptase (TERT) activity. Another aspect of the technology relates to compounds, compositions, and methods for sensitizing a subject to a co-administered therapy for diseases and disorders that are associated with telomerase reverse transcriptase activity. Another aspect of the technology relates to compounds, compositions, and methods for treating diseases and disorders that are associated with telomerase reverse transcriptase activity facilitating the tumor evading immune surveillance and/or immune-mediated elimination in a subject.

TERT is essential for telomere maintenance but also supports extra-telomeric functions critical for the proliferation and survival of many cancers. While efforts to block telomere elongation with small molecule inhibitors have yielded only modest clinical impact, TERT's non-canonical activities have not been fully examined as alternative targets. Covalent TERT inhibitors, such as the 3-methylideneoxan-4-one compound NU-1, irreversibly block telomerase activity in cancer cells. (See U.S. Publication No. 2021/0070725, the content of which is incorporated herein by reference).

Treating human and mouse cancer cells with telomerase inhibitors prior to genotoxic therapy delays DNA double-strand break repair, resulting in persistent DNA damage signaling, growth arrest, and senescence, as expected. Treating BALB/c mice bearing syngeneic CT26 murine colon carcinoma tumors with NU-1 did not affect the host or reduce tumor growth. When combined with tumor irradiation, NU-1 increased persistent DNA damage, decreased proliferation and enhanced immune infiltration over radiation alone.

Rather than simply prolong the growth delay, combination therapy eliminated tumors from most animals. The Examples demonstrate that targeting TERT overcomes intrinsic resistance to genotoxic therapy and potentiates immune responses.

BRIEF SUMMARY OF THE INVENTION

Disclosed are compounds that target the biological activity of telomerase reverse transcriptase (TERT). The compounds, when administered to subjects in need thereof, overcome intrinsic resistance to genotoxic therapy, sensitize the subject to therapies, or potentiate immune responses.

The disclosed compounds may be administered in order to treat a disease or disorder that is associated with telomerase activity. In particular, the disclosed compounds may be administered to treat cell proliferative diseases or disorders, such as cancer.

One aspect of the technology provides for a method for inhibiting induction of an immunosuppressive factor in a subject in need thereof comprising administering an inhibitor of telomerase reverse transcriptase (TERT) to the subject.

Another aspect of the technology provides for a method for reducing or preventing treatment resistance relapse or recurrence of a tumor in a subject administered a genotoxic therapy comprising co-administering an inhibitor of telomerase reverse transcriptase (TERT) with the genotoxic therapy to the subject.

Another aspect of the technology provides for a method of treating a subject in need thereof comprising administering to the subject an inhibitor of telomerase reverse transcriptase (TERT) and a genotoxic therapy.

Another aspect of the technology provides for a method of sensitizing a subject to a therapy comprising administering to the subject an inhibitor of telomerase reverse transcriptase (TERT) and the therapy.

Another method of treating diseases and disorders that are associated with telomerase reverse transcriptase activity facilitating tumor evading immune surveillance and/or immune-mediated elimination in a subject comprising administering to the subject an inhibitor of telomerase reverse transcriptase (TERT).

The methods described herein may be used to treat diseases or disorders characterized by TERT activity. Exemplary diseases or disorders that may be characterized by TERT activity include cell proliferative diseases or disorders, include but not limited to cancer. Cancer characterized by TERT activity may include a lung cancer, a colon cancer, a head and neck cancer, a bladder cancer, a skin cancer, a liver cancer, a pancreatic, a blood cancer, a brain cancer, a childhood cancer, a breast cancer, an ovarian cancer, an endometrial cancer, a prostate cancer, and a cervical cancer.

The methods described herein allow for inhibiting induction of immunosuppressive factors, such as immune checkpoint proteins (e.g., PD-L1), cytokines, chemokines, or enzymes. By inhibiting the induction of immunosuppressive factors with the administration of a TERT inhibitor, the subject may be sensitized to a co-administered therapy and/or there is a reduction or prevention of resistance or recurrence of a co-administered therapy. The co-administered therapy may be a chemotherapy, such as a radiotherapy or a chemotherapy, but may also include an immunotherapy and/or molecularly targeted therapy, alone or in combination with a genotoxic therapy.

Inhibitors of TERT that may be used in the disclosed methods include covalent and reversible inhibitors of TERT. The Examples demonstrated that several different TERT inhibitors can provide the benefits and advantages described herein. In some embodiments, the inhibitor of TERT is a 3-methylideneoxan-4-one compound or a derivative thereof, such as

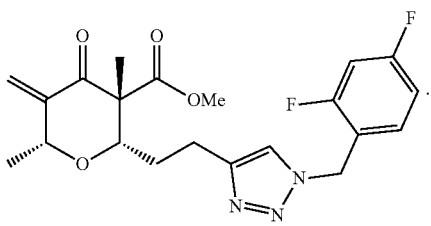

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention.

DETAILED DESCRIPTION OF THE INVENTION

Figure 1:
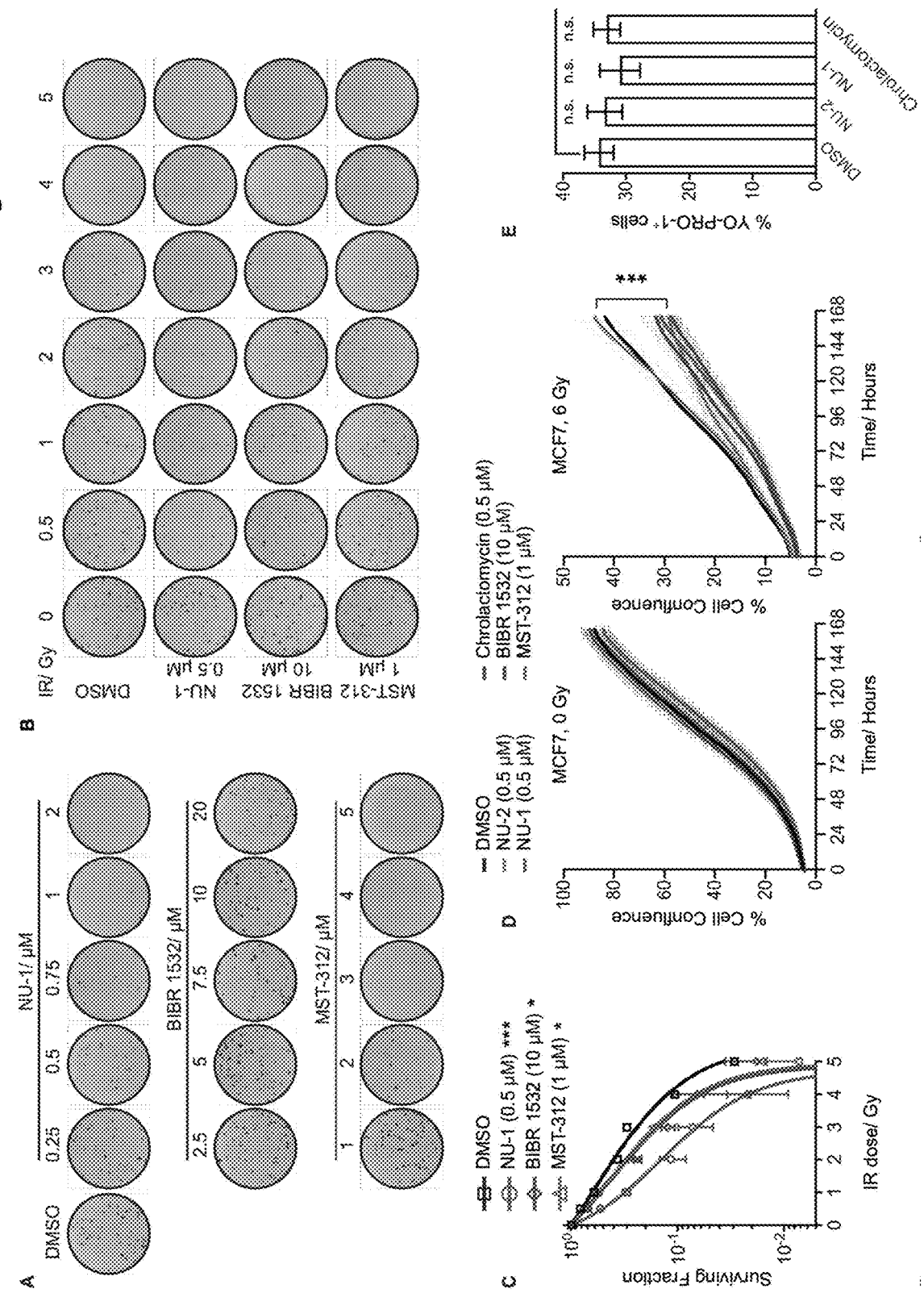
FIG. 1. TERT inhibition induces radiosensitivity and cellular senescence. (A) Clonogenic assay of MCF7 cells treated with DMSO control, NU-1, BIBR (BIBR 1532), or MST (MST-312) at indicated concentrations. (B) Clonogenic survival of MCF7 cells irradiated at indicated doses±DMSO, NU-1 (0.5 µM), BIBR (10 µM), or MST (1 µM). Representative images from triplicates. (C) Normalized surviving fractions of cells in B, mean±SD. (D) Proliferation analysis over 6 days comparing MCF7 cells treated with TERT inhibitors or controls for 1 h before 0 (left, NIR) or 6 Gy (right) at time 0, mean±SEM. (E) Quantification of YO-PRO-1$^+$ cells. Cells were treated with indicated compounds±IR, followed by staining after 7 days, mean±SD. (F) SA-β-Gal staining of MCF7 cells treated as in D, after 7 days. Representative 20× images. Scale bars=200 µm. (G) Quantification of SA-β-Gal$^+$ cells in F, mean±SD. (H) % SA-β-Gal$^+$ MCF7 cells. Cells were treated as indicated for 1 h, followed by IR and staining after 7 days, mean±SD. (I) MCF7 cells were treated with indicated compounds±6 Gy IR, followed by cell cycle analysis after 24 h. Data from three replicates, mean±SD. (J) MCF7-FUCCI cells were treated with NU-1 or NU-2 for 1 h before 6 Gy at time 0 h. Successive representative images are shown. Red, G1 phase. Green, S/G2. Arrows indicate the tracked mother and daughter cells. Scale bars=50 µm. *P<0.001; 0.001<P<0.01, n.s. P>0.05 compared to DMSO (unpaired t-test).
Figure 1:
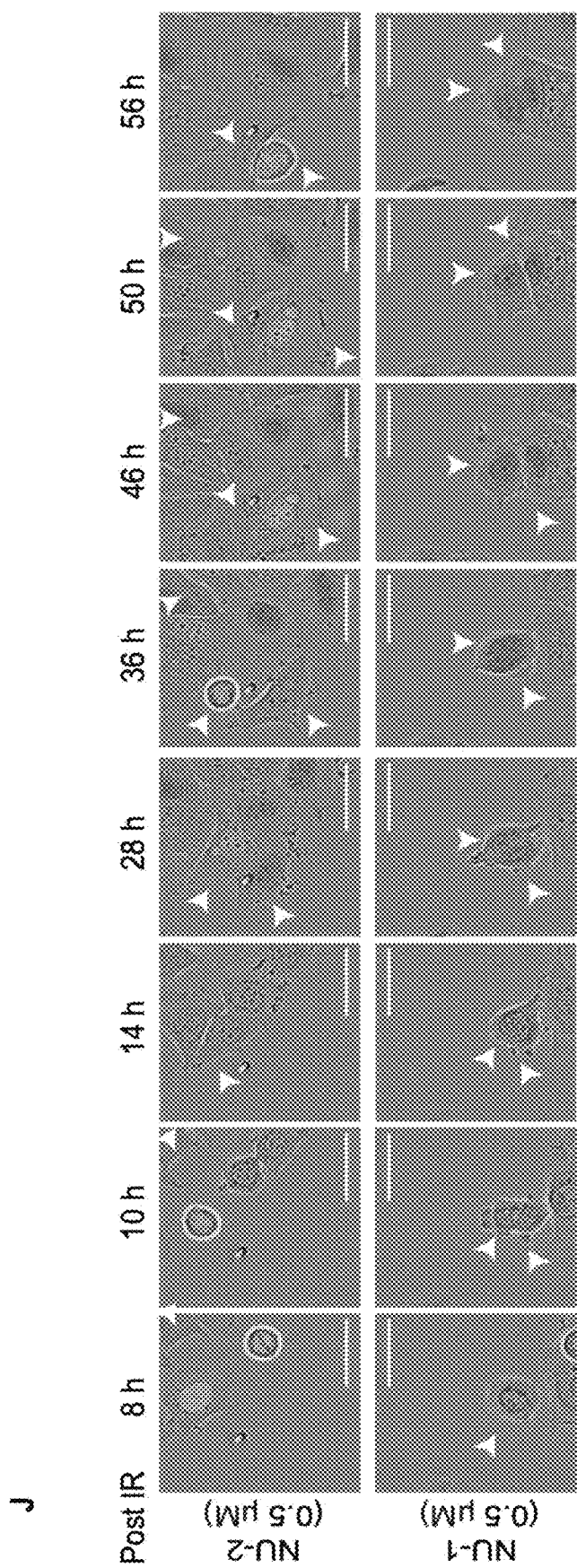

The present invention is described herein using several definitions, as set forth below and throughout the application.

Unless otherwise specified or indicated by context, the terms "a", "an", and "the" mean "one or more." For example, "a compound" or "an inhibitor" should be interpreted to mean "one or more compounds" and "one or more inhibitors," respectively.

As used herein, "about," "approximately," "substantially," and "significantly" will be understood by persons of ordinary skill in the art and will vary to some extent on the context in which they are used. If there are uses of these terms which are not clear to persons of ordinary skill in the art given the context in which they are used, "about" and "approximately" will mean plus or minus≤10% of the particular term and "substantially" and "significantly" will mean plus or minus>10% of the particular term.

As used herein, the terms "include" and "including" have the same meaning as the terms "comprise" and "comprising" in that these latter terms are "open" transitional terms that do not limit claims only to the recited elements succeeding these transitional terms. The term "consisting of," while encompassed by the term "comprising," should be interpreted as a "closed" transitional term that limits claims only to the recited elements succeeding this transitional term. The term "consisting essentially of," while encompassed by the term "comprising," should be interpreted as a "partially closed" transitional term which permits additional elements succeeding this transitional term, but only if those additional elements do not materially affect the basic and novel characteristics of the claim.

As used herein, a "subject" may be interchangeable with "patient" or "individual" and means an animal, which may be a human or non-human animal, in need of treatment, for example, treatment by include administering a therapeutic amount of one or more therapeutic agents that inhibit the biological activity of telomerase, such as the reverse transcriptase activity of telomerase (TERT). A "subject" may be a fetus, an infant, a child, a young adult or an aged adult. A "subject in need of treatment" may include a subject having a disease or disorder associated with telomerase activity. As such TERT may be inappropriately active in pathological tissues, including, but not limited to benign or malignant tumors, preneoplastic growths, primary tumors, recurrent disease, metastases, dyskeratosis congenita, scars, bone marrow failure, idiopathic pulmonary fibrosis, Hoyeraal-Hreidarsson syndrome, aplastic anemia, and liver fibrosis.

A "subject in need of treatment" may also include a subject having a cell proliferative disease, disorder, or condition. A subject having a cell proliferative disease, disorder, or condition may be characterized as having an abnormal accumulation or mass of cells characterized by cells dividing more than normal and/or not dying as normal. The abnormal accumulation or mass may be a benign tumor, malignant tumor, metastasis, or preneoplastic growth associated with an increased risk of developing a tumor. The cell proliferative disease, disorder, or condition may be characterized as cancer. Cancers may include, but are not limited to adenocarcinoma, leukemia, lymphoma, melanoma, myeloma, sarcoma, embryonal malignancy and teratocarcinoma and particularly cancers of the adrenal gland, bladder, blood, bone, bone marrow, brain, breast, cervix, gall bladder, ganglia, gastrointestinal tract, heart, kidney, liver, lung, muscle, ovary, pancreas, parathyroid, prostate, skin, testis, thymus, and uterus. In some embodiment, the subject in need of treatment is a subject comprising telomerase positive masses, such as cancer cells, including ovarian or breast cancer.

Cancer is a complex and highly individualized disease, making developing better drugs a formidable task. Cancer's lethality is enabled by a set offensive and defensive capabilities termed the Hallmarks of Cancer. These include: (I) sustaining proliferative signaling, (II) evading growth suppressors, (III) resisting cell death, (IV) inducing angiogenesis, (V) activating invasion and metastasis, (VI) deregulating energy metabolism, (VII) evading immune destruction, (VIII) tumor promoting inflammation, (IX) genome instability and mutation, and (X) replicative immortality The hallmarks emerge from the interactions of a complex network of signaling pathways. For many cancer types, genotoxic therapies remain the best option even as chemoresistance and toxicity issues abound. Adaptive or inherent therapy resistance, whether to chemotherapy, radiotherapy, or targeted therapy, is one of the key challenges to address with all cancer types. Therapy resistance is a complex phenomenon, underpinned by the hallmarks of cancer along with multiple related causal elements including tumor size, DNA repair dysregulation, tumor heterogeneity, cancer stem cells (CSC), tumor microenvironment, and central oncogenic regulators.

There is a tight correlation between tumor size or dispersion and curability. Tumor growth rate is dependent on tumor size, with smaller tumors growing at faster rates. To inflict maximal damage to tumors and maximize the probability of tumor elimination, a dose-dense short-duration chemotherapeutic protocol may be more effective to limit regrowth between doses. In line with this strategy, drugs that serve as therapy sensitizers can amplify the effect of genotoxic therapy. However, the clinical viability of therapy sensitizers is currently limited. There is a need for more selective tumor-specific chemosensitizers and radiosensitizers that can limit toxicity to healthy tissue.

Tumors may be hypersensitive or resistant to therapy based on DNA repair pathways alterations. Certain DNA damage repair proteins like poly (ADP-ribose) polymerase (PARP) may be upregulated in cancer cells relative to their basal levels in healthy cells. Under genotoxic stress, the DNA damage repair machinery is activated to avoid cellular death. One strategy for developing chemotherapy or radiotherapy sensitizers is inhibiting these DNA repair pathways. DNA repair inhibitors show promise, however progress to clinical use has been slow, often limited by normal tissue toxicity. A tumor-specific DNA repair inhibitor would be a significant improvement over current technology.

There are genetically and phenotypically distinct subpopulations of malignant cells within tumors. This heterogeneity is a major barrier to effective treatment. Tumor cells exhibit variable degrees of therapy sensitivity. After a round of treatment, the surviving cells are unavoidably enriched with more resistant subpopulations that repopulate the tumor. The proteomic differences between cells impart varying degrees of sensitivity to many targeted immunotherapeutics. Tumors may contain especially therapy resistant cancer stem cell (CSC) subpopulations with a high metastatic capacity that serve to repopulate the tumor post-treatment. CSCs have upregulated DNA repair capacity, are especially resistant to apoptosis, and overexpress drug efflux transporter ATP binding cassette (ABC). They are directly implicated in an increased rate of recurrence for cancer. A drug targeting the pathways underpinning CSCs may reduce or eliminate therapy resistance.

Tumor spatial heterogeneity is another factor in therapy resistance. The tumor microenvironment (TME) is actively modulated by the tumor to create an invasive, immunosuppressive, drug-resistant barrier. Cancer associated fibroblasts (CAR), endothelial cells, and various immune cells promote these traits. Mechanistically, this includes resisting anti-growth signaling from the transforming growth factor-$\beta$ (TGF-$\beta$) and angiogenesis through the vascular endothelial growth factor VEGF pathway. The NF-kB signaling pathway can activate pro-tumor inflammation and simultaneously suppress the anti-tumor inflammatory response through inhibiting dendritic cell maturation. A drug that potentiates an anti-tumor immune response to overcome immune evasion and suppression in the TME would greatly benefit patients.

Oncologists and drug developers have diligently explored the network of proteins and signaling pathways critical to regulating the hallmarks of cancer. This network of central multifunctional proteins/signaling pathways may include MYC, Ras, P53 as well as many other factors. These are highly desirable drug targets, but many have long been considered undruggable. Moreover, the problem remains that many targets are expressed broadly across healthy cell types, and thus on- and off-target toxicity will remain a significant issue. A drug that could target a tumor-specific central regulator of cancer biology, sparing healthy cells, would provide an advantage over other widely expressed targets.

A multimodal attack on the faculties of therapy resistance may be effective. Cancer may persevere against DNA damage or the disruption of any one hallmark or mechanism of therapy resistance, by leveraging the network of supporting hallmarks. Some researchers have proposed the strategy of designing multi-drug combinations that would target multiple complimentary hallmarks. However, combinations of multiple targeted therapeutics may be difficult to optimize and to avoid toxicity issues. A single drug impairing multiple hallmarks and therapy resistance, thus rendering tumors more vulnerable to genotoxic assault, is the more viable approach.

Telomerase reverse transcriptase (abbreviated to TERT, or hTERT in humans) is the catalytic subunit of the enzyme telomerase, which, together with the telomerase RNA component (TERC), comprises an important unit of the telomerase complex. TERT is responsible for catalyzing the addition of nucleotides in a TTAGGG sequence to the ends of a chromosome's telomeres. This addition of repetitive DNA sequences prevents degradation of the chromosomal ends following multiple rounds of replication, leading to a terminal arrest called cellular senescence. While TERT expression is repressed in most human somatic cells, thereby limiting their replicative potential, TERT expression is maintained in cells that divide rapidly or must remain immortal, including adult stem cells. Restoring the expression of telomerase to somatic cells protects them from senescence and allows them to become potentially immortal, as is often the case with cancerous cells. Various natural and synthetic telomerase inhibitors have been identified. These drugs have been evaluated primarily with the goal of preventing cells from being able to lengthen their telomeres with each cell division and thereby restore mortality to the cancer cells. A drawback of this strategy is that the cancers may continue to grow during the many divisions required to reach replicative senescence. Further, they may develop alternative pathways to maintain immortality even in the absence of TERT and telomerase.

Importantly, in addition to telomere length, TERT also comprises critical non-canonical, functions. These extra-telomeric, non-canonical activities, include roles in regulation of cellular stress response, stemness, cell growth, cell survival, inflammation and DNA repair. In many cancer cells, these non-canonical activities are important for cell proliferation and survival. Where this is particularly acute, as in cells derived from tumors expressing a mutated NRAS oncogene, the dependency on TERT may be called "TERT addiction". The present disclosure targets these non-canonical roles of TERT as a novel means of affecting cell growth and cancer. Inhibiting these non-canonical roles may sensitize the target to other therapies. Where the combination with a second therapy may directly lead to an effective treatment, this may be described as sensitization or "synthetic lethality".

Telomerase can be targeted to treat cell proliferative diseases and disorders. As such, the subject matter disclosed herein relates to compounds targeted to telomerase and compounds and compositions and methods for treating cell proliferative diseases and disorders that include or utilize the disclosed compounds. The compositions and methods typically include or utilize the disclosed compounds as therapeutic agents which inhibit the biological activity of telomerase and collectively may be referred to as "telomerase inhibitors." Particularly disclosed are small molecule inhibitors of telomerase biological activity.

One aspect of the present invention is a method for inhibiting induction of an immunosuppressive factor in a subject in need comprising administering a TERT inhibitor to the subject. Immunosuppressive factors decrease the immune response. Administration of a TERT inhibitor may decrease the amount, type or timing of immunosuppressive factors. Immunosuppressive factors include cellular, cell surface, or secreted factors that promote or support suppression of anti-tumor responses by affecting or mediating immune cell activities. Exemplary immunosuppressive factors include immune checkpoint proteins, cytokines, chemokines, and enzymes. The immunosuppressive factor may be a cellular, cell surface, or secreted factor originating from a tumor cell or a tumor microenvironment.

Immune checkpoint proteins help keep the immune response in check and can prevent an immune response that is so strong it may destroy heathy cells. Cancerous cells often have mutations or other means of affecting immune checkpoints, which thereby decrease the immune response to a cancerous cell or tumor. Immune checkpoint proteins include receptors and ligands, including but are not limited to, programmed cell death ligand 1 (PD-L1), programed cell death ligand 2 (PD-L2), programmed cell death 1 (PD-1), anti-cytotoxic T lymphocyte-associated antigen-4 (CTLA-4), lymphocyte activation gene-3 (LAG-3), T cell immunoglobulin and mucin-domain containing-3 (TIM-3), T cell immunoglobulin and ITIM domain (TIGIT), V-domain Ig suppressor of T cell activation (VISTA). The methods described herein may inhibit induction of an immune checkpoint protein such as PD-L1.

One aspect of the present invention is the use of compounds and compositions described herein to affect treatment resistance. In some aspects, treatment resistance is affected by increasing sensitivity to therapy. Resistance to therapy may be affected through changes in immune factors. Compounds and compositions described herein may sensitize a subject, or a biological sample to other treatment modalities including, but not limited to genotoxic therapies or immunotherapies. Sensitizing a subject or sample to a treatment may allow for a decreased treatment dose, altered treatment timing, altered treatment location, decreased treatment frequency or altered treatment options. Treatment resistance may be acquired when a subject or pathological tissue becomes increasingly tolerant to a therapy during the treatment process, as when mutations may arise and then be selected during rounds of therapy. Treatment resistance may also be intrinsic, for example mediated by mutations acquired during the formation of the cancer to overcome normal limits on growth of cells or in evading the immune system by forming an immunosuppressive tumor microenvironment.

The disclosed compounds or compositions may be administered with a genotoxic therapy to a subject in need thereof. As used herein, a "genotoxic therapy" comprises a chemical or agent that can cause DNA or chromosomal damage. Among others, genotoxic therapies comprise radiotherapy and chemotherapies. In some embodiments, the disclosed compounds or compositions are administered to a subject in need thereof followed by the administration of a genotoxic therapy.

Radiotherapy, or radiation therapy, is a therapy using ionizing radiation to control or kill cells in a subject. Radiotherapies may be administered by external beams of ionizing radiation in the form of photons or subatomic particles or carried to the tumor as unstable radioisotopes called radionuclides that undergo spontaneous decay within or near tumor cells. External bean radiotherapy includes but is not limited to 3D conformal radiation therapy (3DCRT), image guided radiation therapy (IGRT), intensity modulated radiation therapy (IMRT), volumetric modulated arc therapy (VMAT), Brachytherapy, intraoperative radiation therapy (IORT), stereotactic radiosurgery (SRS), proton therapy, MRI linear accelerator, stereotactic body radiation therapy (SBRT), low-dose hyperfractionation, whole brain radiotherapy (WBRT) or intensity modulated whole abdomen radiotherapy (WAR). Radionuclide therapy (RNT) is often provided as a radiopharmaceutical and may be introduced directly or tethered to small molecules or proteins or encapsulated in nanoparticle carriers, to facilitate concentration of the radioactivity in the tumor.

Chemotherapy is the treatment of disease using chemical substances. Chemotherapy is commonly used in the treatment of cancer using cytotoxic and other drugs. Chemotherapy may be given by any means known and through the best means available for treatment, including intravenously, orally, injected as a shot, into an artery, in a topical form or administered into the peritoneum or abdomen. Types of chemotherapy include alkylating agents, antimetabolites, anti-tumor antibiotics, topoisomerase inhibitors, mitotic inhibitors and plant alkaloids. Additional chemotherapies include, but are not limited to carboplatin, cisplatin, paclitaxel, doxorubicin, irinotecan, and etoposide. The compounds or compositions provided herein may be used before, during or after the use of chemotherapy agents as well as any surgical treatments or other standard of care treatments. Compounds or compositions provided herein may be administered as a neoadjuvant therapy or adjuvant therapy.

Radiotherapy and chemotherapy may be used alone or in combination with each other or other appropriate therapies, including compositions provided herein. Additional therapies include systemic therapies such as hormone therapies, targeted therapies, immunotherapies, nanomedicines, and cellular therapies, and local treatments such as, hyperthermia, photodynamic therapy, ultrasound therapy, implants and surgery. Radiotherapy, chemotherapy and compounds or compositions provided herein may be administered as a primary treatment, before other treatments, after other treatments, with a curative intent or to prolong life or reduce symptoms.

The methods described herein may comprise co-administering compounds or compositions provided herein with a genotoxic therapy. Co-administration may comprise administering a TERT inhibitor before the use of a secondary therapy including but not limited to genotoxic therapy, immunotherapy, or a molecularly targeted therapy. A TERT inhibitor may be continued during the administration of a secondary therapy or may be discontinued prior to administration of a secondary therapy. Administration of compounds or compositions provided herein may be at doses that do not affect clonogenicity on their own. Compounds or compositions described herein may be administered at non-toxic and or non-therapeutic doses which have no affect when administered alone, but when administered in combination with another therapy result in affects as described herein, including but not limited to immunogenic or proliferative effects.

The methods may comprise administering to the subject an immunotherapy in combination with a compound or composition described herein, with or without a genotoxic therapy. Immunotherapy is treatment that uses a subject's immune system or immune modulators made in a laboratory to fight a disease, including cancer. Immunotherapy can boost or change how the immune system works. Immunotherapies include, but are not limited to monoclonal antibodies, adoptive transfer cellular therapies such as CAR T-cell therapy, immune checkpoint inhibitors, cancer vaccines, cytokines and immunomodulators. In some embodiment, the subject is administered the immunotherapy after the subject is administered the inhibitor of TERT.

The methods may comprise administering to the subject a molecularly targeted therapy in combination with a compound or composition described herein, with or without a genotoxic therapy. Molecularly targeted therapy comprises a type of treatment that uses drugs or other substances to target specific molecules involved in a disease, disorder, or condition for which a subject is in need of treatment. Some molecularly targeted therapy blocks molecules as a way of killing cancer cells or preventing their growth. Molecularly targeted therapy includes but is not limited to small-molecules and antibodies. In some embodiments the subject is administered the molecularly targeted therapy after the subject is administered the inhibitor of TERT.

Methods for sensitizing a subject to a therapy comprising administering to the subject a compound or composition described herein and the therapy are provided. Sensitizing a subject to a therapy includes a process in which one drug or treatment is used to enhance the activity of another drug or treatment. A treatment or compound that sensitizes a subject to chemotherapy may be called chemosensitization. A chemosensitizer is a drug or treatment that makes tumor cells more sensitive to the effects of chemotherapy without increasing the dose of chemotherapy. A radiosensitizer or radiosensitizing agent, is any substance or treatment that allows tumor cells easier to be more adversely affected by radiation therapy without increasing the radiation dose. A chemosensitizer or radiosensitizer may make it so that standard treatment is more effective or that a lower dose, shorter duration, a less frequent dose or any such decreased of chemotherapy or radiotherapy can be used to obtain the same or improved response.

TERT inhibitors, including compositions provided herein may serve as tumor-specific therapy sensitizers including radiotherapy sensitizers and or chemotherapy sensitizers. The specificity may increase the therapeutic index or advantage of radiotherapy or chemotherapy, leaving normal cells unaffected in their ability to tolerate treatment while sensitizing the tumor cells. Thereby, the TERT inhibitor may increase the success of standard treatment or allow for a lower dose or less frequent dose of chemotherapy or radiotherapy to subsequently be used. The therapy may be administered in an amount which may be considered therapeutic but not uniformly curative in the absence of administration of a TERT inhibitor that advantageously results in an improved therapeutic benefit when administered with the TERT inhibitor. In some embodiments, compositions provided herein may affect DNA damage repair pathways including chromosomal double stranded break repair, non-homologous end-joining repair, homologous recombination repair, base excision repair, nucleotide excision repair and or mismatch repair. In some embodiments, composition provided herein may preferentially affect tumor cells that are defective in DNA damage repair pathways via the process of synthetic lethality. In some embodiments NU-1 is a radio-sensitizing agent and a chemotherapy sensitizing agent.

A method of reducing the ability of TERT to facilitate tumor evading immune surveillance and/or immune-mediated elimination in a subject in need thereof comprising administering to the subject a compound or composition described herein is also provided. Immune evasion is the partial or complete avoidance by a tumor of immune detection or the resulting anti-tumor immune response in a subject. Compounds or compositions provided herein may be used to overcome treatment resistance by affecting tissue, tumors, tumor microenvironment, and the like. For example, the compounds or compositions provided herein may overcome treatment resistance by affecting expression, function or localization of molecules, often described as immune checkpoint factors that modulate the immune detection of and immune reaction to the pathological tissue or tumor.

The compound or compositions provided herein may increase the anti-tumor immune response. An anti-tumor immune response, or antitumor immunity refers to innate and adaptive immune responses which detect the tumor, affect the tumor cell growth and survival and thereby lead to tumor control. Tumor immune evasion opposes the anti-tumor immune response to protect tumor cell growth and survival, enabling tumor progression, therapy resistance, recurrence and metastasis. Mediators of anti-tumor immunity include, but are not limited to, resident and infiltrating immune cells, that may comprise activated cytotoxic T lymphocytes and dendritic cells, immunogenic cell death or stress, inflammatory signaling and cytokine production and or signaling. Other factors that may oppose anti-tumor immunity and enable immune evasion include, but are not limited to, resident and infiltrating immune cells that may comprise suppressor T cells and myeloid derived suppressor cells, apoptotic death, inflammatory signaling and cytokine production and or signaling. Compounds or compositions provided herein may affect all or some aspects of antitumor immunity and immune evasion thereby affecting effectiveness of therapy options.

The compounds or compositions described herein may reduce the levels of PD-L1 expression induced in tumors. This may increase immunogenicity as well as prevent or reduce rebound immunospression after treatment with a genotoxic therapy, such as radiotherapy. Tumor immunity is a balance between factors that promote tumor progression and those that promote tumor rejection. Among diverse mechanisms of tumor immune evasion, PD-L1/PD-1 mediated T cell tolerance plays a prominent role (Pauken et al., 2021). When cytotoxic T lymphocytes (CTL) encounter the immune checkpoint ligand PD-L1 (B7-H1) expressed in the tumor, the PD-1 receptor cytoplasmic domain recruits and activates the SHP2 phosphatase, antagonizing T cell receptor signal transduction, proliferation and survival, leading to T cells to display exhaustion and undergo deletion by apoptosis. As such, established tumors can display PD-L1 expression to maintain an immunosuppressed microenvironment. Multiple monoclonal immune checkpoint blockade (ICB) antibodies that mask PD-1 (e.g., pembrolizumab or nivolumab) or PD-L1 (e.g., atezolizumab, durvalumab, or avelumab) have been approved with others in clinical development (Chang et al., 2021; Twomey and Zhang, 2021) with the aim of reactivating and rescuing exhausted T lymphocytes to restore an anti-tumor immune response, though overall response rates are modest.

Confounding factors are that PD-L1 expression by tumors is multifactorial (Cha et al., 2019; Chen et al., 2019; Yi et al., 2021). A wide range of other immune checkpoint targets that may limit CTL function have been identified. The first ICB agent approved targeted the CTLA-4 receptor (ligands CD80 and CD86) and combinations of PD-1 and CTLA-4 dual blockade have shown benefits but also toxicity. An antibody to block the T cell co-receptor LAG-3 (ligand MHCII), relatlimab-rmbw, was recently approved, though in combination with the PD-1 inhibitor nivolumab (Tawbi et al., 2022). Antibodies that block T cell suppressive receptors TIGIT (ligand CD155), TIM-3 (galectin-9), 4-1BB (4-1BBL), BTLA (HVEM), multiple receptor ligands and other targets remain in development. Along with expression of PD-L1 and/or other T cell inhibitory ligands, multiple other factors contribute to basal immunosuppression in the tumor microenvironment (TME). Many tumors accumulate suppressive cells such as cancer associated fibroblasts (CAFs), M2 tumor-associated macrophages, myeloid-derived suppressor cells (MDSCs) and suppressor T cells (Ts). Multiple metabolic features of the TME as well as other metabolites and second messengers also contribute to immunosuppression. Taken together, multiple features of the TME might need to be targeted to overcome immunosuppression.

Along with direct effects where the radiation is delivered, radiotherapy may also impact distant tumor sites including limited metastatic disease, potentially linked to its immunostimulatory effects.

A rationale for tumor irradiation as an immunotherapy is that radiation resets the tumor microenvironment (Barker et al., 2015; Cytlak et al., 2022; Mclaughlin et al., 2020) and the impact of acute tumor cell death, release of mediators and tumor neoantigens, increased immune infiltrates, and disruption of a suppressive stroma might be sufficient to reactivate anti-tumor immune response. Irradiated tumors release chemoattractants such as CXCL10, cytokines such as IL-6 and TNF-α, and other secreted and cell surface signals that drive extravasation, accumulation and activation of inflammatory infiltrates (Gupta et al., 2012; Lim et al., 2014; Matsumura et al., 2008). Considering the inflammatory signaling, immune infiltrates, tumor antigen release, and other mechanisms, radiation might be considered to produce an in situ vaccine (Formenti and Demaria, 2012; Golden et al., 2020). While irradiation alone may typically yield a transient immune response, tumor elimination is rare while a common outcome is for tumors to reconstitute an immunosuppressive TME and return to growth.

Determinants of the restoration of the immunosuppressed TME include direct effects of radiation, such as release of latent TGF-β (Barcellos-Hoff et al., 1994) and limiting T cell activation (Vanpouille-Box et al., 2015). However, much of the effect may be indirect wherein the damage to the tumor cells and the resulting immune infiltrates then stimulates a signaling pathway that leads to negative feedback called rebound immunosuppression or the adaptive response. Here, signaling by Type I and Type II interferons and other ligands can induce the tumor cells, both cancer cells and stroma cells, to express PD-L1 and thereby induce PD-L1/PD-1 mediated T cell tolerance, terminating the anti-tumor immune response. Combining radiation with PD-1 or PD-L1 blocking antibodies can block the adaptive response to not only eliminate irradiated tumors but also induce abscopal effects on unirradiated tumors in syngeneic mouse models (Deng et al., 2014a; Dovedi et al., 2014; Oweida et al., 2017; Zeng et al., 2013). This combination has not translated to broad success in clinical trials, leading to the hypothesis that other DNA damage, cytokine and/or interferon-induced immunosuppressive factors such as IDO1 and T cell inhibitory ligands beyond PD-L1 may be responsible for resistance to combinations of radiation and PD-1/L1 blockade (Kalbasi and Ribas, 2020). The disclosed compounds and compositions may be used to prevent or reduce rebound immunosuppression or the adaptive response, including PD-L1 and other immunosuppressive factors, when administered in combination with a genotoxic therapy, a targeted therapy, an immunotherapy, or combinations thereof. The disclosed compounds and compositions may be used to prevent or reduce rebound immunosuppression when administered in combination with a genotoxic therapy, an immunotherapy, or both.

Provided herein is a method for reducing or preventing treatment relapse in a subject administered a genotoxic therapy comprising co-administering a TERT inhibitor with the genotoxic therapy to the subject. Treatment relapse or treatment refractory may occur when a treatment is no longer affective at achieving the desired outcome or when increasing doses or dose schedules are necessary to achieve the desired outcome. In some embodiments, administration of a TERT inhibitor inhibits the induction of an immunosuppressive factor or checkpoint ligand to reduce or prevent treatment relapse.

Exemplary Compounds as Inhibitors of Telomerase Reverse Transcriptase Activity

Compounds and uses of compounds, for example as therapeutic agents, are disclosed herein. The compounds may be used to treat a subject in need of the compound, alone or in combination with another therapy as described herein. The compounds may also be used to prepare pharmaceutical compositions used to treat a subject in need of the composition, alone or in combination with another therapy as described herein.

The chemical entities may be described using terminology known in the art and further discussed below.

As used herein, an asterisk "*" or a plus sign "+" may be used to designate the point of attachment for any radical group or substituent group.

The term "alkyl" as contemplated herein includes a straight-chain or branched alkyl radical in all of its isomeric forms, such as a straight or branched group of 1-12, 1-10, or 1-6 carbon atoms, referred to herein as C1-C12 alkyl, C1-C10-alkyl, and C1-C6-alkyl, respectively.

The term "alkylene" refers to a diradical of an alkyl group (e.g., —(CH$_2$)$_n$— where n is an integer such as an integer between 1 and 20). An exemplary alkylene group is —CH$_2$CH$_2$—.

The term "haloalkyl" refers to an alkyl group that is substituted with at least one halogen. For example, —CH$_2$F, —CHF$_2$, —CF$_3$, —CH$_2$CF$_3$, —CF$_2$CF$_3$, and the like.

The term "heteroalkyl" as used herein refers to an "alkyl" group in which at least one carbon atom has been replaced with a heteroatom (e.g., an O, N, or S atom). One type of heteroalkyl group is an "alkoxy" group.

The term "alkenyl" as used herein refers to an unsaturated straight or branched hydrocarbon having at least one carbon-carbon double bond, such as a straight or branched group of 2-12, 2-10, or 2-6 carbon atoms, referred to herein as C2-C12-alkenyl, C2-C10-alkenyl, and C2-C6-alkenyl, respectively.

The term "alkynyl" as used herein refers to an unsaturated straight or branched hydrocarbon having at least one carbon-carbon triple bond, such as a straight or branched group of 2-12, 2-10, or 2-6 carbon atoms, referred to herein as C2-C12-alkynyl, C2-C10-alkynyl, and C2-C6-alkynyl, respectively.

The term "cycloalkyl" refers to a monovalent saturated cyclic, bicyclic, or bridged cyclic (e.g., adamantyl) hydrocarbon group of 3-12, 3-8, 4-8, or 4-6 carbons, referred to herein, e.g., as "C4-8-cycloalkyl," derived from a cycloalkane. Unless specified otherwise, cycloalkyl groups are optionally substituted at one or more ring positions with, for example, alkanoyl, alkoxy, alkyl, haloalkyl, alkenyl, alkynyl, amido, amidino, amino, aryl, arylalkyl, azido, carbamate, carbonate, carboxy, cyano, cycloalkyl, ester, ether, formyl, halo, haloalkyl, heteroaryl, heterocyclyl, hydroxyl, imino, ketone, nitro, phosphate, phosphonato, phosphinato, sulfate, sulfide, sulfonamido, sulfonyl or thiocarbonyl. In certain embodiments, the cycloalkyl group is not substituted, i.e., it is unsubstituted.

The term "cycloalkylene" refers to a cycloalkyl group that is unsaturated at one or more ring bonds.

The term "partially unsaturated carbocyclyl" refers to a monovalent cyclic hydrocarbon that contains at least one double bond between ring atoms where at least one ring of the carbocyclyl is not aromatic. The partially unsaturated carbocyclyl may be characterized according to the number of carbon atoms. For example, the partially unsaturated carbocyclyl may contain 5-14, 5-12, 5-8, or 5-6 ring carbon atoms, and accordingly be referred to as a 5-14, 5-12, 5-8, or 5-6 membered partially unsaturated carbocyclyl, respectively. The partially unsaturated carbocyclyl may be in the form of a monocyclic carbocycle, bicyclic carbocycle, tricyclic carbocycle, bridged carbocycle, spirocyclic carbocycle, or other carbocyclic ring system. Exemplary partially unsaturated carbocyclyl groups include cycloalkenyl groups and bicyclic carbocyclyl groups that are partially unsaturated. Unless specified otherwise, partially unsaturated carbocyclyl groups are optionally substituted at one or more ring positions with, for example, alkanoyl, alkoxy, alkyl, haloalkyl, alkenyl, alkynyl, amido, amidino, amino, aryl, arylalkyl, azido, carbamate, carbonate, carboxy, cyano, cycloalkyl, ester, ether, formyl, halogen, haloalkyl, heteroaryl, heterocyclyl, hydroxyl, imino, ketone, nitro, phosphate, phosphonato, phosphinato, sulfate, sulfide, sulfonamido, sulfonyl or thiocarbonyl. In certain embodiments, the partially unsaturated carbocyclyl is not substituted, i.e., it is unsubstituted.

The term "aryl" is art-recognized and refers to a carbocyclic aromatic group. Representative aryl groups include phenyl, naphthyl, anthracenyl, and the like. The term "aryl" includes polycyclic ring systems having two or more carbocyclic rings in which two or more carbons are common to two adjoining rings (the rings are "fused rings") wherein at least one of the rings is aromatic and, e.g., the other ring(s) may be cycloalkyls, cycloalkenyls, cycloalkynyls, and/or aryls. Unless specified otherwise, the aromatic ring may be substituted at one or more ring positions with, for example, halogen, azide, alkyl, aralkyl, alkenyl, alkynyl, cycloalkyl, hydroxyl, alkoxyl, amino, nitro, sulfhydryl, imino, amido, carboxylic acid, —C(O)alkyl, —CO$_2$alkyl, carbonyl, carboxyl, alkylthio, sulfonyl, sulfonamido, sulfonamide, ketone, aldehyde, ester, heterocyclyl, aryl or heteroaryl moieties, —CF$_3$, —CN, or the like. In certain embodiments, the aromatic ring is substituted at one or more ring positions with halogen, alkyl, hydroxyl, or alkoxyl. In certain other embodiments, the aromatic ring is not substituted, i.e., it is unsubstituted. In certain embodiments, the aryl group is a 6-10 membered ring structure.

The terms "heterocyclyl" and "heterocyclic group" are art-recognized and refer to saturated, partially unsaturated, or aromatic 3- to 10-membered ring structures, alternatively 3- to 7-membered rings, whose ring structures include one to four heteroatoms, such as nitrogen, oxygen, and sulfur. The number of ring atoms in the heterocyclyl group can be specified using 5 Cx-Cx nomenclature where x is an integer specifying the number of ring atoms. For example, a C3-C7 heterocyclyl group refers to a saturated or partially unsaturated 3- to 7-membered ring structure containing one to four heteroatoms, such as nitrogen, oxygen, and sulfur. The designation "C3-C7" indicates that the heterocyclic ring contains a total of from 3 to 7 ring atoms, inclusive of any heteroatoms that occupy a ring atom position.

The terms "amine" and "amino" are art-recognized and refer to both unsubstituted and substituted amines (e.g., mono-substituted amines or di-substituted amines), wherein substituents may include, for example, alkyl, cycloalkyl, heterocyclyl, alkenyl, and aryl.

The terms "alkoxy" or "alkoxyl" are art-recognized and refer to an alkyl group, as defined above, having an oxygen radical attached thereto. Representative alkoxy groups include methoxy, ethoxy, tert-butoxy and the like.

An "ether" is two hydrocarbons covalently linked by an oxygen. Accordingly, the substituent of an alkyl that renders that alkyl an ether is or resembles an alkoxyl, such as may be represented by one of —O-alkyl, —O-alkenyl, —O-alkynyl, and the like.

The term "carbonyl" as used herein refers to the radical —C(O)—.

The term "oxo" refers to a divalent oxygen atomb —O—.

The term "carboxamido" as used herein refers to the radical —C(O)NRR', where R and R' may be the same or different. R and R', for example, may be independently alkyl, aryl, arylalkyl, cycloalkyl, formyl, haloalkyl, heteroaryl, or heterocyclyl.

The term "carboxy" as used herein refers to the radical —COOH or its corresponding salts, e.g. —COONa, etc.

The term "amide" or "amido" or "amidyl" as used herein refers to a radical of the form —$R^1$C(O)N($R^2$)—, —$R^1$C(O)N($R^2$)$R^3$—, —C(O)N$R^2R^3$, or —C(O)NH$_2$, wherein $R^1$, $R^2$ and $R^3$, for example, are each independently alkoxy, alkyl, alkenyl, alkynyl, amide, amino, aryl, arylalkyl, carbamate, cycloalkyl, ester, ether, formyl, halogen, haloalkyl, heteroaryl, heterocyclyl, hydrogen, hydroxyl, ketone, or nitro.

The compounds of the disclosure may contain one or more chiral centers and/or double bonds and, therefore, exist as stereoisomers, such as geometric isomers, enantiomers or diastereomers. The term "stereoisomers" when used herein consist of all geometric isomers, enantiomers or diastereomers. These compounds may be designated by the symbols "R" or "S," or "+" or "−" depending on the configuration of substituents around the stereogenic carbon atom and or the optical rotation observed. The present invention encompasses various stereo isomers of these compounds and mixtures thereof. Stereoisomers include enantiomers and diastereomers. Mixtures of enantiomers or diastereomers may be designated (±)" in nomenclature, but the skilled artisan will recognize that a structure may denote a chiral center implicitly. It is understood that graphical depictions of chemical structures, e.g., generic chemical structures, encompass all stereoisomeric forms of the specified compounds, unless indicated otherwise. Also contemplated herein are compositions comprising, consisting essentially of, or consisting of an enantiopure compound, which composition may comprise, consist essential of, or consist of at least about 50%, 60%, 70%, 80%, 90%, 95%, 96%, 97%, 98%, 99%, or 100% of a single enantiomer of a given compound (e.g., at least about 99% of an R enantiomer of a given compound).

The compounds disclosed herein for use in the methods disclosed herein inhibit the activity of telomerase reverse transcriptase (TERT). Inhibitors of TERT may covalently or noncovalently inhibit TERT. Exemplary TERT inhibitors include those disclosed in ES 2696828T3, U.S. Pat. Nos. 10,196,641, 10,774,071, 11,279,720, US 2017/0101464A1, US 2021/0269807A1 and US 2022/0168333A1, the contents of each are incorporated by reference.

In some embodiments, the compounds may be described as 3-methylideneoxan-4-one compounds, derivatives thereof, which may be used in methods of treating a disease or disorder in a subject in need thereof, such as diseases and disorders that are associated with telomerase activity such as cancer. (See U.S. Publication No. 2021/0070725, the contents of which is incorporated herein by reference in its entirety). The disclosed compounds may be formulated in a pharmaceutical composition for treating diseases and disorders that are associated with telomerase activity such as cancer.

In some embodiments, the disclosed compounds have one of the following formulas or a salt or hydrate thereof:

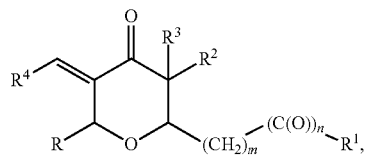

which is a keto form of the disclosed compounds and

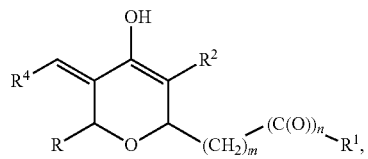

which is an enol form of the disclosed compounds, where:

R is selected from hydrogen, alkyl (e.g., methyl, propyl, isopropyl, n-butyl, or isobutyl), cycloalkyl (e.g., cyclohexyl), aryl (e.g., phenyl), alkyl (aryl) (e.g., benzyl), and R is optionally substituted at one or more positions with halo;

m is selected from 0-3;

n is 0 or 1;

$R^1$ is selected from hydrogen, alkyl, cycloalkyl, aryl, arylalkyl (aryl) (e.g., benzyl), aldehyde, carboxyalkyl, alkynyl; or $R^1$ has a formula selected from —NH-aryl, —N-diaryl, or —NH-aryl (aryl), optionally wherein aryl is selected from phenyl (e.g., wherein $R^1$ is selected from —NH-phenyl, —N-diphenyl, or —NH-benzyl) or fluorenyl (e.g., wherein $R^1$ is —NH-fluoren-9-yl) and optionally wherein $R^1$ is substituted at one or more positions with alkyl (e.g., methyl), alkoxy (e.g., methoxy), hydroxyl, halo (e.g., F, Cl, or Br), and haloalkyl (e.g., trifluoromethyl); or $R^1$ has a formula selected from

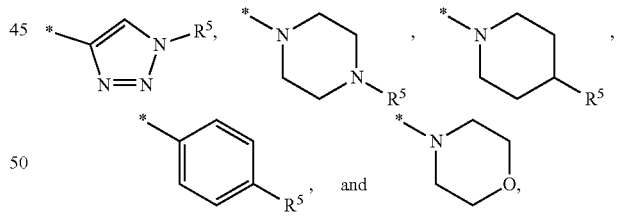

wherein $R^5$ is selected from hydrogen, alkyl, or benzyl, or $R^5$ has a formula selected from —C(O)—NH$_2$, —C(O)—NH-alkyl (e.g., —C(O)—NH—CH$_3$), —C(O)-phenyl, —C(O)—NH-phenyl, —C(O)—NH-benzyl, —CH$_2$—NH-phenyl, —NH—C(O)-phenyl, —N-alkyl-cycloalkyl, —O-phenyl, —O-benzyl, and $R^5$ optionally is substituted at one or more positions with alkyl (e.g., methyl), alkoxy (e.g., methoxy), hydroxyl, halo (e.g., F, Cl, or Br), and haloalkyl (e.g., trifluoromethyl), for example, wherein $R^5$ is substituted at one or more positions of a phenyl group;

$R^2$ is selected from hydrogen, alkyl, alky (aryl) (e.g., benzyl), carbonyl, carboxyl, and and —C(O)—O—$R^6$, wherein $R^6$ is selected from alkyl, cycloalkyl, alkyl (cycloalkyl), aryl, alkyl (aryl), and alkyl (alkoxy) (e.g., where $R^2$ is —C(O)—O-methyl, —C(O)—O-isopropyl, or —C(O)—O-benzyl);

$R^3$ is hydrogen or alkyl (e.g., methyl);

$R^4$ is hydrogen or alkyl (e.g., methyl);

optionally, wherein at least one of R, $R^1$, $R^2$, $R^3$, and $R^4$ is not hydrogen.

In some embodiments of the disclosed compounds, R is alkyl which may be straight chain or branched alkyl. In some embodiments, R is selected from: —CH$_3$, —CH$_2$—CH(CH$_3$)$_2$, and —CH$_2$—CH$_2$-phenyl.

In some embodiments, $R^1$ may be selected from:

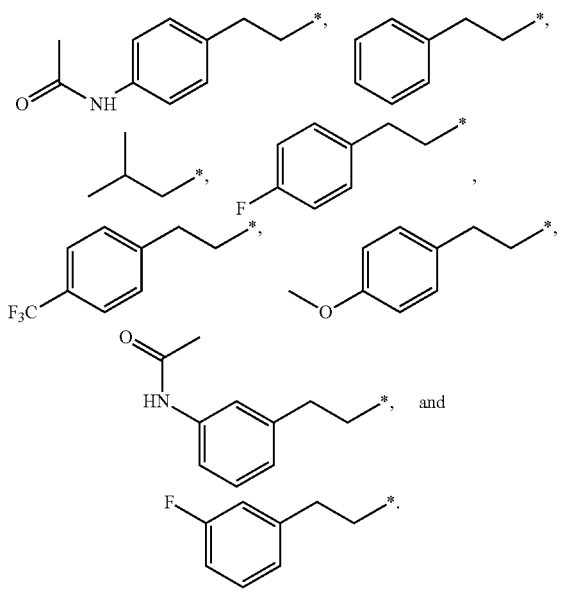

In further embodiments, $R^1$ is

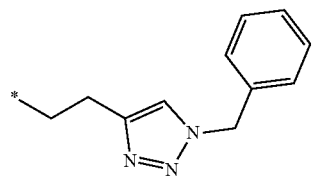 [SMILES: *CCc1cn(Cc2ccccc2)nn1]

and $R^1$ optionally is substituted at one or more positions with halo, for example where $R^1$ includes a halo substituted phenyl moiety.

In some embodiments, $R^2$ includes an ester linkage. In some embodiments, $R^2$ is selected from:

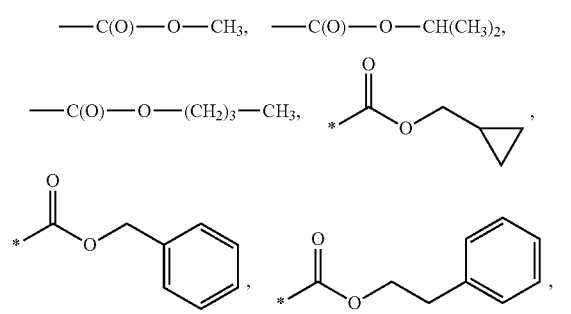

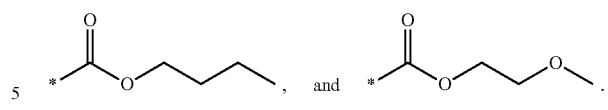

In some embodiments, $R^3$ is alkyl. In some embodiments, $R^3$ is selected from: —CH$_3$, —CH$_2$—CH$_3$, and —CH(CH$_3$)$_2$.

In some embodiments, the disclosed compounds may have a formula selected from:

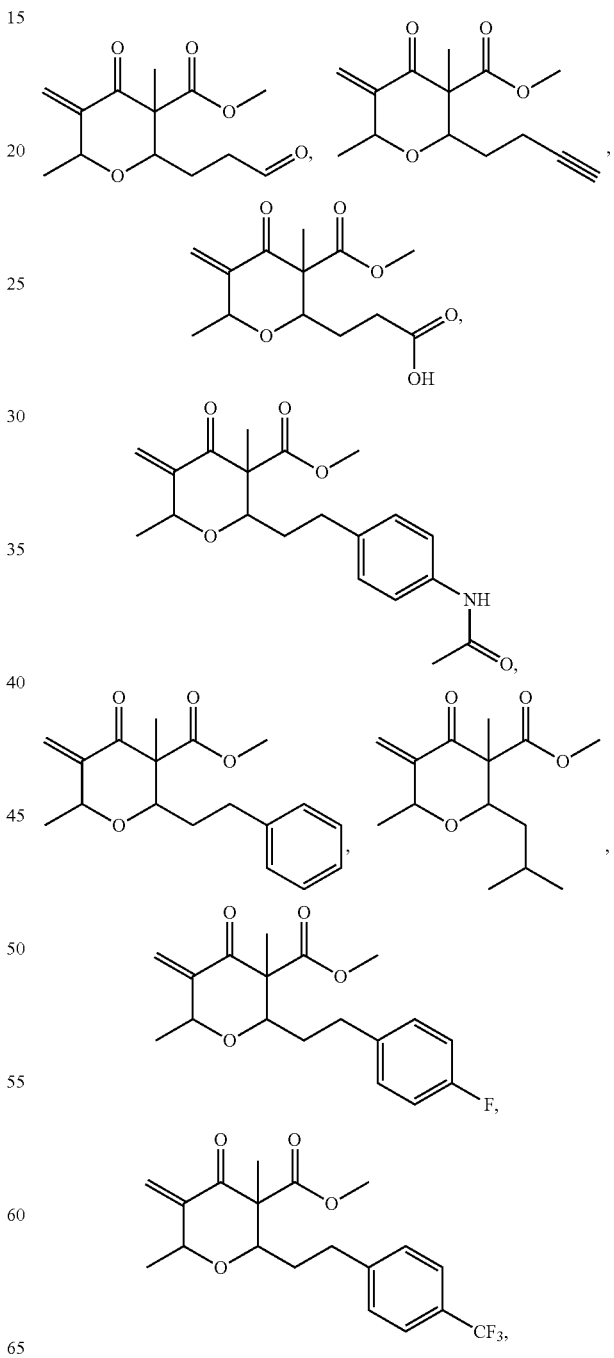

-continued
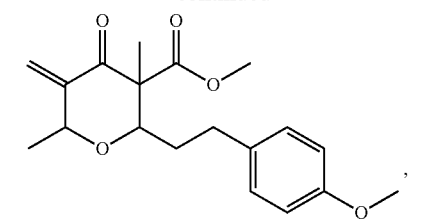,
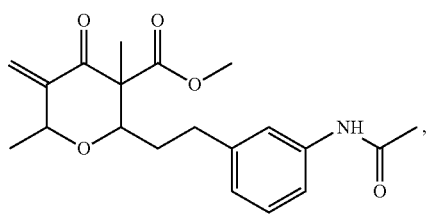,
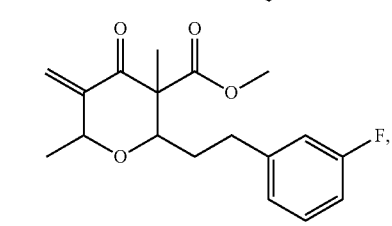,
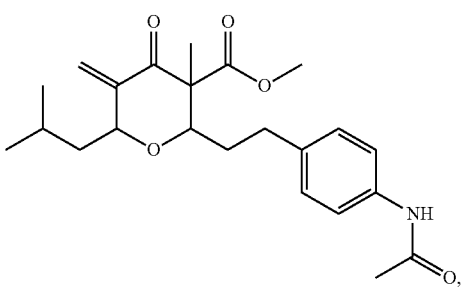,
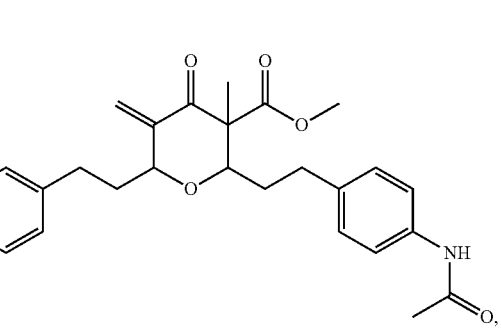,
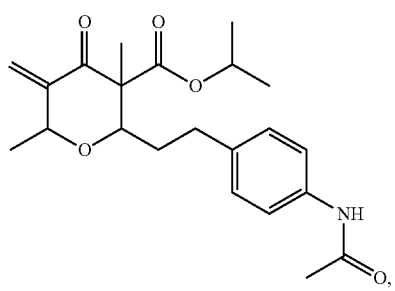,
-continued
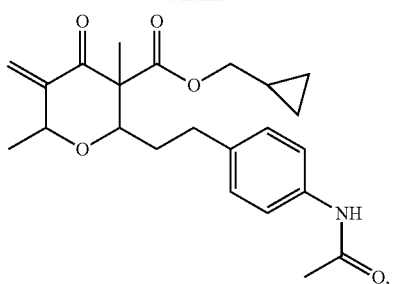,
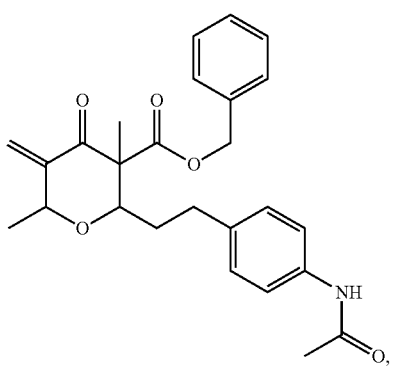,
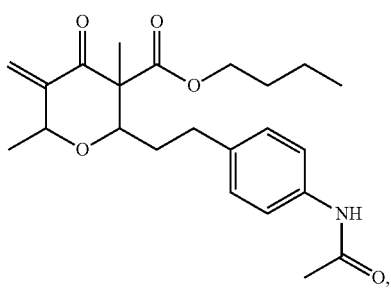,
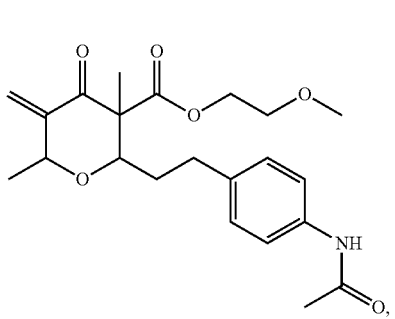,
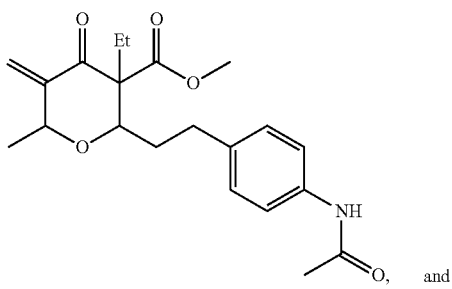, and

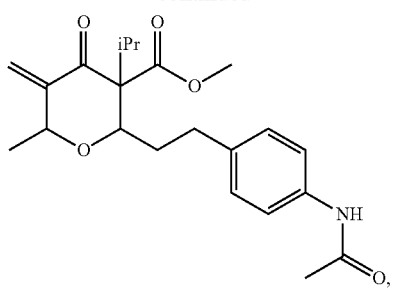
In further embodiments, the compound has a formula selected from:
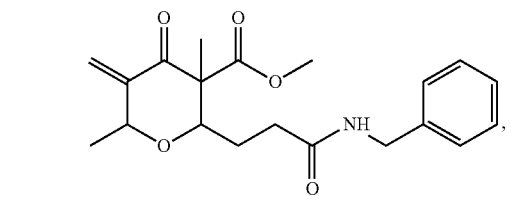
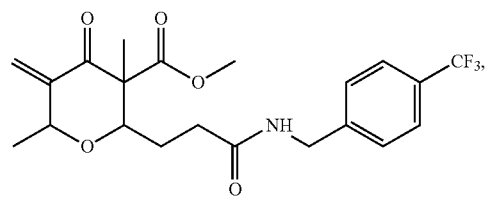
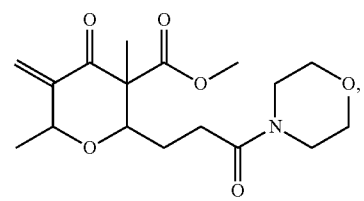
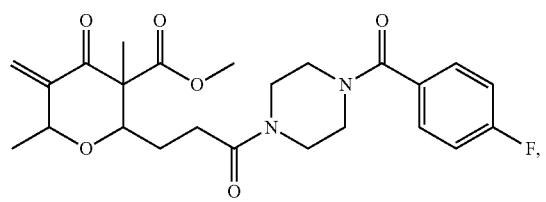
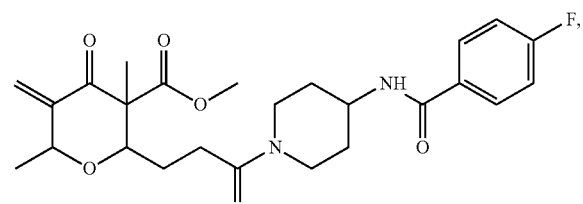
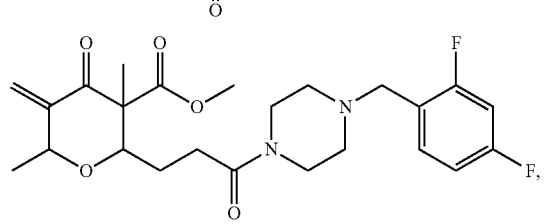
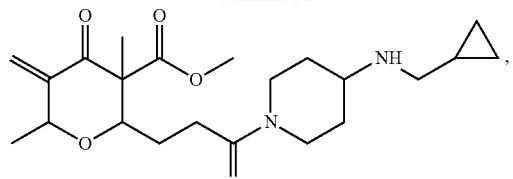
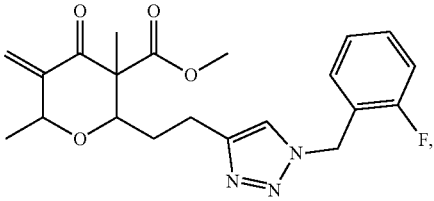
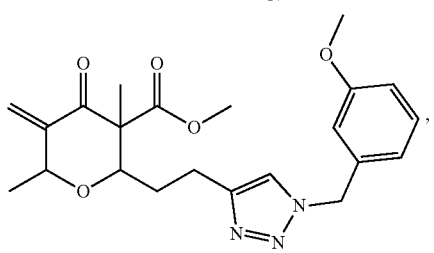
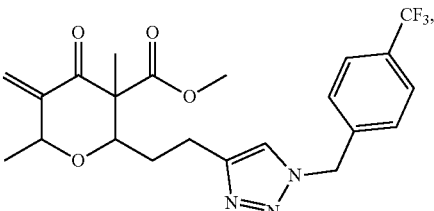
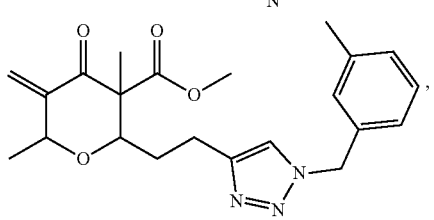
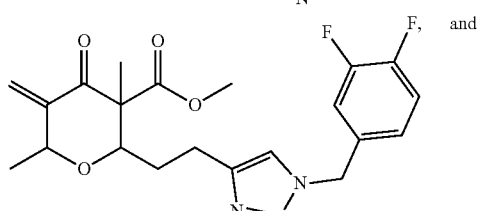
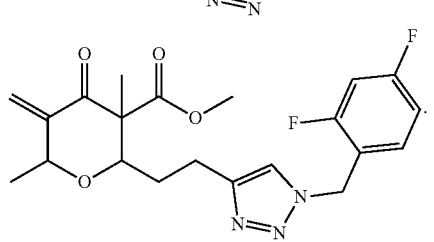
The disclosed compounds may include specific stereoisomers or enantiomers. In some embodiments, the disclosed compounds have a formula selected from:

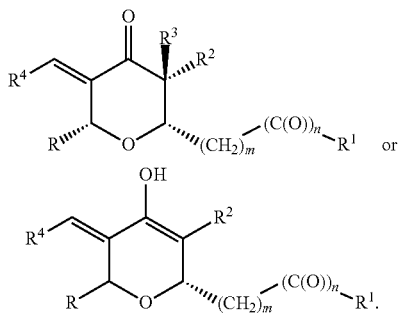

In some embodiments, the disclosed compounds may be selected from:

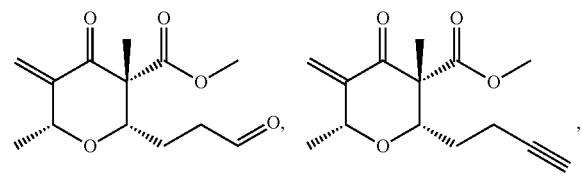

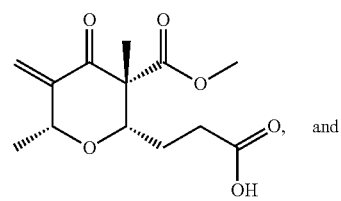

(NU-1)

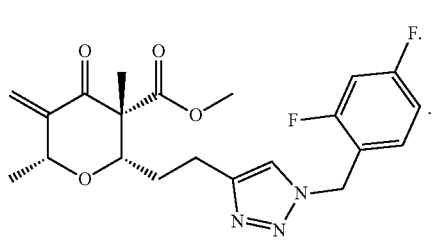

NU-1 is an irreversible TERT inhibitor. Docking NU-1 to the tcTERT crystal structure (Mitchell et al., 2010) or the hTERT cryo-EM model (Ghanim et al., 2021) reveals multiple interactions that favor covalent interaction between the NU-1 exomethylene and a conserved cysteine in the primer grip. While an irreversible, covalent inhibitor such as NU-1 might enable long-term, uninterrupted suppression of TERT as may be required to force telomere erosion, this would affect not only tumors but also proliferating normal tissue stem and progenitor cells. Instead, we have explored using NU-1 for short intervals which may expose TERT addiction and/or sensitize tumors to ionizing radiation (IR), potentially allowing tumors to be targeted while sparing other tissues.

In further embodiments, the disclosed compounds may be selected from

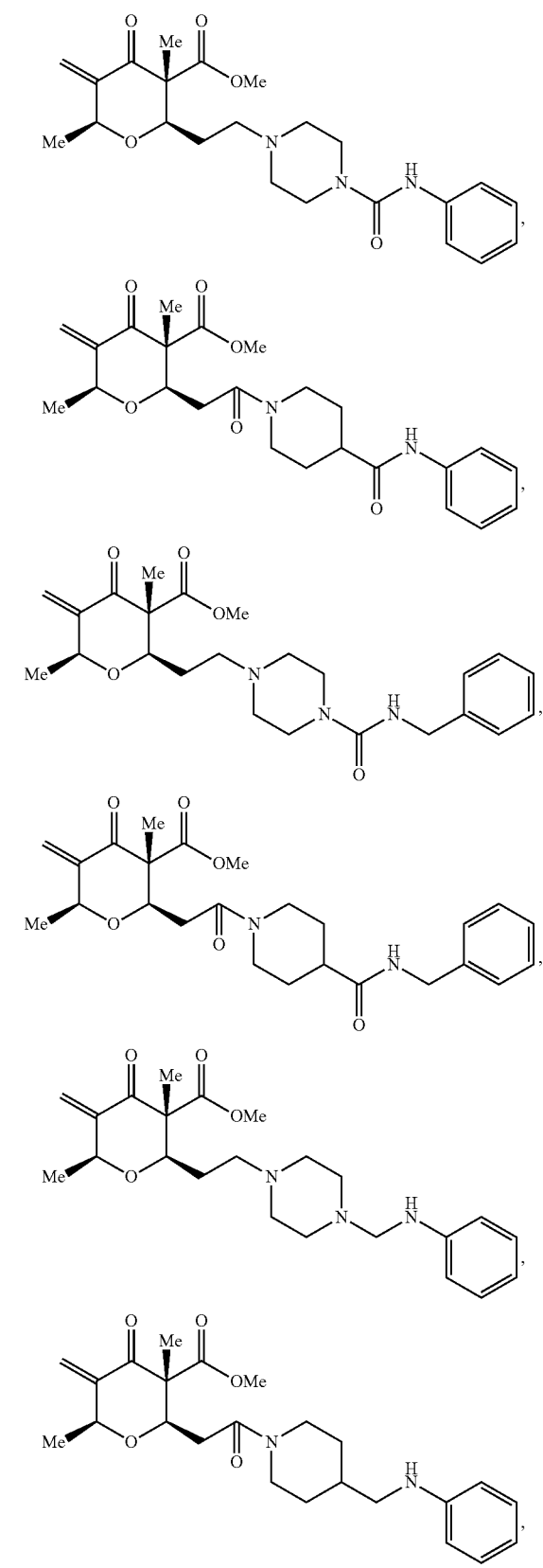

27
-continued
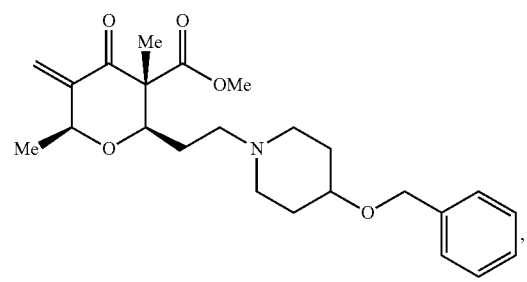
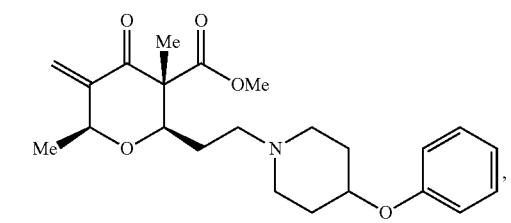
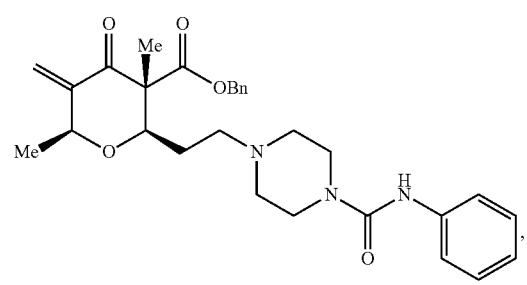
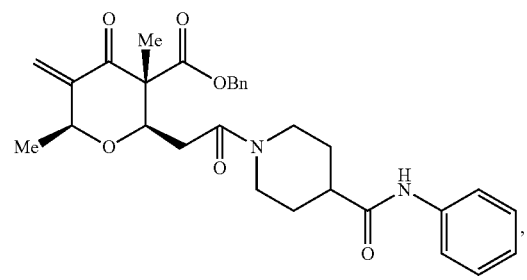
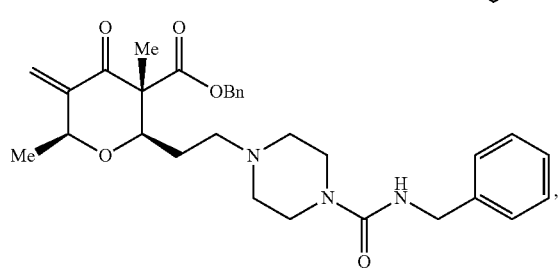
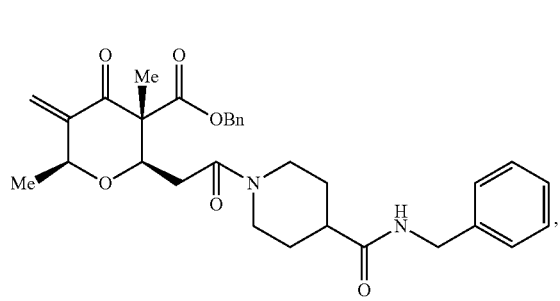
28
-continued
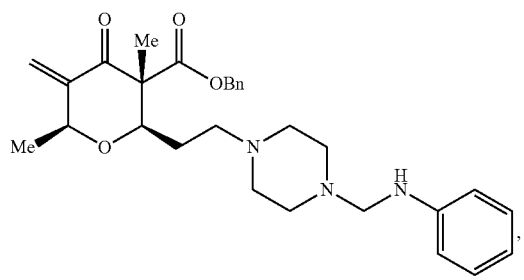
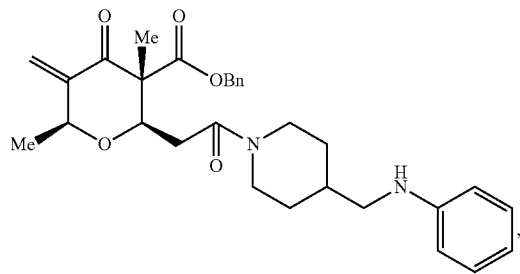
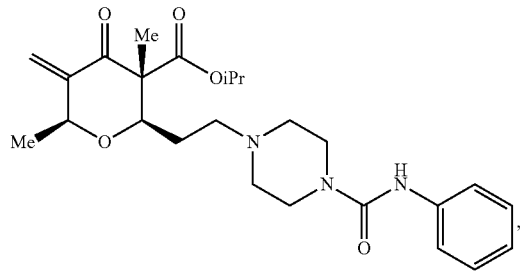
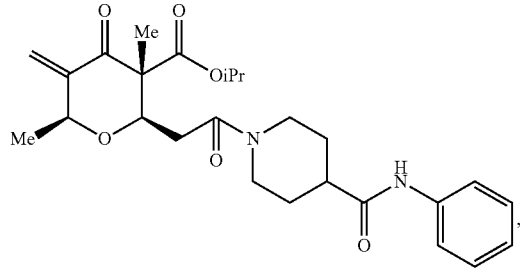
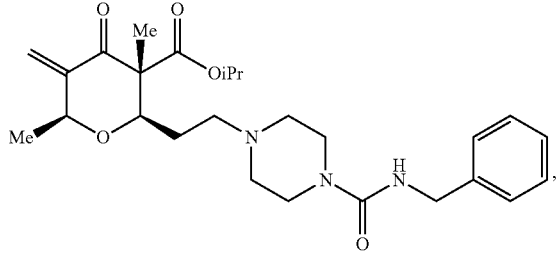
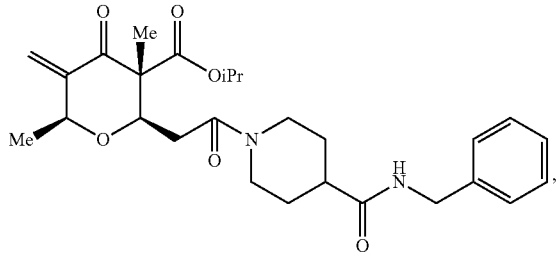

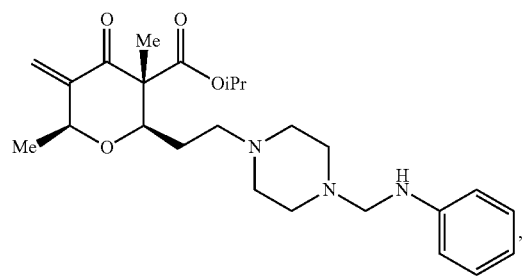
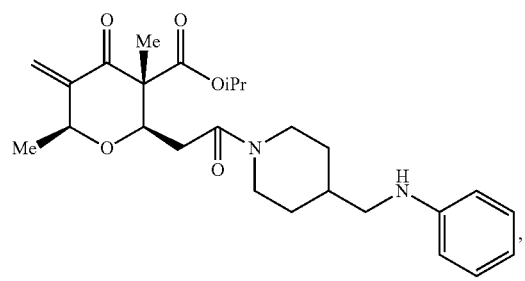
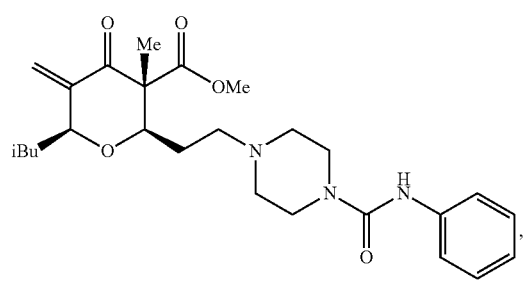
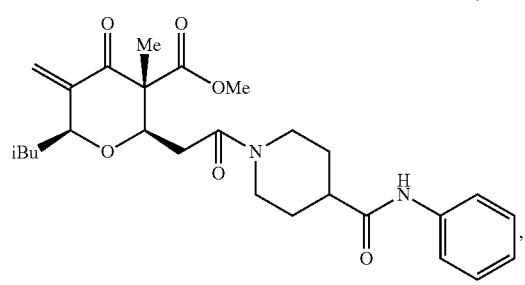
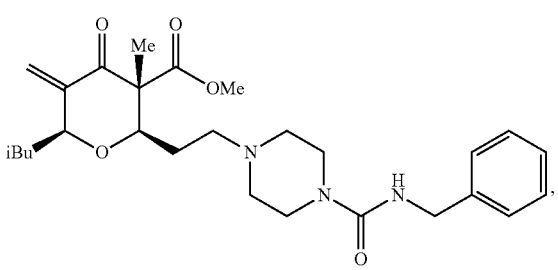
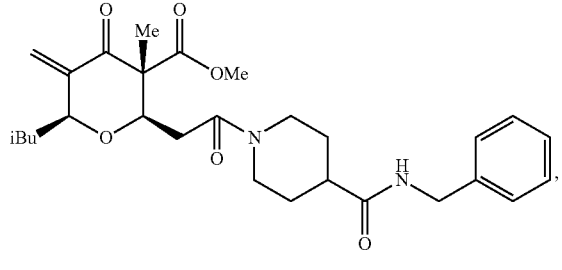
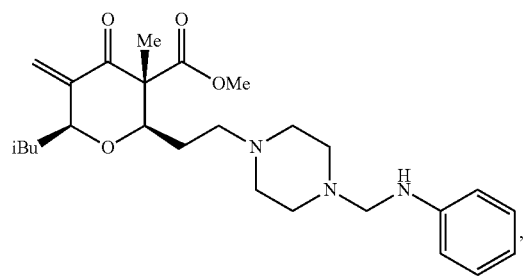
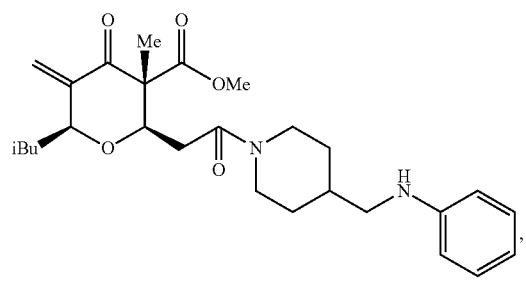
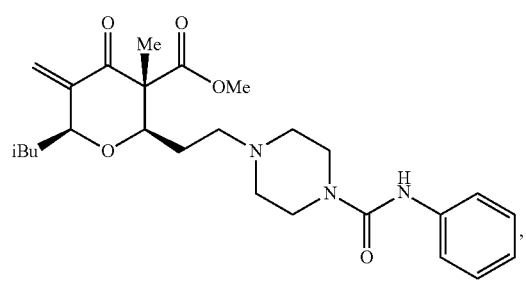
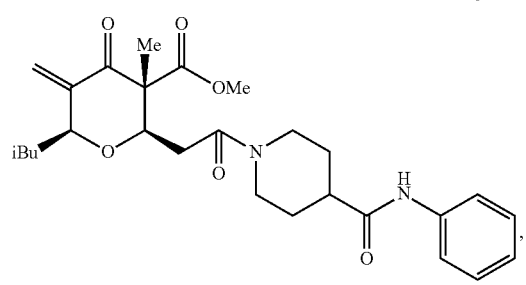
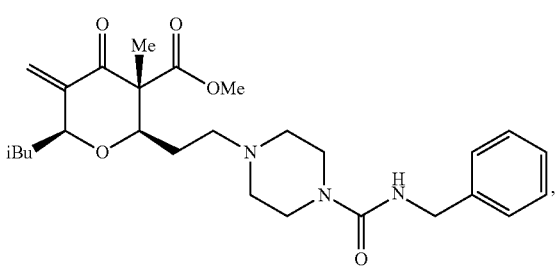
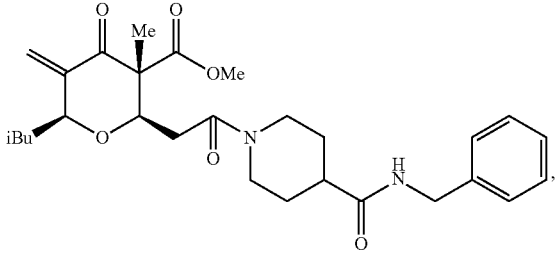

-continued
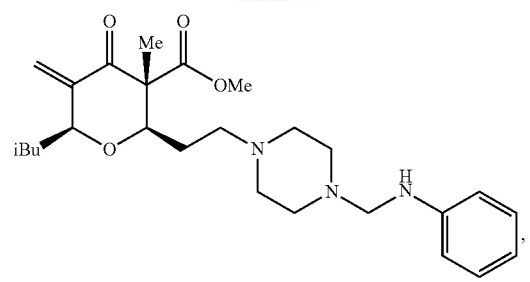
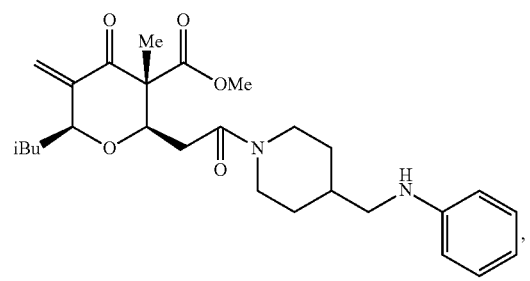
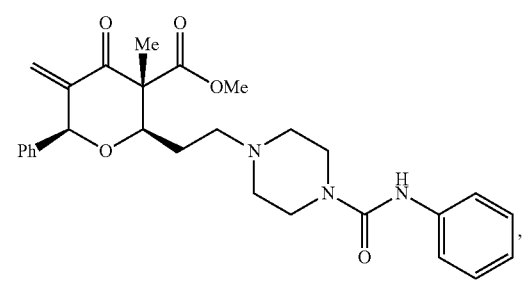
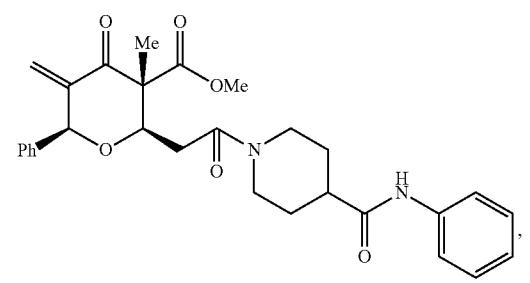
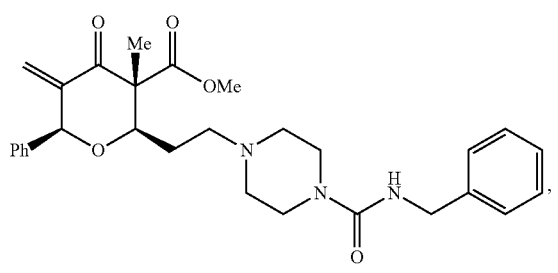
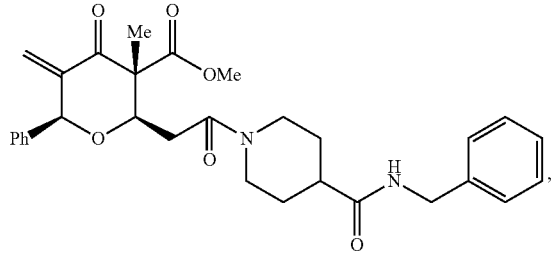
-continued
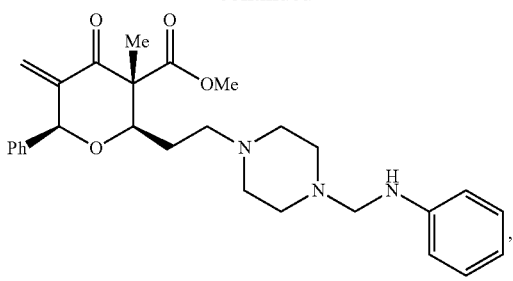
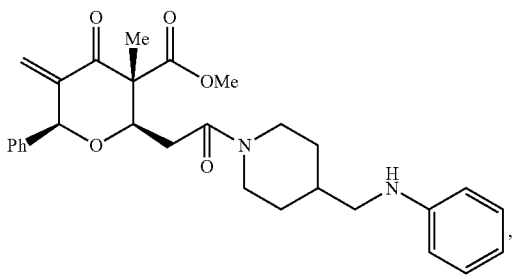
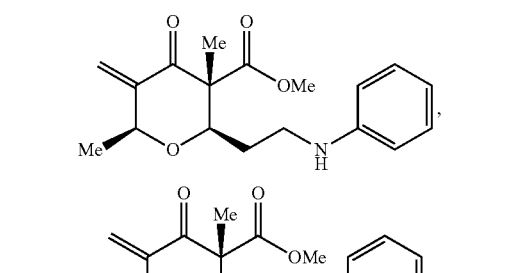
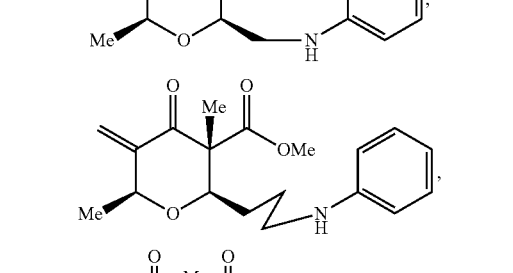
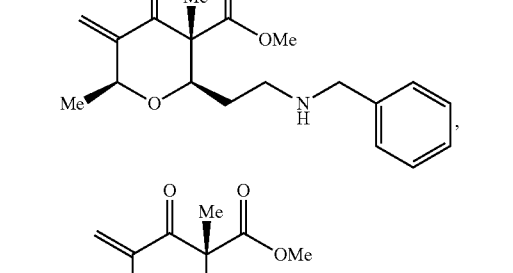
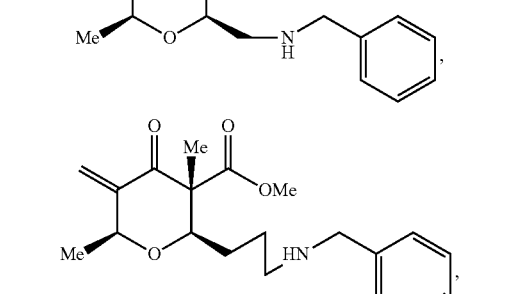

33
-continued
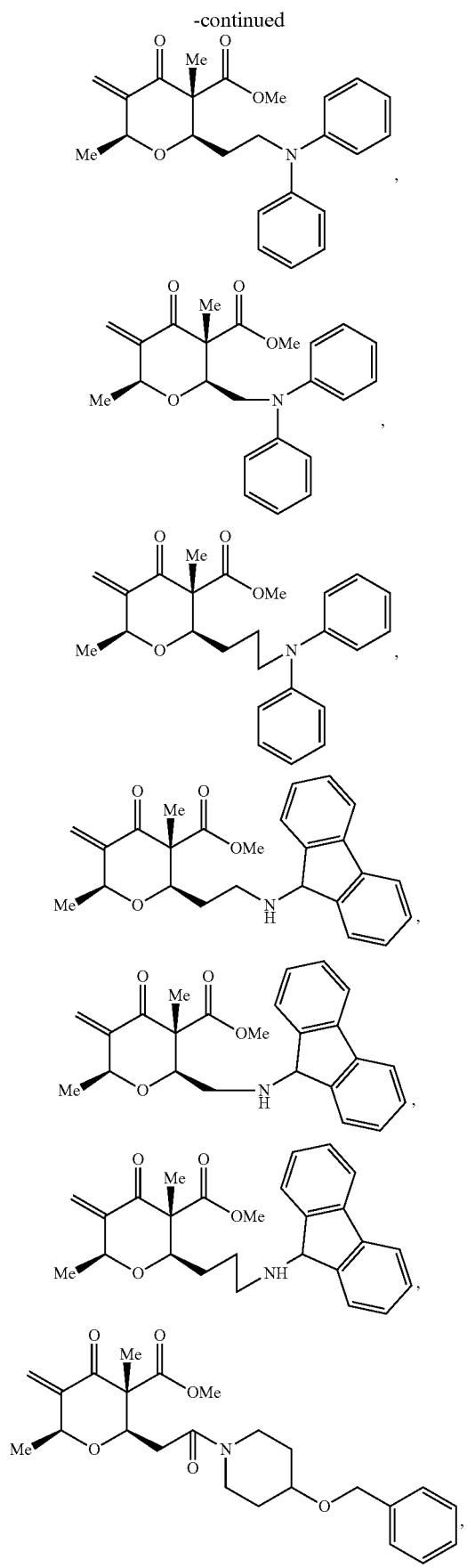
34
-continued
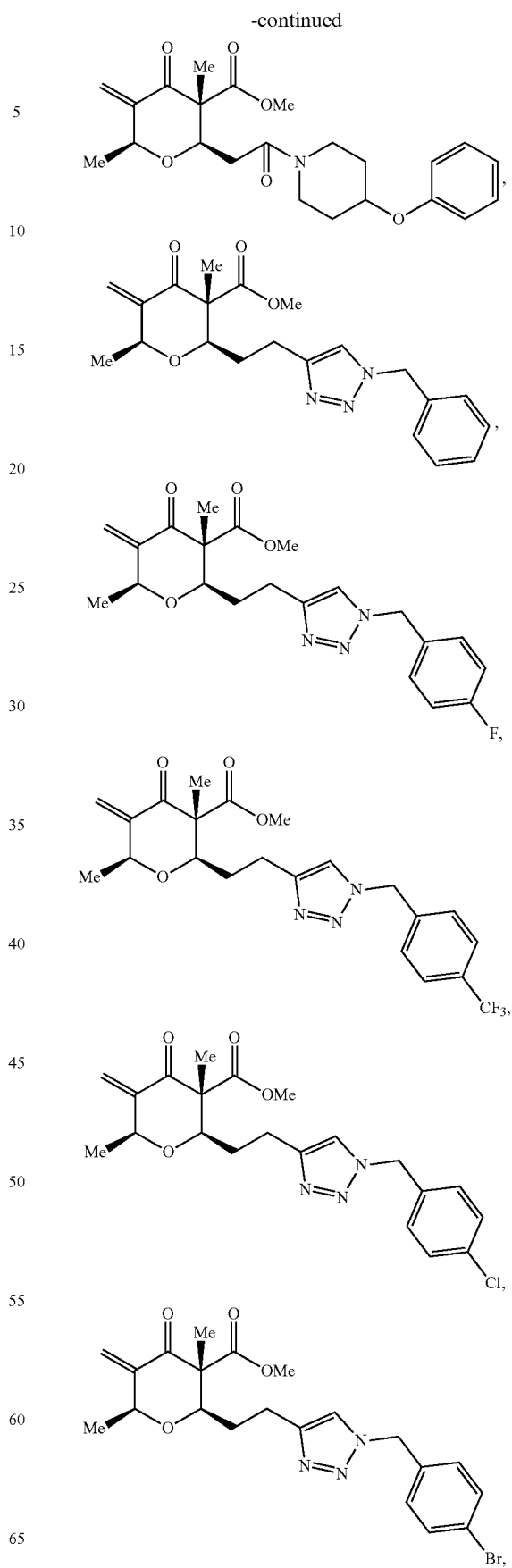

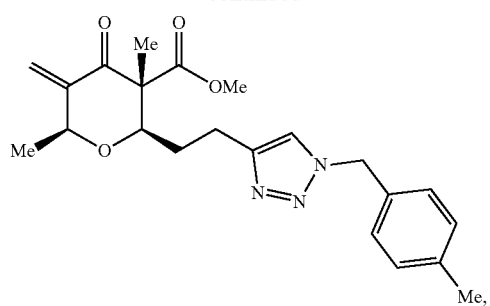
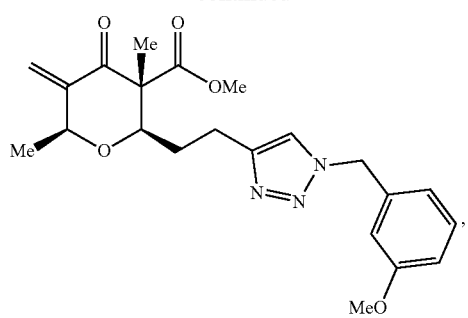
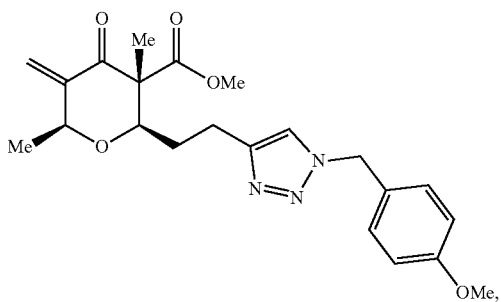
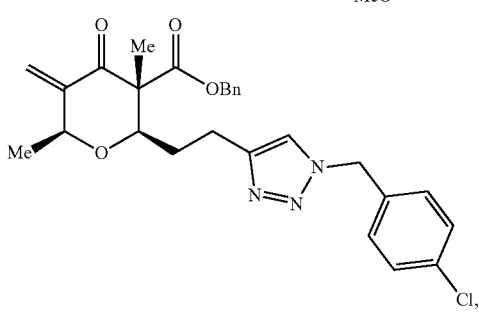
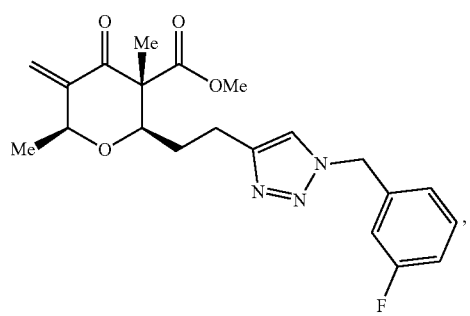
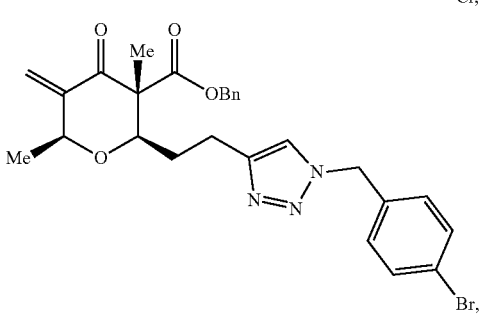
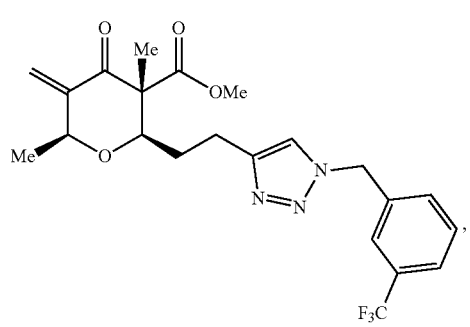
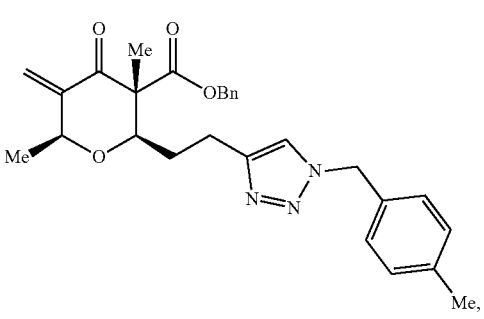
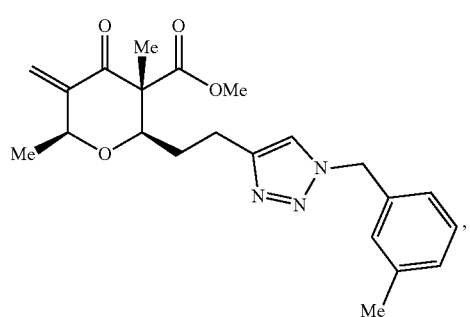
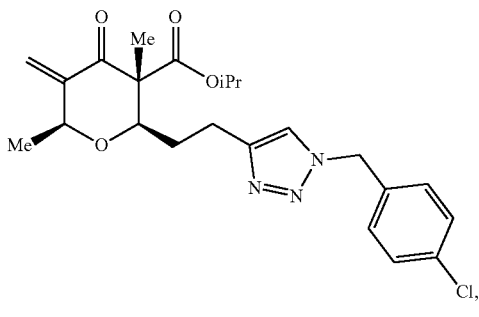

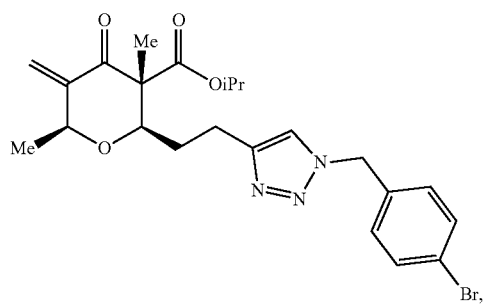
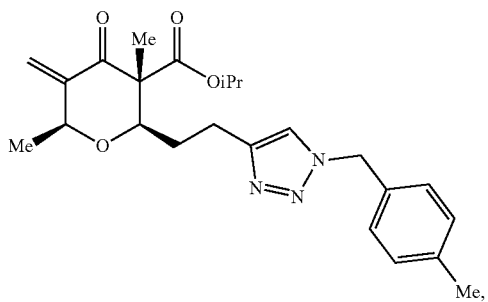
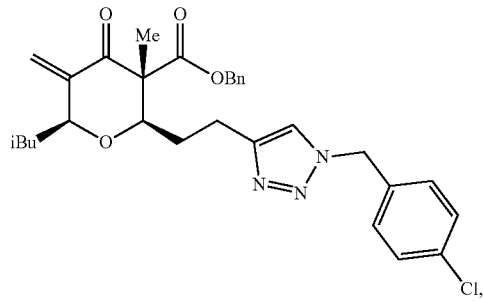
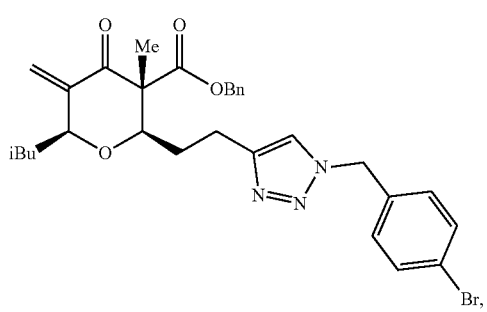
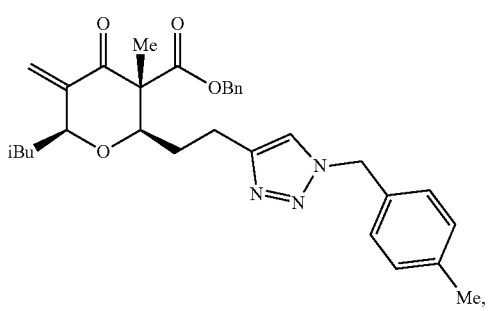
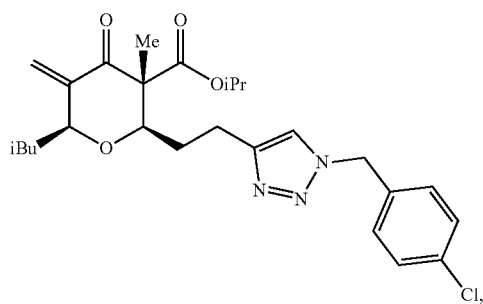
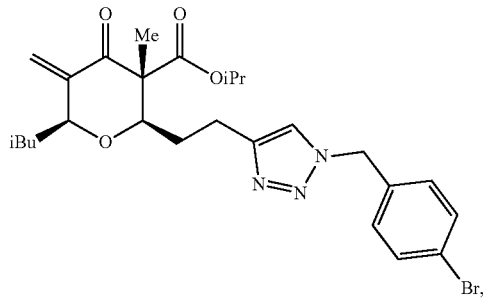
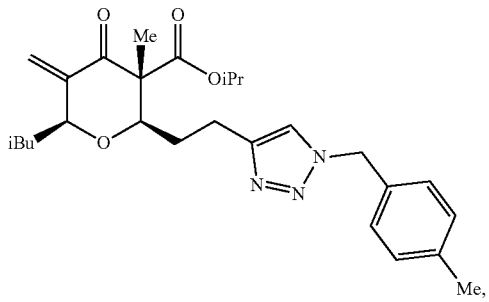
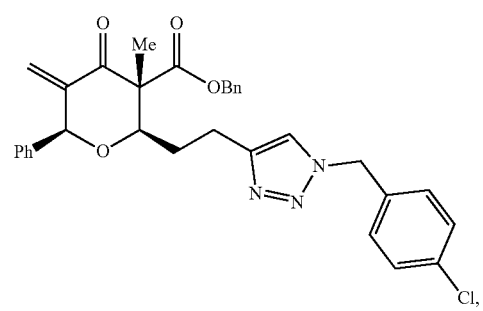
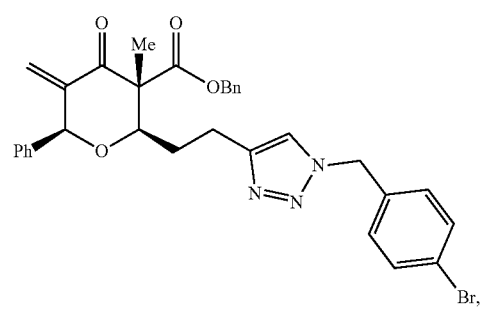

-continued
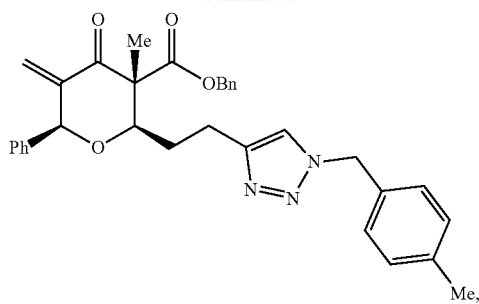
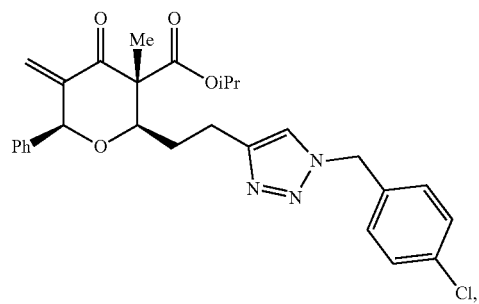
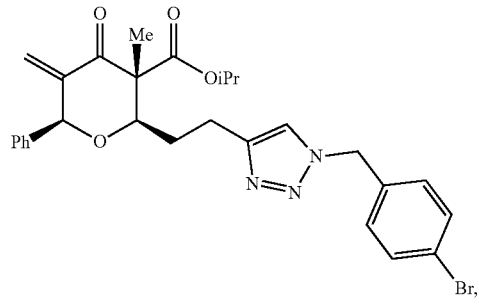
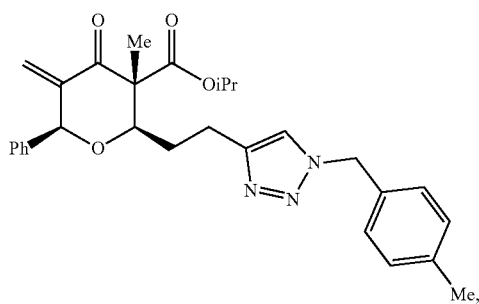
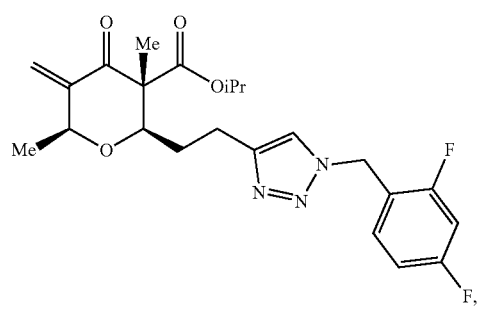
-continued
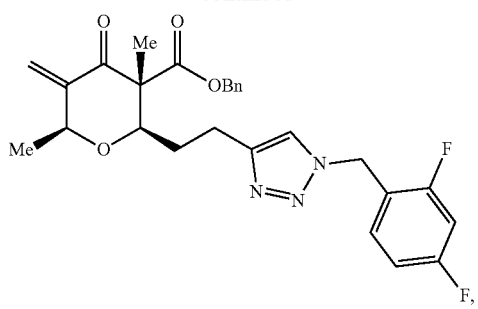
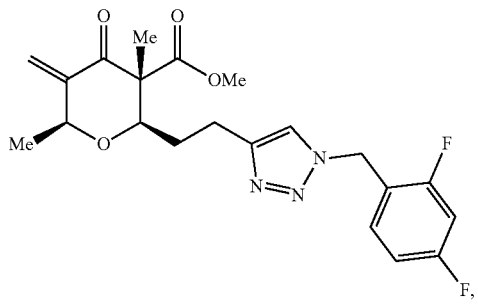
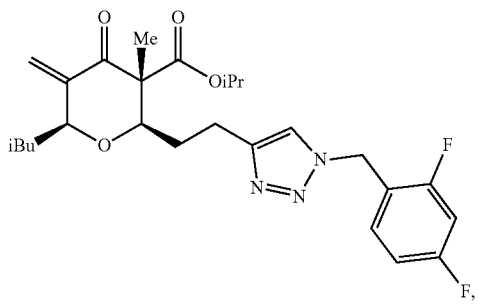
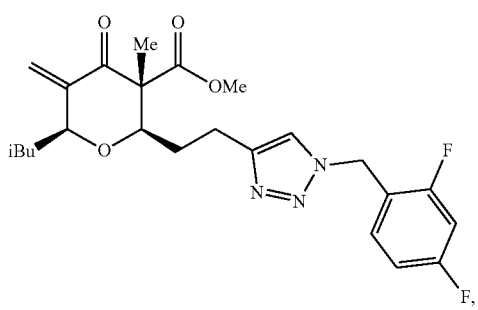

-continued
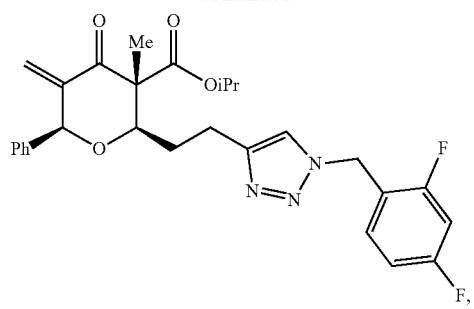
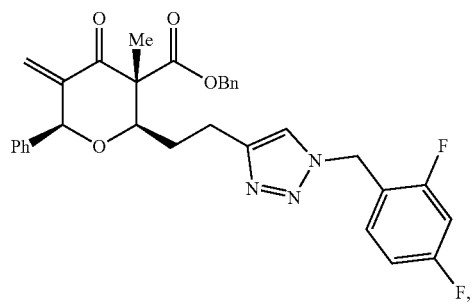
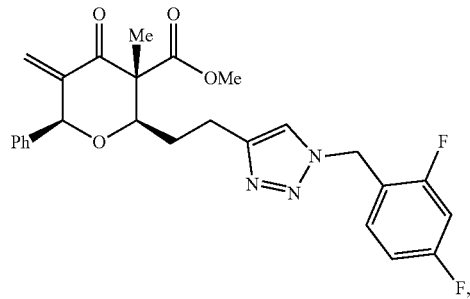
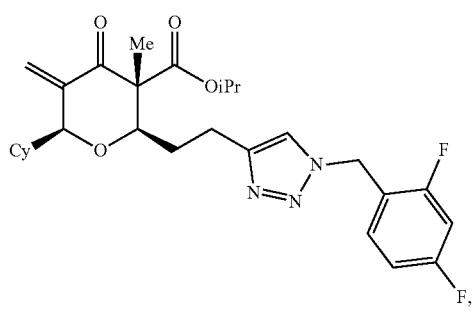
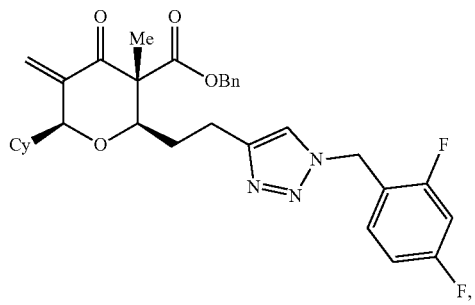
-continued
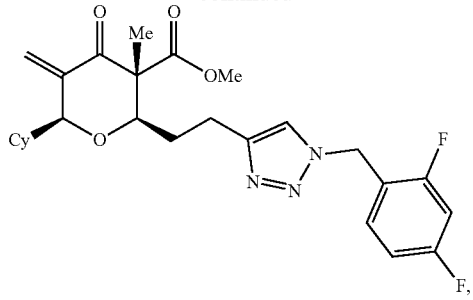
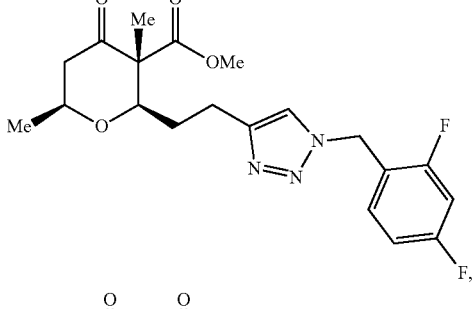
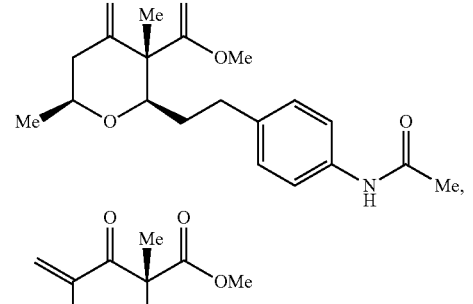
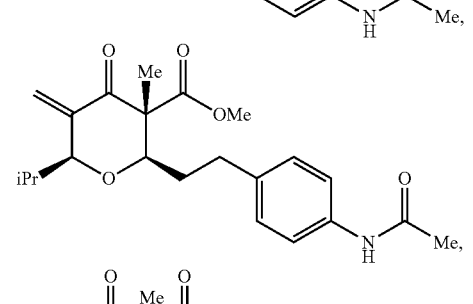
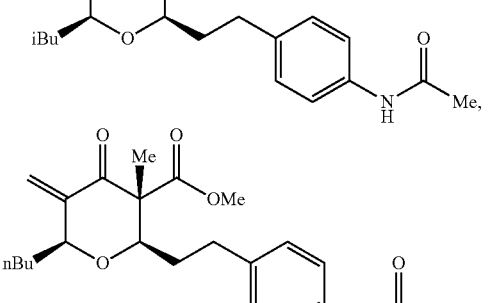
and

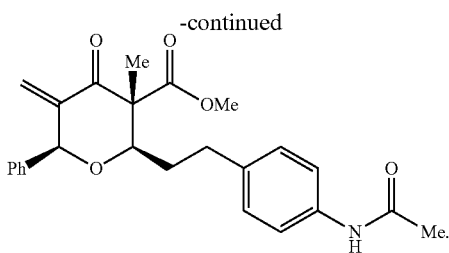

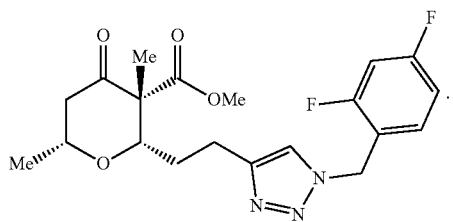 [SMILES: COC(=O)[C@@]1(C)C(=O)C[C@@H](C)O[C@H]1CCc1cn(Cc2ccc(F)cc2F)nn1]

Inhibition of Telomerase Reverse Transcriptase Activity

The disclosed compounds may be synthesized by modifying methods that are disclosed in the art. First, tetrahydropyran-4-ones precursors of the disclosed compounds may be prepared from dioxinones as disclosed in the art. (See Morris et al., "Stereoselective Synthesis of Tetrahydropyran-4-ones from Dioxinones Catalyzed by Scandium (III) Triflate," Org. Lett. 2005, Vol. 7, No. 6, 1113-1116; the content of which is incorporated herein by reference in its entirety). The tetrahydropyran-4-ones precursors of thus obtained may have a formula selected from:

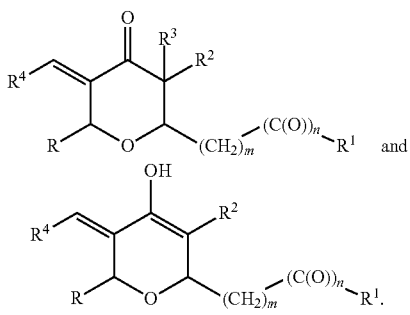

The tetrahydropyran-4-ones precursors may be subjected to α-methylation and then α-methylenation (i.e. at the 3-carbon position) to provide the disclosed 3-methylidene-oxan-4-one compounds and derivatives thereof.

In some embodiments, the disclosed compounds may lack an α-methylene group (e.g., where the methylene group is replaced with two hydrogen atoms). For example, the disclosed compounds may have a formula selected from:

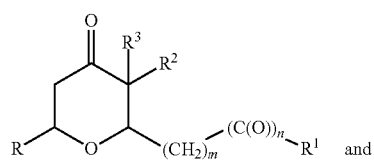

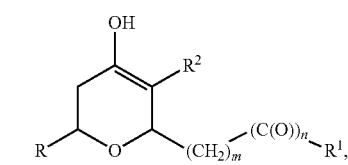

wherein R, $R^1$, $R^2$, and $R^3$ are as defined above for the compounds having an α-methylene group. An exemplary compound is NU-2

The compounds disclosed herein preferably inhibit the biological activity of telomerase, such as the reverse transcriptase activity of telomerase (TERT). In some embodiments, the compounds decrease telomerase activity relative to a control (e.g., by at least about 10%, 20%, 30%, 40%, 50%, 60%, 70%, 80%, 90%, 100%, 200%, 300%, 400%, 500%, 600%, 700%, 800%, 900%, 1000% or more (or within a range bounded by any of these values)). In some embodiments, an $IC_{50}$ value for a compound in regard to inhibiting telomerase activity may be determined and preferably the compound has an $IC_{50}$ value of less than about 10 µM, 5 µM, or 1 µM, 0.5 µM, 0.1 µM, 0.05 µM, 0.01 µM, 0.005 µM, or 0.001 µM (or within a range bounded by any of these values).

The disclosed compounds may inhibit the growth of cells that express telomerase (preferably by at least 50%, 60%, 70%, 80%, 90%, 95%, 96%, 97%, 98%, or 99% at a concentration of less than about 100 µM, 50 µM, 10 µM, 1 µM, 0.1 µM, 0.05 µM, 0.01 µM, 0.005 µM, 0.001 µM, or less). Concentration ranges also are contemplated herein, for example, a concentration range bounded by end-point concentrations selected from 0.001 µM, 0.005 µM, 0.01 µM, 0.5 µM, 0.1 µM, 1.0 µM, 10 µM, and 100 µM.

The disclosed compounds may be effective in inhibiting cell proliferation of cancer cells, including cancer cells that express telomerase and whose proliferation is inhibiting by inhibiting the biological activity of telomerase. The disclosed compounds may be effective in inhibiting cell proliferation of one or more types of cancer cells including: multiple myeloma cells, such as MM.1S cells; leukemia cells, such as CCRF-CEM, HL-60(TB), MOLT-4, RPMI-8226 and SR; non-small lung cancer cells, such as A549/ATCC, EKVX, HOP-62, HOP-92, NCI-H226, NCI-H23, NCI-H322M, NCI-H460 and NCI-H522; colon cancer cells, such as COLO 205, HCC-2998, HCT-116, HCT-15, HT29, KM12 and SW-620; CNS: SF-268, SF-295, SF-539, SNB-19, SNB-75 and U251; melanoma cancer cells, such as LOX IMVI, MALME-3M, M14, MDA-MB-435, SK-MEL-2, SK-MEL-28, SK-MEL-5, UACC-257 and UACC-62; ovarian cancer cells, such as IGR-OV1, OVCAR-3, OVCAR-4, OVCAR-5, OVCAR-8, NCI/ADR-RES and SK-OV-3; renal cancer cells, such as 786-0, A498, ACHN, CAKI-1, RXF 393, SN12C, TK-10 and UO-31; prostate cancer cells, such as DU-145 and PC-3; pancreatic cancer cells, such as PANC-1, AsPC-1, KP-3, BxPC-3, TCC-PAN2, and MIA PaCa-2. AsPC-1, BxPC-3 and MIA PaCa-2; and breast cancer cells, such as MCF7, MDA-MB-231/ATCC, MDA-MB-468, HS 578T, BT-549 and T-47D.

Cell proliferation and inhibition thereof by the presently disclosed compounds may be assessed by cell viability methods disclosed in the art including colorimetric assays that utilize dyes such as MTT, XTT, and MTS to assess cell viability. Preferably, the disclosed compounds have an $IC_{50}$ of less than about 10 µM, 5 µM, 1 µM, 0.5 µM, 0.01 µM, 0.005 µM, 0.001 µM or lower in the selected assay.

The disclosed compounds may be formulated as anti-cancer therapeutics. The disclosed compounds and molecules also may be formulated as anti-inflammation therapeutics.

The compounds utilized in the methods disclosed herein may be formulated as pharmaceutical compositions that include: (a) a therapeutically effective amount of one or more compounds and molecules as disclosed herein; and (b) one or more pharmaceutically acceptable carriers, excipients, or diluents. The pharmaceutical composition may include the compound in a range of about 0.1 to 2000 mg (preferably about 0.5 to 500 mg, and more preferably about 1 to 100 mg). The pharmaceutical composition may be administered to provide the compound at a daily dose of about 0.1 to about 1000 mg/kg body weight (preferably about 0.5 to about 500 mg/kg body weight, more preferably about 50 to about 100 mg/kg body weight). In some embodiments, after the pharmaceutical composition is administered to a subject (e.g., after about 1, 2, 3, 4, 5, or 6 hours post-administration), the concentration of the compound at the site of action may be within a concentration range bounded by end-points selected from 0.001 µM, 0.005 µM, 0.01 µM, 0.5 µM, 0.1 µM, 1.0 µM, 10 µM, and 100 µM (e.g., 0.1 µM-1.0 µM).

The disclosed compounds and molecules and pharmaceutical compositions comprising the disclosed compounds and molecules may be administered in methods of treating a subject in need thereof. For example, in the methods of treatment a subject in need thereof may include a subject having a cell proliferative disease, disorder, or condition such as cancer (e.g., cancers such as multiple myeloma, leukemia, non-small cell lung cancer, colon cancer, cancer of the central nervous system, melanoma, ovarian cancer, renal cancer, prostate cancer, pancreatic cancer, and breast cancer).

In some embodiments of the disclosed treatment methods, the subject may be administered a dose of a compound as low as 1.25 mg, 2.5 mg, 5 mg, 7.5 mg, 10 mg, 12.5 mg, 15 mg, 17.5 mg, 20 mg, 22.5 mg, 25 mg, 27.5 mg, 30 mg, 32.5 mg, 35 mg, 37.5 mg, 40 mg, 42.5 mg, 45 mg, 47.5 mg, 50 mg, 52.5 mg, 55 mg, 57.5 mg, 60 mg, 62.5 mg, 65 mg, 67.5 mg, 70 mg, 72.5 mg, 75 mg, 77.5 mg, 80 mg, 82.5 mg, 85 mg, 87.5 mg, 90 mg, 100 mg, 200 mg, 500 mg, 1000 mg, or 2000 mg once daily, twice daily, three times daily, four times daily, once weekly, twice weekly, or three times per week in order to treat the disease or disorder in the subject. In some embodiments, the subject may be administered a dose of a compound as high as 1.25 mg, 2.5 mg, 5 mg, 7.5 mg, 10 mg, 12.5 mg, 15 mg, 17.5 mg, 20 mg, 22.5 mg, 25 mg, 27.5 mg, 30 mg, 32.5 mg, 35 mg, 37.5 mg, 40 mg, 42.5 mg, 45 mg, 47.5 mg, 50 mg, 52.5 mg, 55 mg, 57.5 mg, 60 mg, 62.5 mg, 65 mg, 67.5 mg, 70 mg, 72.5 mg, 75 mg, 77.5 mg, 80 mg, 82.5 mg, 85 mg, 87.5 mg, 90 mg, 100 mg, 200 mg, 500 mg, 1000 mg, or 2000 mg, once daily, twice daily, three times daily, four times daily, once weekly, twice weekly, or three times per week in order to treat the disease or disorder in the subject. Minimal and/or maximal doses of the compounds and molecules may include doses falling within dose ranges having as end-points any of these disclosed doses (e.g., 2.5 mg-200 mg).

In some embodiments, a minimal dose level of a compound for achieving therapy in the disclosed methods of treatment may be at least about 10, 20, 30, 40, 50, 60, 70, 80, 90, 100, 150, 200, 250, 300, 350, 400, 450, 500, 550, 600, 650, 700, 750, 800, 850, 900, 950, 1000, 1200, 1400, 1600, 1800, 1900, 2000, 3000, 4000, 5000, 6000, 7000, 8000, 9000, 10000, 15000, or 20000 ng/kg body weight of the subject. In some embodiments, a maximal dose level of a compound for achieving therapy in the disclosed methods of treatment may not exceed about 10, 20, 30, 40, 50, 60, 70, 80, 90, 100, 150, 200, 250, 300, 350, 400, 450, 500, 550, 600, 650, 700, 750, 800, 850, 900, 950, 1000, 1200, 1400, 1600, 1800, 1900, 2000, 3000, 4000, 5000, 6000, 7000, 8000, 9000, 10000, 15000, or 20000 ng/kg body weight of the subject. Minimal and/or maximal dose levels of the compounds and molecules for achieving therapy in the disclosed methods of treatment may include dose levels falling within ranges having as end-points any of these disclosed dose levels (e.g., 500-2000 ng/kg body weight of the subject).

The compounds for use according to the methods of disclosed herein may be administered as a single compound or a combination of compounds. For example, a compound that inhibits the biological activity of telomerase may be administered as a single compound or in combination with another compound that inhibits the biological activity of the telomerase or that has a different pharmacological activity.

In some embodiments, the disclosed compounds may be radioactive. In some embodiments, the disclosed compounds are conjugated either directly or indirectly via a linker to a radioactive moiety. In some embodiments, the disclosed compounds emit particles selected from α, β+, β−, and γ.

In some embodiments, the disclosed compounds may be administered to a subject in need thereof in conjunction with a genotoxic therapy, such as radiotherapy or chemotherapy. In some embodiments, the subject is administered the disclosed compounds and subsequently the subject is administered the genotoxic therapy.

Pharmaceutical Compositions and Methods of Administration

The compounds disclosed herein may be administered as pharmaceutical compositions and, therefore, pharmaceutical compositions incorporating the compounds are considered to be embodiments of the subject matter disclosed herein. Such compositions may take any physical form which is pharmaceutically acceptable; illustratively, they can be orally administered pharmaceutical compositions. Such pharmaceutical compositions contain an effective amount of a disclosed compound, which effective amount is related to the daily dose of the compound to be administered. Each dosage unit may contain the daily dose of a given compound or each dosage unit may contain a fraction of the daily dose, such as one-half or one-third of the dose. The amount of each compound to be contained in each dosage unit can depend, in part, on the identity of the particular compound chosen for the therapy and other factors, such as the indication for which it is given. The pharmaceutical compositions disclosed herein may be formulated so as to provide quick, sustained, or delayed release of the active ingredient after administration to the patient by employing well known procedures.

As indicated above, pharmaceutically acceptable salts of the compounds are contemplated and also may be utilized in the disclosed methods. The term "pharmaceutically acceptable salt" as used herein, refers to salts of the compounds which are substantially non-toxic to living organisms. Typical pharmaceutically acceptable salts include those salts prepared by reaction of the compounds as disclosed herein with a pharmaceutically acceptable mineral or organic acid or an organic or inorganic base. Such salts are known as acid addition and base addition salts. It will be appreciated by the skilled reader that most or all of the compounds as disclosed herein are capable of forming salts and that the salt forms of pharmaceuticals are commonly used, often because they are more readily crystallized and purified than are the free acids or bases.

Acids commonly employed to form acid addition salts may include inorganic acids such as hydrochloric acid, hydrobromic acid, hydroiodic acid, sulfuric acid, phosphoric acid, and the like, and organic acids such as p-toluenesulfonic, methanesulfonic acid, oxalic acid, p-bromophenylsulfonic acid, carbonic acid, succinic acid, citric acid, benzoic acid, acetic acid, and the like. Examples of suitable pharmaceutically acceptable salts may include the sulfate, pyrosulfate, bisulfate, sulfite, bisulfate, phosphate, monohydrogenphosphate, dihydrogenphosphate, metaphosphate, pyrophosphate, bromide, iodide, acetate, propionate, decanoate, caprylate, acrylate, formate, hydrochloride, dihydrochloride, isobutyrate, caproate, heptanoate, propiolate, oxalate, malonate, succinate, suberate, sebacate, fumarate, maleat-, butyne-.1,4-dioate, hexyne-1,6-dioate, benzoate, chlorobenzoate, methylbenzoate, hydroxybenzoate, methoxybenzoate, phthalate, xylenesulfonate, phenylacetate, phenylpropionate, phenylbutyrate, citrate, lactate, alpha-hydroxybutyrate, glycolate, tartrate, methanesulfonate, propanesulfonate, naphthalene-1-sulfonate, naphthalene-2-sulfonate, mandelate, and the like.

Base addition salts include those derived from inorganic bases, such as ammonium or alkali or alkaline earth metal hydroxides, carbonates, bicarbonates, and the like. Bases useful in preparing such salts include sodium hydroxide, potassium hydroxide, ammonium hydroxide, potassium carbonate, sodium carbonate, sodium bicarbonate, potassium bicarbonate, calcium hydroxide, calcium carbonate, and the like.

The particular counter-ion forming a part of any salt of a compound disclosed herein is may not be critical to the activity of the compound, so long as the salt as a whole is pharmacologically acceptable and as long as the counterion does not contribute undesired qualities to the salt as a whole. Undesired qualities may include undesirably solubility or toxicity.

Pharmaceutically acceptable esters and amides of the compounds can also be employed in the compositions and methods disclosed herein. Examples of suitable esters include alkyl, aryl, and aralkyl esters, such as methyl esters, ethyl esters, propyl esters, dodecyl esters, benzyl esters, and the like. Examples of suitable amides include unsubstituted amides, monosubstituted amides, and disubstituted amides, such as methyl amide, dimethyl amide, methyl ethyl amide, and the like.

In addition, the methods disclosed herein may be practiced using solvate forms of the compounds disclosed herein or salts, esters, and/or amides, thereof. Solvate forms may include ethanol solvates, hydrates, and the like.

As used herein, the terms "treating" or "to treat" each mean to alleviate symptoms, eliminate the causation of resultant symptoms either on a temporary or permanent basis, and/or to prevent or slow the appearance or to reverse the progression or severity of resultant symptoms of the named disease or disorder. As such, the methods disclosed herein encompass both therapeutic and prophylactic administration.

As used herein, the phrase "effective amount" shall mean that drug dosage that provides the specific pharmacological response for which the drug is administered in a significant number of subjects in need of such treatment. An effective amount of a drug that is administered to a particular subject in a particular instance will not always be effective in treating the conditions/diseases described herein, even though such dosage is deemed to be a therapeutically effective amount by those of skill in the art.

An effective amount can be readily determined by the attending diagnostician, as one skilled in the art, by the use of known techniques and by observing results obtained under analogous circumstances. In determining the effective amount or dose of compound administered, a number of factors can be considered by the attending diagnostician, such as: the species of the subject; its size, age, and general health; the degree of involvement or the severity of the disease or disorder involved; the response of the individual subject; the particular compound administered; the mode of administration; the bioavailability characteristics of the preparation administered; the dose regimen selected; the use of concomitant medication; and other relevant circumstances.

A typical dose, for example a daily dose, may contain from about 0.01 mg/kg to about 100 mg/kg (such as from about 0.05 mg/kg to about 50 mg/kg and/or from about 0.1 mg/kg to about 25 mg/kg) of each compound used in the present method of treatment.

Compositions can be formulated in a unit dosage form, each dosage containing from about 1 to about 500 mg of each compound individually or in a single unit dosage form, such as from about 5 to about 300 mg, from about 10 to about 100 mg, and/or about 25 mg. The term "unit dosage form" refers to a physically discrete unit suitable as unitary dosages for a patient, each unit containing a predetermined quantity of active material calculated to produce the desired therapeutic effect, in association with a suitable pharmaceutical carrier, diluent, or excipient.

Oral administration is an illustrative route of administering the compounds employed in the compositions and methods disclosed herein. Other illustrative routes of administration include transdermal, percutaneous, intravenous, intramuscular, intranasal, buccal, intrathecal, intracerebral, or intrarectal routes. The route of administration may be varied in any way, limited by the physical properties of the compounds being employed and the convenience of the subject and the caregiver.

As one skilled in the art will appreciate, suitable formulations include those that are suitable for more than one route of administration. For example, the formulation can be one that is suitable for both intrathecal and intracerebral administration. Alternatively, suitable formulations include those that are suitable for only one route of administration as well as those that are suitable for one or more routes of administration, but not suitable for one or more other routes of administration. For example, the formulation can be one that is suitable for oral, transdermal, percutaneous, intravenous, intramuscular, intranasal, buccal, and/or intrathecal administration but not suitable for intracerebral administration.

The inert ingredients and manner of formulation of the pharmaceutical compositions are conventional. The usual methods of formulation used in pharmaceutical science may be used here. All of the usual types of compositions may be used, including tablets, chewable tablets, capsules, solutions, parenteral solutions, intranasal sprays or powders, troches, suppositories, transdermal patches, and suspensions. In general, compositions contain from about 0.5% to about 50% of the compound in total, depending on the desired doses and the type of composition to be used. The amount of the compound, however, is best defined as the "effective amount", that is, the amount of the compound which provides the desired dose to the patient in need of such treatment. The activity of the compounds employed in the compositions and methods disclosed herein are not believed to depend greatly on the nature of the composition, and, therefore, the compositions can be chosen and formulated primarily or solely for convenience and economy.

Capsules are prepared by mixing the compound with a suitable diluent and filling the proper amount of the mixture in capsules. The usual diluents include inert powdered substances (such as starches), powdered cellulose (especially crystalline and microcrystalline cellulose), sugars (such as fructose, mannitol and sucrose), grain flours, and similar edible powders.

Tablets are prepared by direct compression, by wet granulation, or by dry granulation. Their formulations usually incorporate diluents, binders, lubricants, and disintegrators (in addition to the compounds). Typical diluents include, for example, various types of starch, lactose, mannitol, kaolin, calcium phosphate or sulfate, inorganic salts (such as sodium chloride), and powdered sugar. Powdered cellulose derivatives can also be used. Typical tablet binders include substances such as starch, gelatin, and sugars (e.g., lactose, fructose, glucose, and the like). Natural and synthetic gums can also be used, including acacia, alginates, methylcellulose, polyvinylpyrrolidine, and the like. Polyethylene glycol, ethylcellulose, and waxes can also serve as binders.

Tablets can be coated with sugar, e.g., as a flavor enhancer and sealant. The compounds also may be formulated as chewable tablets, by using large amounts of pleasant-tasting substances, such as mannitol, in the formulation. Instantly dissolving tablet-like formulations can also be employed, for example, to assure that the patient consumes the dosage form and to avoid the difficulty that some patients experience in swallowing solid objects.

A lubricant can be used in the tablet formulation to prevent the tablet and punches from sticking in the die. The lubricant can be chosen from such slippery solids as talc, magnesium and calcium stearate, stearic acid, and hydrogenated vegetable oils.

Tablets can also contain disintegrators. Disintegrators are substances that swell when wetted to break up the tablet and release the compound. They include starches, clays, celluloses, algins, and gums. As further illustration, corn and potato starches, methylcellulose, agar, bentonite, wood cellulose, powdered natural sponge, cation-exchange resins, alginic acid, guar gum, citrus pulp, sodium lauryl sulfate, and carboxymethylcellulose can be used.

Compositions can be formulated as enteric formulations, for example, to protect the active ingredient from the strongly acid contents of the stomach. Such formulations can be created by coating a solid dosage form with a film of a polymer which is insoluble in acid environments and soluble in basic environments. Illustrative films include cellulose acetate phthalate, polyvinyl acetate phthalate, hydroxypropyl methylcellulose phthalate, and hydroxypropyl methylcellulose acetate succinate.

When it is desired to administer the compound as a suppository, conventional bases can be used. Illustratively, cocoa butter is a traditional suppository base. The cocoa butter can be modified by addition of waxes to raise its melting point slightly. Water-miscible suppository bases, such as polyethylene glycols of various molecular weights, can also be used in suppository formulations.

Transdermal patches can also be used to deliver the compounds. Transdermal patches can include a resinous composition in which the compound will dissolve or partially dissolve; and a film which protects the composition and which holds the resinous composition in contact with the skin. Other, more complicated patch compositions can also be used, such as those having a membrane pierced with a plurality of pores through which the drugs are pumped by osmotic action.

As one skilled in the art will also appreciate, the formulation can be prepared with materials (e.g., actives excipients, carriers (such as cyclodextrins), diluents, etc.) having properties (e.g., purity) that render the formulation suitable for administration to humans. Alternatively, the formulation can be prepared with materials having purity and/or other properties that render the formulation suitable for administration to non-human subjects, but not suitable for administration to humans.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

All references, including publications, patent applications, and patents, cited herein are hereby incorporated by reference to the same extent as if each reference were individually and specifically indicated to be incorporated by reference and were set forth in its entirety herein.

Preferred aspects of this invention are described herein, including the best mode known to the inventors for carrying out the invention. Variations of those preferred aspects may become apparent to those of ordinary skill in the art upon reading the foregoing description. The inventors expect a person having ordinary skill in the art to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

EXAMPLES

The following Examples are illustrative and should not be interpreted to limit the scope of the claimed subject matter.

Example 1—Targeting Telomerase Reverse Transcriptase with the Covalent Inhibitor NU-1 Confers Immunogenic Radiation Sensitization Even when applied to cells one hour prior to genotoxic therapy, TERT inhibitors significantly enhanced the effects in vitro. Cells displayed persistent DNA damage signaling and delayed DSB repair, leading to prolonged cell cycle arrest and accelerated senescence. The slower DSB repair appears to reflect a specific defect in NHEJ without a similar impact on HR. A direct role in NHEJ is consistent with early studies that implicated TERT in end-joining and the rapid phase of chromosomal DSB repair (Masutomi et al., 2005; Sharma et al., 2003; Shin et al., 2004). A striking result came from examining radiosensitization in vivo. Using CT26 colon carcinoma flank tumors in syngeneic BALB/c mice as an immunogenic tumor model (Lechner et al., 2013), short-term treatment with the TERT inhibitor was neither toxic nor effective on its own but markedly enhanced the effects of radiation. Radiation alone induced regression and growth delay, but the combination led to tumor elimination. Notably, there was a greater accumulation of DCs and activated CTLs in combination-treated tumors. A key role for adaptive immunity was consistent with the decreased impact of the TERT inhibitor on radiation response of CT26 tumors formed in NSG immunodeficient mice, despite similarly impacting tumor cell proliferation and persistent DNA damage. Modeling the radiosensitization in vitro, coculturing immature DCs with tumor cells driven into senescence by TERT inhibition and irradiation resulted in DC maturation and activation. These DCs displayed increased cytotoxic T cell priming, indicating competence as antigen-presenting cells. A favorable interpretation is that targeting TERT with TERT inhibitors potentiates an effective anti-tumor immune response by promoting immunogenic senescence (Meng et al., 2012) in irradiated tumors and thereby boosting radiation-induced in situ vaccination (Wennerberg et al., 2017).

A prolonged DNA damage response (DDR) was observed both in vitro and in vivo when cells were treated with combined radiation and TERT inhibitor, providing a link to anti-tumor immunity via cytoplasmic DNA sensing, immunogenic cell death and/or other mechanisms (Chabanon et al., 2021). As a means to leverage the DDR to enhance immunotherapy, TERT is promising not only via its extra-telomeric roles in DNA repair but also via activity at telomeres that may impact cGAS-STING-mediated inflammatory signaling (Chen et al., 2017), as used to target a cytotoxic T cell response to telomerase-positive tumors in mice using 6-thio-dG to damage telomeres (Mender et al., 2020). Whether localized to chromosome arms or telomeres, unrepairable DNA damage will promote tumor cells to display DAMPs and release inflammatory mediators, encouraging infiltration of DCs and activation of cytotoxic T cells.

NU-1 Enhances Radiosensitivity In Vitro

To examine whether NU-1 can serve as a genotoxic therapy sensitizing effect, MCF7 cells were treated with DMSO control, NU-1 (0.5 µM), BIBR (10 µM), or MST (1 µM), at concentrations below those that impacted clonogenicity on their own (FIG. 1A), followed by increasing doses of ionizing radiation (IR, 0-5 Gy). A clonogenic survival assay demonstrated that each of the TERT inhibitors conferred radiosensitization, with NU-1 displaying the strongest effects (FIGS. 1B and C, Table 1). Toward further examining the effects of TERT inhibition on radiation response, we treated MCF7 cells with DMSO, NU-2, NU-1, chrolactomycin (CHRO) (Iorio et al., 2012), BIBR, or MST, followed by 0 or 6 Gy and then incubated for 7 days in the continued presence of drugs for time-lapse live-cell imaging. The TERT inhibitors did not limit cell proliferation of unirradiated cells but significantly slowed recovery and/or proliferation following irradiation (FIG. 1D). This could not be ascribed to increased cell death as staining cells with the cell membrane integrity probe YO-PRO-1 indicated no increased effects of the TERT inhibitors over radiation alone (FIG. 1E). However, examining the time-lapse imaging results revealed that many of the surviving cells treated with both TERT inhibitors and radiation displayed an enlarged and flattened morphology characteristic of senescence. Thus, we examined senescence-associated B-galactosidase (SA-β-Gal) at 7 days after IR. On their own, TERT inhibitors did not increase senescence above background. After irradiation, the DMSO and NU-2 controls displayed a similar increase in SA-β-Gal$^+$ cells (~34%). Addition of TERT inhibitors further increased senescent cells after IR (~55%, FIGS. 1F and G). As shown in the images, even among the cells not scored as SA-β-Gal$^+$, few displayed the characteristic size and shape of proliferating MCF7 cells. Notably, even 50 nM NU-1 or CHRO was sufficient to enhance senescence after IR, though with less potency (FIG. 1H).

TABLE 1

Figure 8:
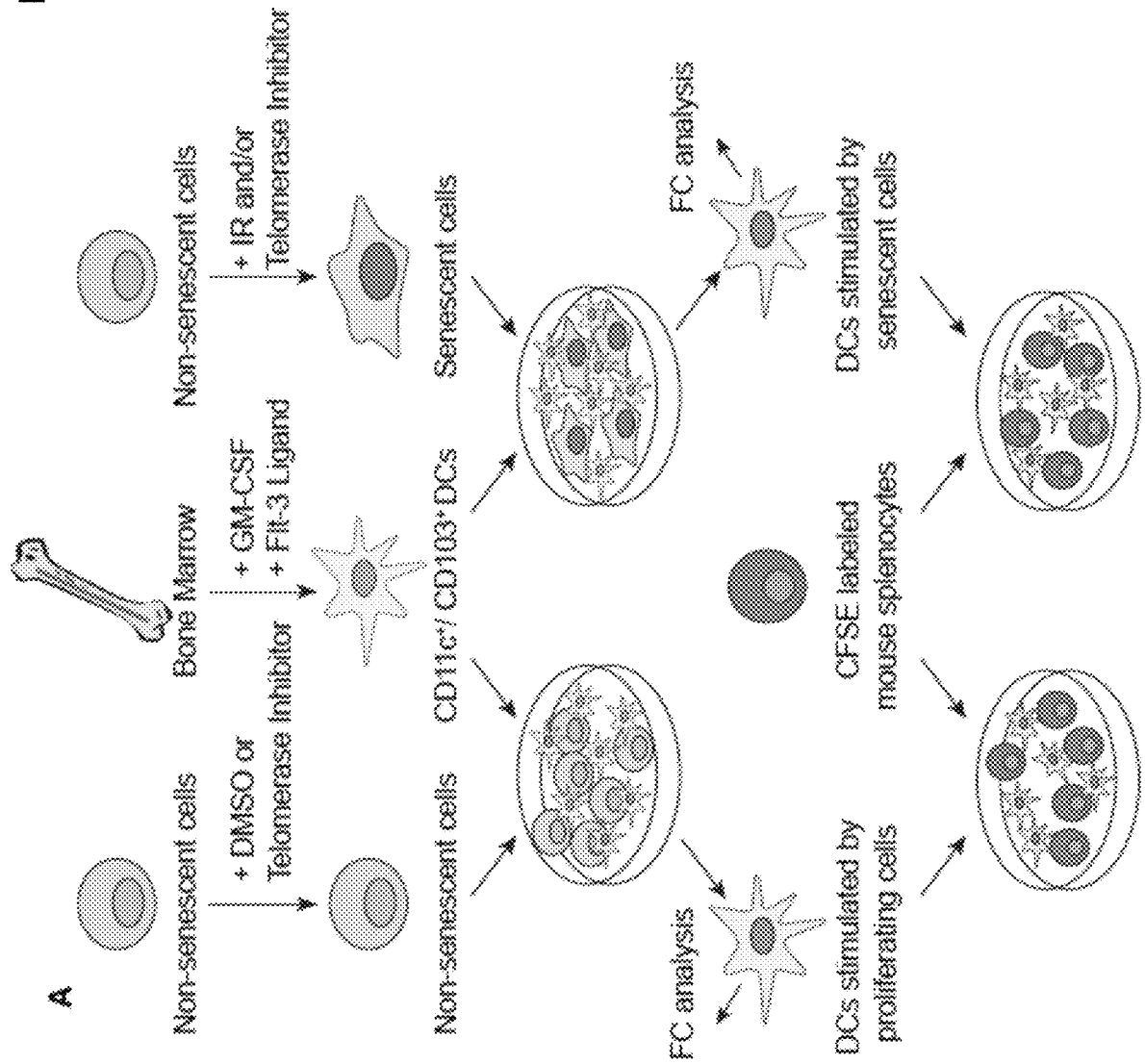
FIG. 8. TERT inhibition and irradiation induces immunogenic senescent CT26 cells capable of stimulating DC function via STING signaling. (A) Experimental schema for forming and stimulating BMDCs with CT26 cells and assaying APC function. (B) Quantitative analysis of DC activation/maturation. CT26 cells treated with DMSO, NU-1, or MST-312±IR, incubated 5 days in culture, and combined with BMDCs overnight. Data obtained from live CD11c$^+$/CD103$^+$ DC population in triplicates, mean±SD. (C and D) Proliferative rate of live CD8$^+$/CD4$^-$ (C) and CD8$^-$/CD4$^+$ (D) T cell population. CFSE labeled murine splenocytes were cocultured for 5 days with DCs pre-stimulated by CT26 cells treated with DMSO, NU-1, or MST±IR. (E) CT26 cells treated with indicated compounds±10 Gy IR and cocultured with BMDCs as in B. Data from three experiments, mean±SD. MFI, mean fluorescence intensity. *P<0.001, 0.001<P<0.01, n.s. P>0.05 (unpaired t-test).
Figure 8:
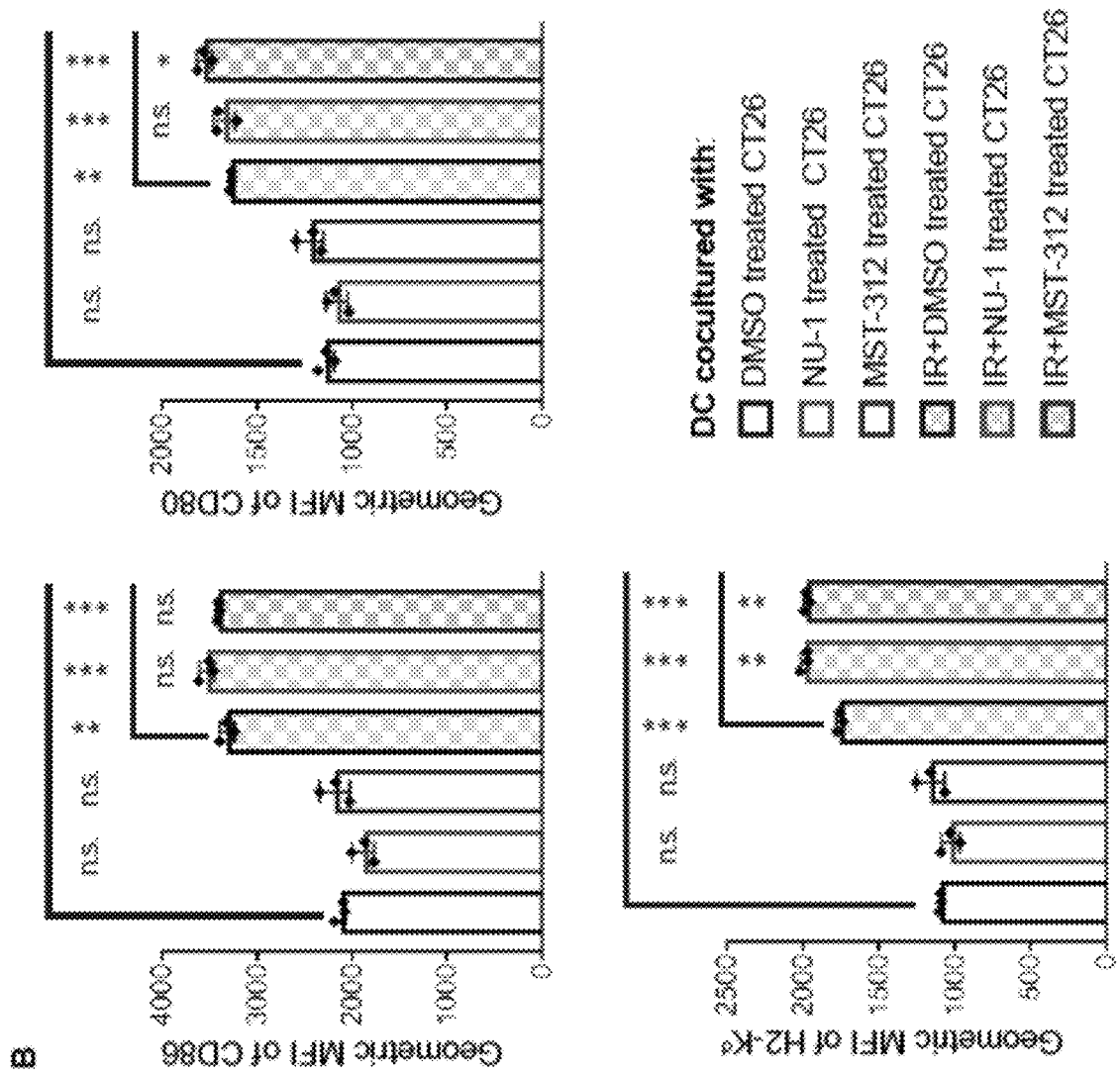
Figure 8:
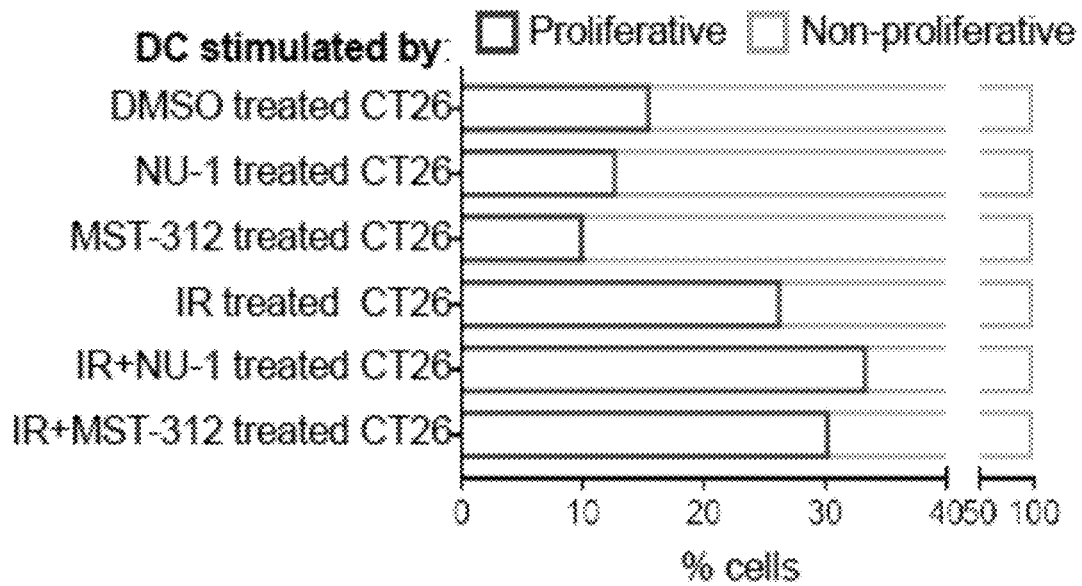
Figure 8:
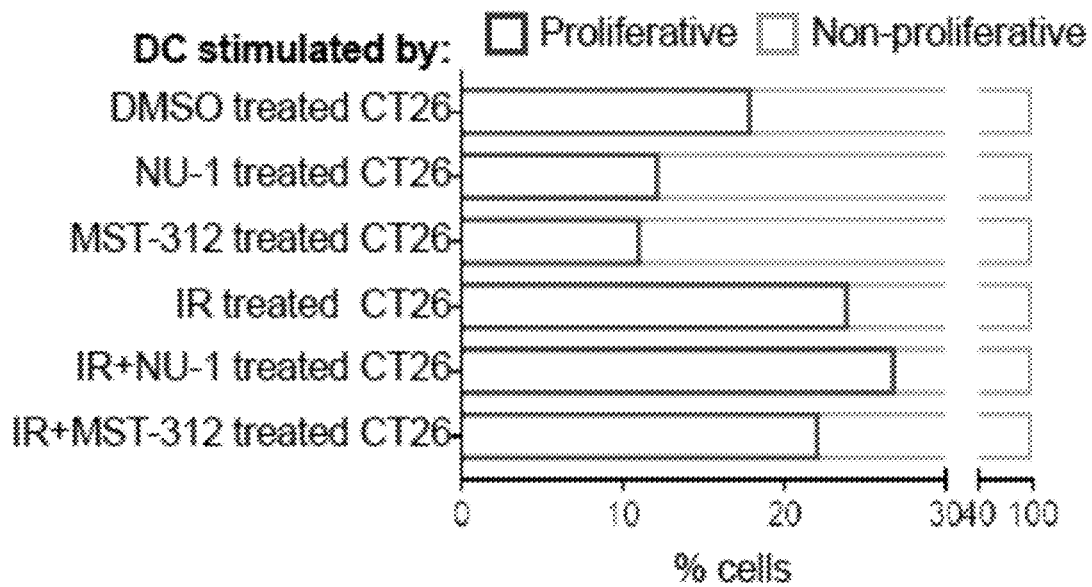
Figure 8:
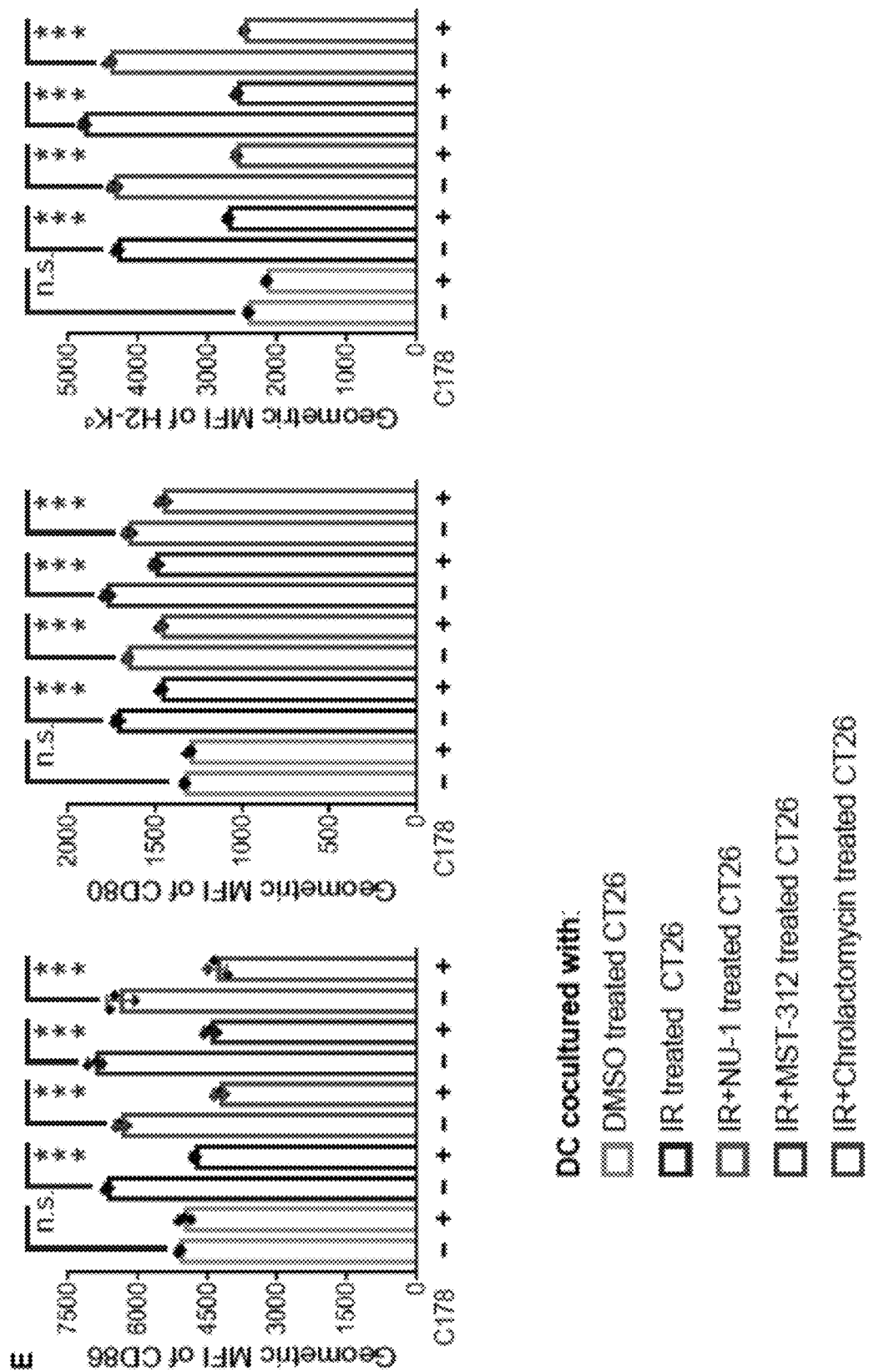

Surviving fraction at 2 Gy (SF2), Related to FIG. 1, 8, and 11

| Treatment | Mean SF$_2$ | SD | P value (compared to DMSO treatment) |
|---|---|---|---|
| MCF7 cells | | | |
| DMSO | 0.369 | 0.038 | N/A |
| NU-1 | 0.116 | 0.045 | 0.0018 |
| BIBR 1532 | 0.256 | 0.030 | 0.0153 |
| MST-312 | 0.245 | 0.035 | 0.0138 |
| Saos-2 cells | | | |
| DMSO | 0.576 | 0.024 | N/A |
| NU-1 | 0.583 | 0.057 | 0.4419 |
| BIBR 1532 | 0.580 | 0.036 | 0.4495 |
| CT26 cells | | | |
| DMSO | 0.721 | 0.045 | N/A |
| NU-1 | 0.322 | 0.044 | 0.0004 |
| BIBR 1532 | 0.727 | 0.020 | 0.4392 |
| MST-312 | 0.407 | 0.071 | 0.0032 |

Cellular senescence is defined as a state of stable cell cycle arrest. To explore how TERT inhibition might promote senescence, we examined the distribution of cell cycle stages of MCF7 cells based on their DNA content after IR in the presence or absence of TERT inhibitors. Proliferating MCF7 cells were distributed as ~45% G1, 35% S, and 20% G2/M. TERT inhibitors had no appreciable effects on their own after 24 h treatment. Cells treated with IR and then allowed to recover for 24 h displayed an increase in G1 to 62% and decrease in S phase to 22%, consistent with unrepaired DNA damage. Addition of TERT inhibitors further expanded the G1 population (~71%) and reduced S (~15%) (FIG. 1I). To visualize senescent cell cycle arrest and/or mitotic catastrophe, we performed time-lapse live-cell imaging of MCF7-FUCCI cells, which allow individual cells to be tracked through G1 (mCherry-hCdt1, red), S/G2 (m Venus-hGeminin, green), and M phase (Sakaue-Sawano et al., 2008). After IR, most of the surviving NU-2 treated cells eventually resumed proliferation but ~40% remained arrested, displaying persistent expression of the G1 phase marker and developing a senescent morphology. This pattern was enhanced by treating cells with NU-1 (FIG. 1J) or CHRO, where ~80% of the surviving cells displayed G1 marker expression and senescent morphology at 6 days. These results confirm that even short-term TERT inhibition can potentiate radiation in promoting accelerated senescence, without waiting for telomere erosion.

Figure 2:
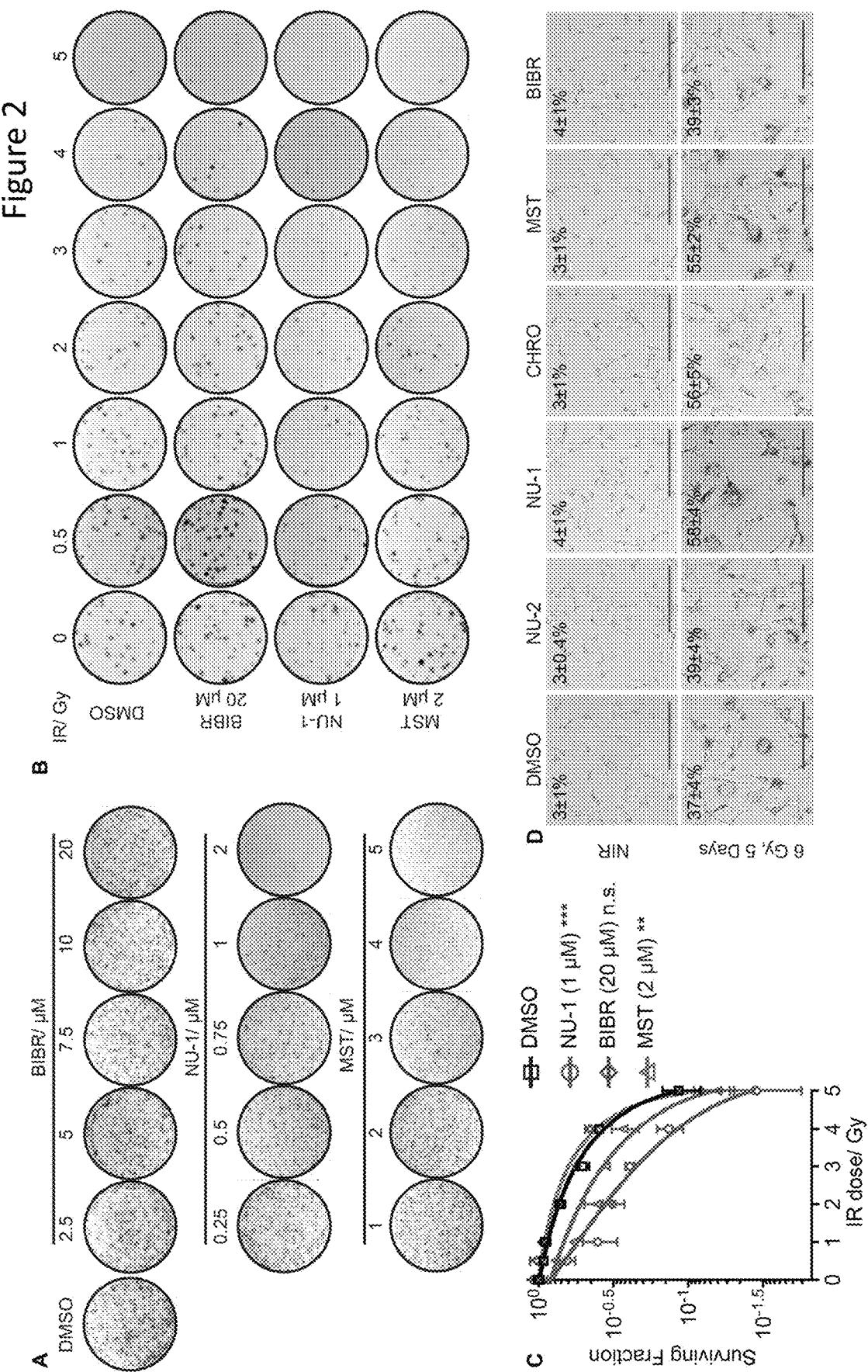
FIG. 2. NU-1 radiosensitizes telomerase positive murine CT26 colon cancer but does not affect radiosensitivity and cellular senescence in cells lacking telomerase activity. (A) Clonogenic assay of CT26 cells after telomerase inhibition. CT26 cells were treated with DMSO control, NU-1, BIBR, or MST at the indicated concentrations. Performed in triplicate. Representative images are shown. (B) Clonogenic survival of CT26 cells after irradiation in the presence or absence of inhibitors. CT26 cells were treated with DMSO, BIBR (20 µM), NU-1 (1 µM), or MST (2 µM) for 1 h, followed by irradiation at the indicated doses. Performed in triplicate. Representative images are shown. (C) Quantitative analysis of B. Normalized surviving fractions indicating the average of three replicates are shown, mean±SD. *P<0.001; 0.001<P<0.01; n.s. P>0.05 compared to DMSO (unpaired t-test). (D) SA-β-Gal staining of CT26 cells. CT26 cells were treated with DMSO, NU-2, NU-1, CHRO, BIBR or MST for 1 h, followed by irradiation at 0 (NIR) or 10 Gy. Cells were fixed and stained 5 days after radiation. Representative 20× images are shown. Percentage of SA-β-Gal+ cells are indicated. Scale bars=200 µm. (E) Clonogenic survival of Saos-2 cells treated with DMSO, NU-1 or BIBR at indicated doses. (F) Clonogenic survival of Saos-2 cells treated with IR±TERT inhibitors. Saos-2 cells were treated with DMSO control, NU-1 (1 µM), or BIBR (20 µM) for 1 h, then irradiated at the indicated doses. Shown are representative images from three replicates. (G) Quantitative analysis of F. Data from three replicates, mean±SD. (H) Automated proliferation analysis from time-lapse imaging over 6 days comparing Saos-2 cells treated with DMSO, NU-2, NU-1, CHRO, BIBR or MST for 1 h, followed by 0 (NIR, left) or 6 Gy (right) at time 0. Results are shown as mean±SD. Images of 25 non-overlapping fields were captured for analysis of each sample. (I) SA-β-Gal staining of Saos-2 cells. Saos-2 cells were treated as in D, then fixed and stained after 7 days. Shown are representative images. % of SA-β-Gal+ cells are indicated. Scale bars=200 µm. (J) Quantification of SA-β-Gal-positive Saos-2 cells after IR. Data from 5 non-overlapping images, mean±SD. n.s. P>0.05 compared to DMSO (unpaired t-test).
Figure 2:
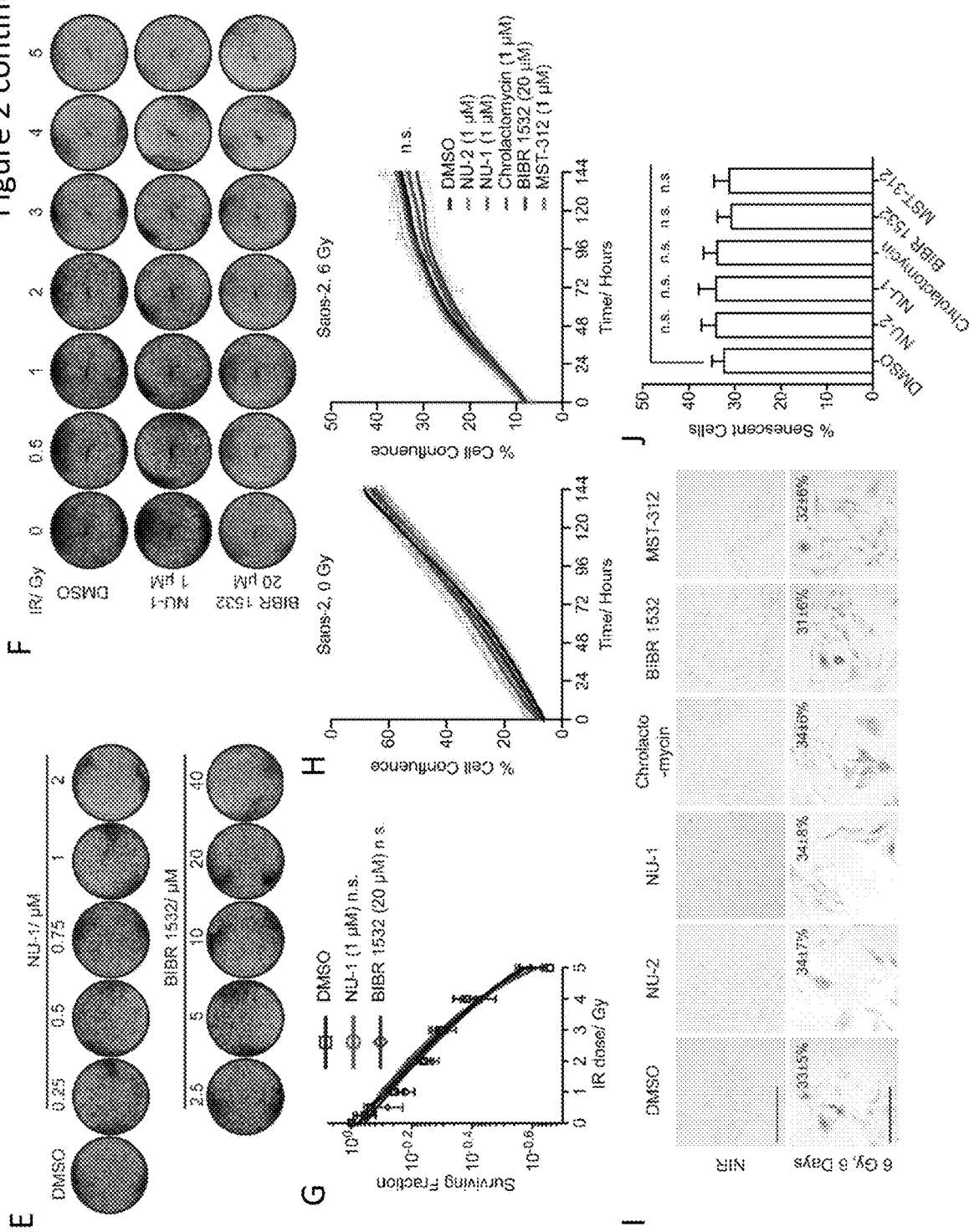

Similar experiments were conducted in telomerase negative Saos-2 cells. Cells were assayed for clonogenic survival in the presence of NU-1 (1 µM), BIBR (20 µM), or DMSO control. Neither NU-1 nor BIBR displayed radiosensitization in Saos-2 cells (FIG. 2A-C, Table 1). Treating Saos-2 cells with TERT inhibitors for 1 h before 0 or 6 Gy did not change recovery and/or proliferation compared to DMSO or NU-2 control (FIG. 2D). Further, at 7 days after IR, ~33% of Saos-2 cells accumulated as SA-β-Gal$^+$ cells with senescent morphology, irrespective of treatment with TERT inhibitors or control compounds (FIGS. 1E and F).

TERT Inhibition Delays Chromosomal Double Strand Break Repair After Irradiation

Figure 3:
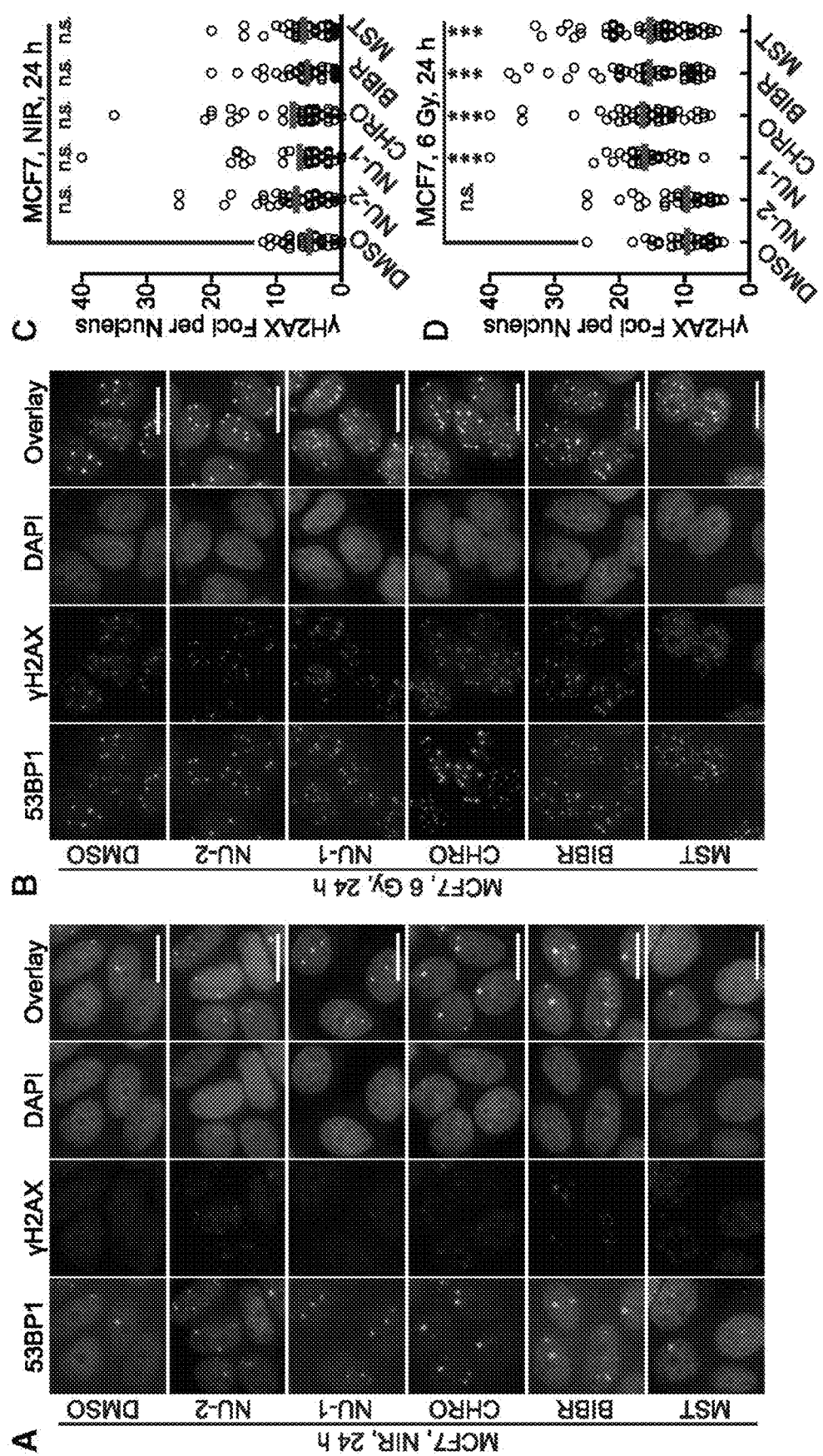
FIG. 3. TERT inhibition induces persistent DNA damage foci and delays double-strand break repair after irradiation in telomerase positive cells. (A and B) Representative pseudo-colored images of staining for DNA damage foci markers 53BP1 (green) or γH2AX (red), DAPI (blue), and a three-color overlay. MCF7 cells were treated with DMSO, NU-2 (0.5 µM), NU-1 (0.5 µM), CHRO (0.5 µM), BIBR (10 µM), or MST (1 µM) for 1 h, followed by 0 (NIR, A) or 6 Gy (B), then fixed and stained after 24 h. Scale bars=20 µm. (C and D) Quantification of γH2AX foci of cells in A (C) and B (D). (E) Representative pseudo-colored staining images of cells treated as in B with 6 Gy showing telomere probe (green), γH2AX (red), DAPI (blue), and a three-color overlay. Scale bars=5 µm. (F and G) Quantification analysis of telomere and γH2AX colocalization after 0 (F) or 6 Gy (G). (H) Neutral comet assay of MCF7 cells treated as in A and B. Representative images demonstrate "comet tails". Scale bars=20 µm. (I and J) Quantification of comet assay results after 0 (I) or 6 Gy (J). % tail DNA indicates proportion of unrepaired chromosomal DSBs. (K) ALT Saos-2 cells were treated with DMSO or NU-1 (1 µM) for 1 h, then 0 or 6 Gy, fixed and stained after 24 h. Shown are representative images. Scale bars=20 µm. (L) Quantification of γH2AX foci of cells in K. (M) Saos-2 cells treated as in H were examined by neutral comet assay. Representative images are shown. Scale bar=20 µm. (N) Quantification of comet assay results in M. For quantification analysis, >50 cells were analyzed. Shown are individual cells (open circles) and mean (red bar). *P<0.001; 0.001<P<0.01; n.s. P>0.05 compared to DMSO (unpaired t-test).
Figure 3:
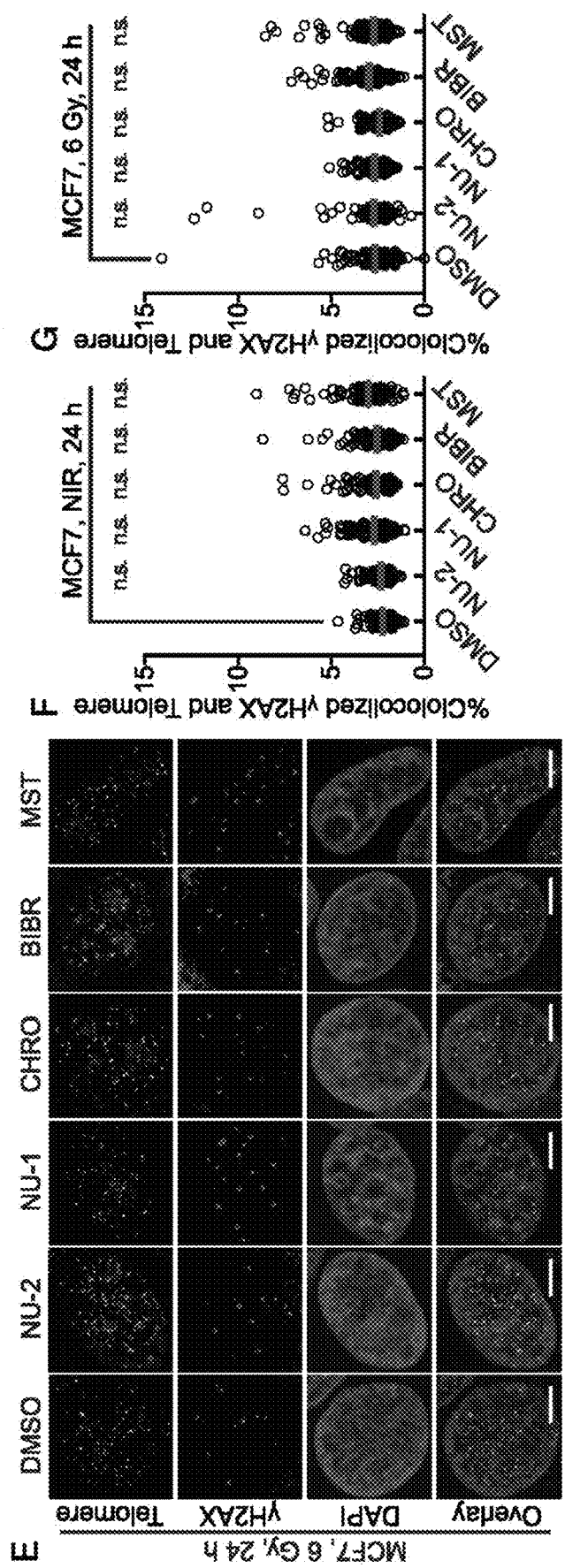
Figure 3:
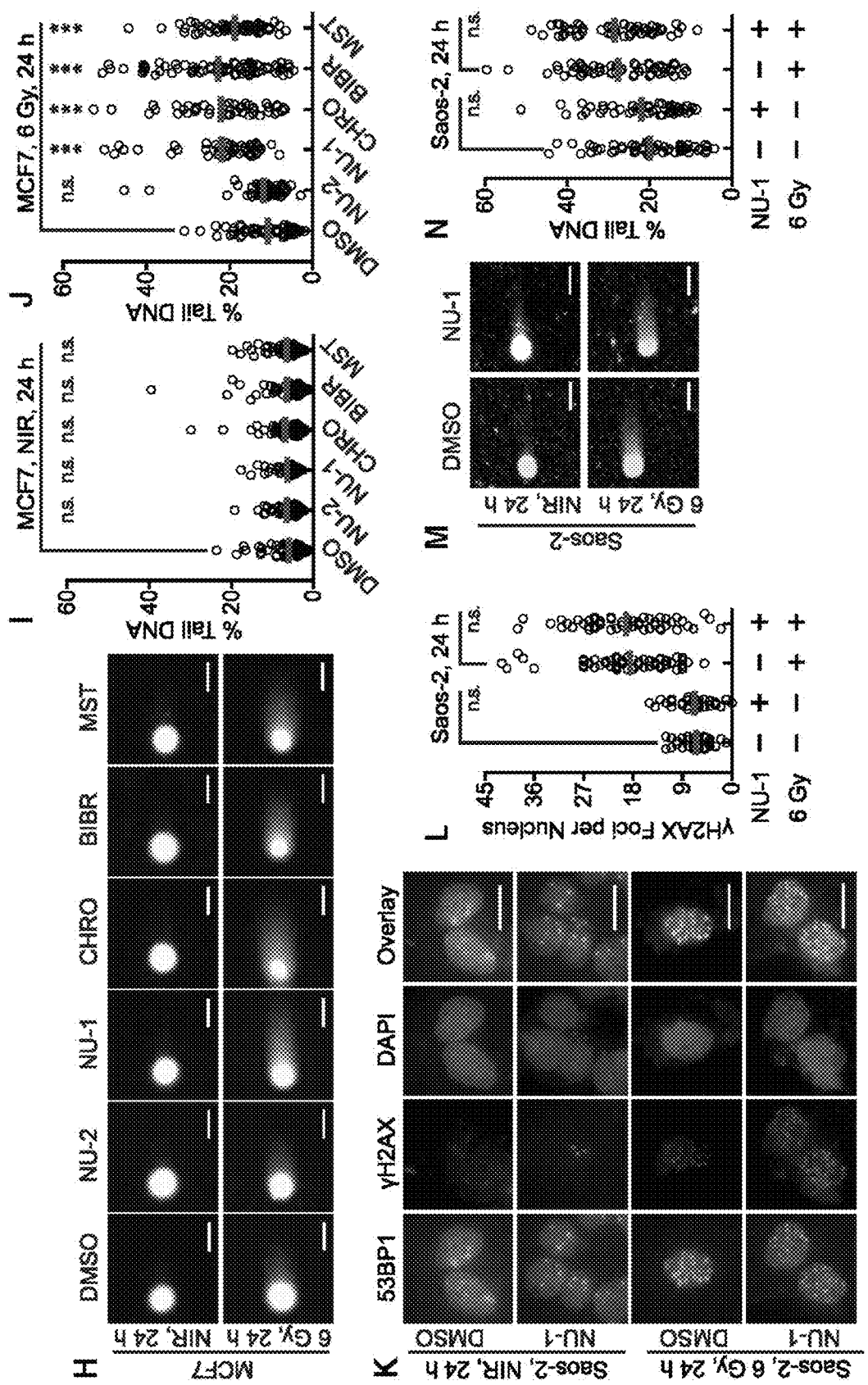
Figure 4:
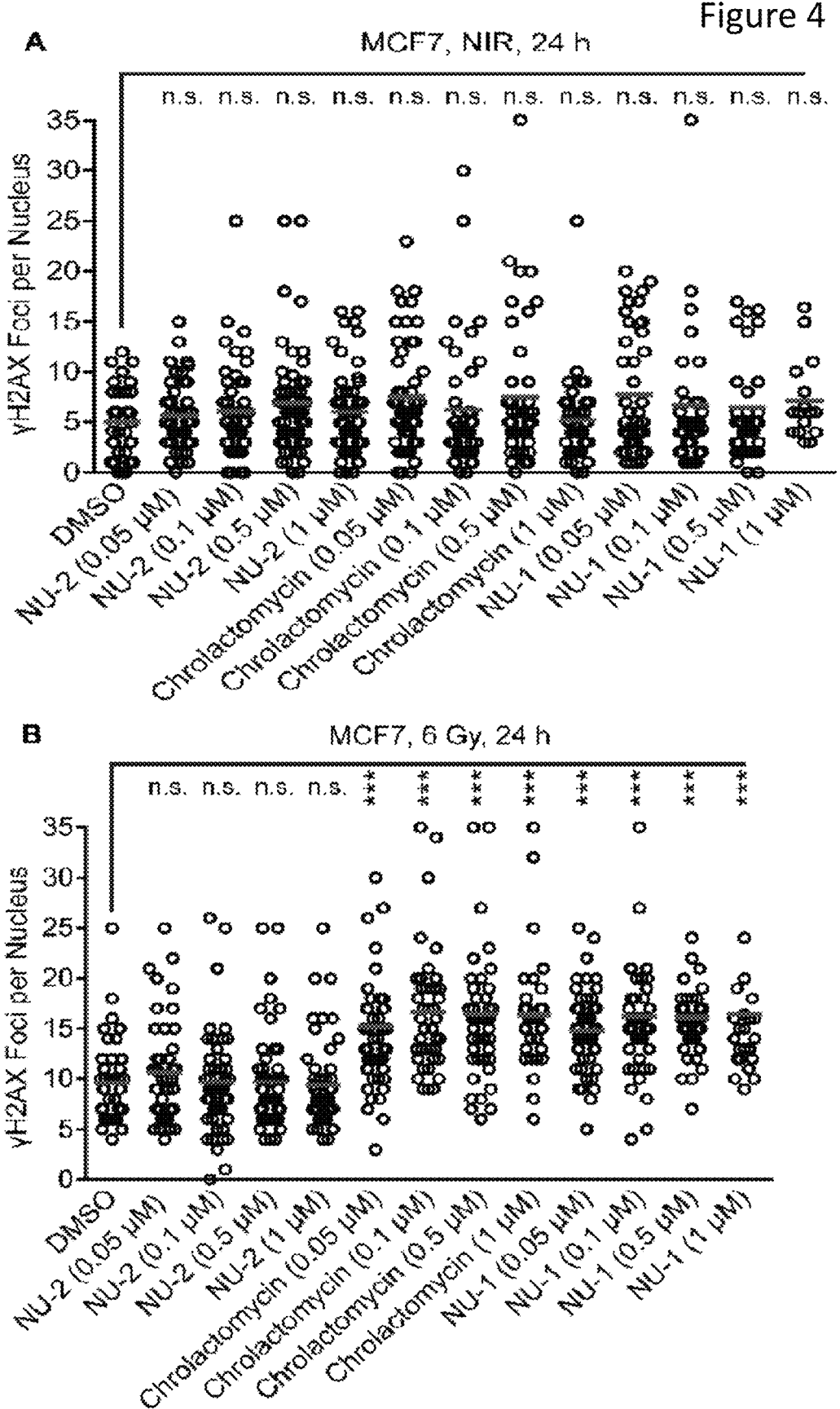
FIG. 4. TERT inhibition promotes DNA damage foci persistence in a radiation and cell cycle dependent manner. (A and B) Quantification of γH2AX foci in MCF7 cells. Cells were treated with DMSO, CHRO, NU-1, or NU-2 at indicated doses for 1 h, followed by 0 (NIR, A) or 6 Gy (B), fixed after 24 h and stained for γH2AX. >30 cells were analyzed for each condition. Shown are individual cells (open circles) and mean (red bar). ***P<0.001; n.s. P>0.05 compared to DMSO (unpaired t-test). (C) DNA damage foci staining assays with MCF7 cells were performed as in FIGS. 3A and B. The number of γH2AX foci and DNA content based on DAPI intensity are plotted for individual cells (open circles). (D) Representative images of MCF7 cells with G1 and G2 DNA content. MCF7 cells were treated with NU-1 (0.5 µM) for 1 h, followed 6 Gy irradiation, then fixed and stained after 24 h. Scale bars, 20 µm. (E) Neutral comet assays with MCF7 cells were performed as in FIG. 3H. The % tail DNA and total DNA content are plotted for individual nuclei (open circles).
Figure 4:
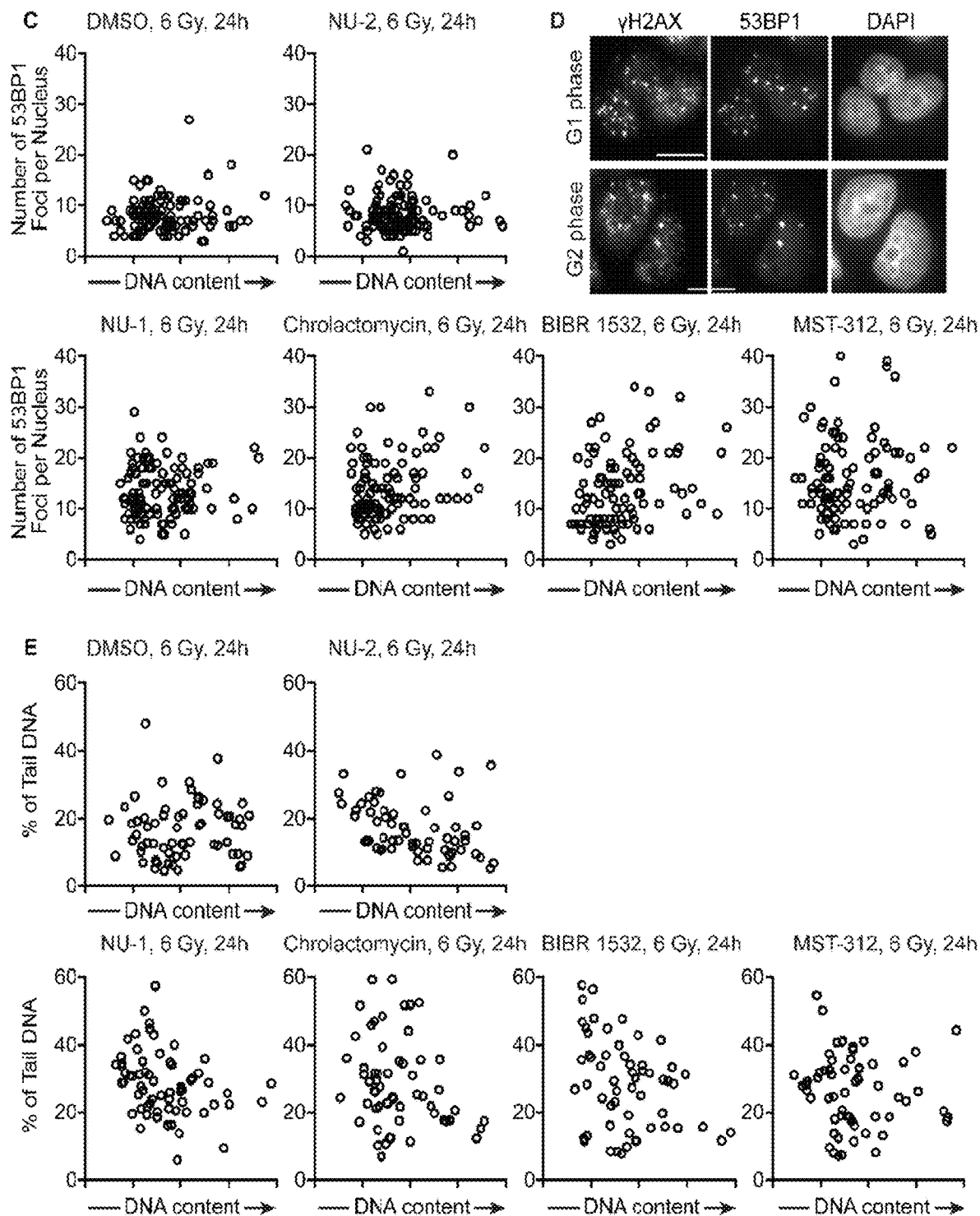

MCF7 cells were treated with NU-2, NU-1, CHRO, BIBR, or MST for 1 h and then irradiated with 0 or 6 Gy, incubated 24 h (roughly one cell cycle for unperturbed MCF7 cells (Sutherland et al., 1983)), and examined by immunofluorescence for 53BP1 and γH2AX foci as markers for persistent DSBs. Unirradiated cells, whether treated with TERT inhibitors or not, yielded a similar average of ~5 foci per nucleus (FIGS. 3A and C). However, at 24 h after 6 Gy, persistent 53BP1 and γH2AX foci were increased after treatment with TERT inhibitors compared to controls (FIGS. 3B and D). Cells treated with as low as 100 nM or as high as 1 µM CHRO or NU-1 displayed a similar pattern (FIGS. 4A and B). To distinguish whether the presumptive chromosomal DSBs might instead be telomere dysfunction induced foci (TIFs), telomeres were co-stained along with γH2AX. A similar apparent colocalization of ~2% was observed whether cells were treated with 0 or 6 Gy and TERT inhibitors or controls (FIG. 3E-G).

Although the 53BP1 and γH2AX foci serve as useful proxies for DSBs, multiple conditions can uncouple foci persistence from DSB repair (Liu et al., 2019). Thus, we used single-cell electrophoresis (neutral comet assay) to directly evaluate DNA damage in MCF7 cells, where chromosomal fragments form a "comet tail" whose length and intensity correspond to the number of DSBs (Olive and Banáth, 2006). Consistent with foci staining, TERT inhibitors did not increase % tail DNA above background in unirradiated cells (FIGS. 3H and I). However, in cells examined 24 h after 6 Gy, TERT inhibition significantly enhanced % tail DNA, indicating a defect in DSB repair (FIGS. 3H and J). In turn, increased % tail DNA in a neutral comet assay cannot be explained by damage to telomeres alone. To examine the cell cycle distribution of damage, the data were plotted against nuclear DNA content (Schindelin et al., 2012), using DAPI for γH2AX foci and total DNA for comet assay. The irradiated cells displayed a high apparent G1 DNA content, as predicted by flow cytometry, but no clear bias in the distribution of persistent foci or unrepaired DSBs (FIG. 4C-E).

To evaluate TERT dependence, we similarly examined effects of NU-1 on DSB persistence in telomerase-negative Saos-2 cells. After treating Saos-2 cells with DMSO or 1 µM NU-1 and 0 or 6 Gy, NU-1 appeared not to impact 53BP1 or γH2AX foci on its own or when combined with IR (FIGS. 3K and L). In turn, neutral comet assays revealed similar levels of unrepaired DSBs with or without NU-1 (FIGS. 3M and N). Together, these results suggest that the effects of NU-1 that delay DSB repair after irradiation are directly mediated by TERT inhibition.

TERT Inhibition Targets Non-Homologous End-Joining Repair

Figure 5:
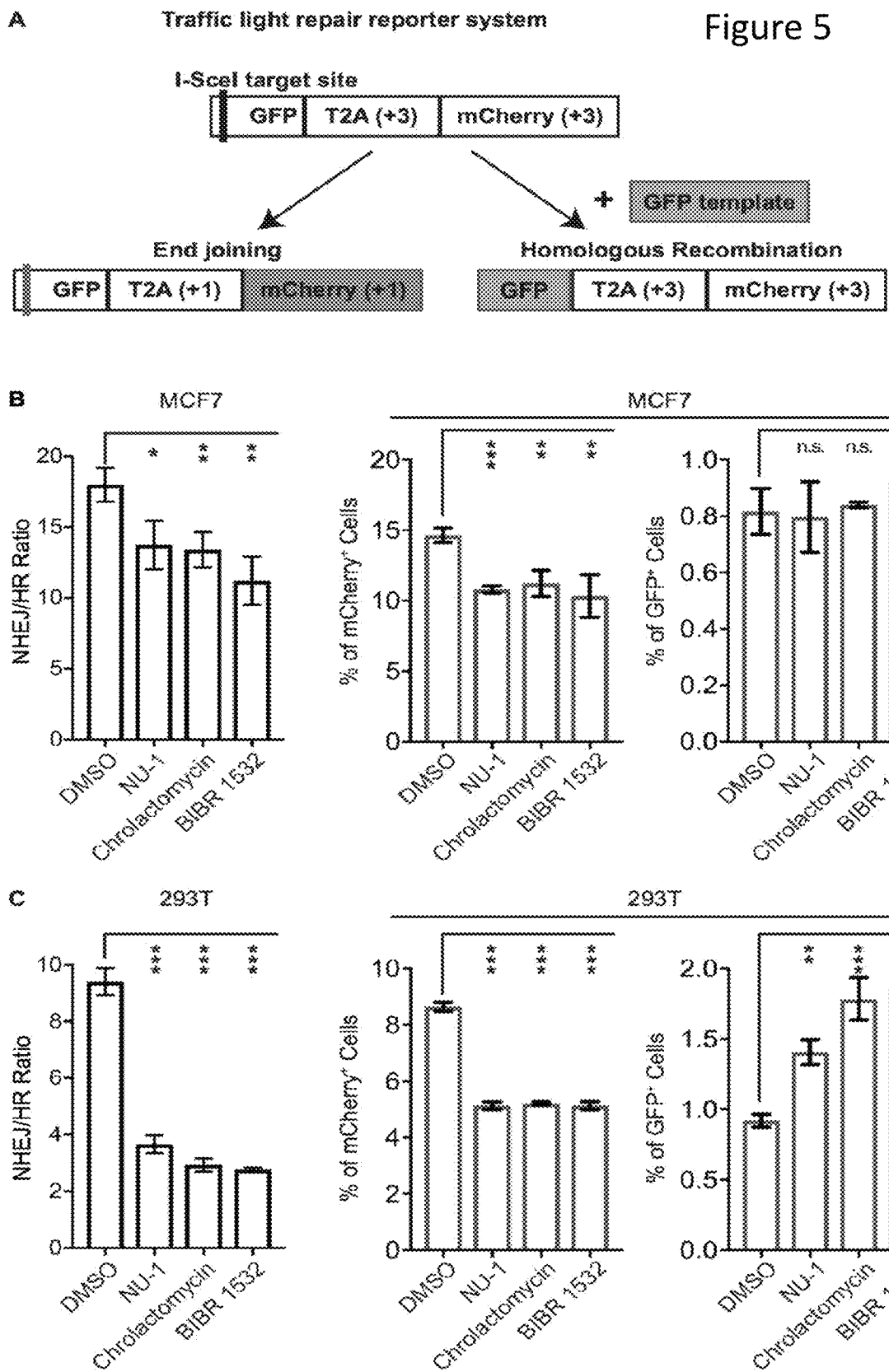
FIG. 5. TERT inhibition targets the non-homologous end-joining DSB repair pathway. (A) Diagram of the Traffic Light repair reporter system. Repair of an I-Sce-induced DSB in individual cells by end-joining (NHEJ) versus homologous recombination (HR) results in expression of mCherry or GFP, detected by flow cytometry. (B and C) The ratio of NHEJ to HR (left) and the quantification of mCherry$^+$ or GFP$^+$ cells among single cell population (right) in MCF7 (B) and 293T cells (C). Data from three replicates, mean±SD. *P<0.001; 0.001<P<0.01; *0.01<P<0.05 compared to DMSO treatment (unpaired t-test).

Radiation-induced DSBs are heterogeneous, occur throughout the cell cycle, and can be repaired by multiple mechanisms, with the majority rejoined by conventional non-homologous end joining (NHEJ) or homologous recombination (HR) (Scully et al., 2019). NHEJ predominates throughout the cell cycle (Mao et al., 2008) and must be partly suppressed to allow HR repair during S and G2 phases, when sister chromatids are available as repair templates (Arnoult et al., 2017). While the pattern of G1 cell cycle arrest and DSB persistence induced by NU-1 point to impacts on NHEJ, we directly examined the impacts of TERT inhibition on DSB repair pathway choice using the Traffic Light Repair Reporter, where repair of an I-Sce-induced DSB by NHEJ results in expression of mCherry while template-directed HR repair leads to expression of eGFP (FIG. 5A) (Certo et al., 2011). After treating with TERT inhibitors or DMSO control, the apparent NHEJ/HR ratio in MCF7 cells was significantly decreased, reflecting reduced NHEJ repair without a significant change to HR (FIG. 2B). In telomerase-positive (Ak₁nc₁lar et al., 2015) 293T human embryonic kidney cells, an even greater decrease in NHEJ/HR ratio was observed upon TERT inhibition (FIG. 2C), reflecting not only reduced NHEJ but increased HR, confirming the specificity of the effect. Taken together, our results suggest that targeting TERT leads to slower chromosomal DSB rejoining after radiation due to an NHEJ repair defect.

NU-1 Sensitizes CT26 Tumors to Radiation and Enhances Anti-Tumor Immunity

Figure 6:
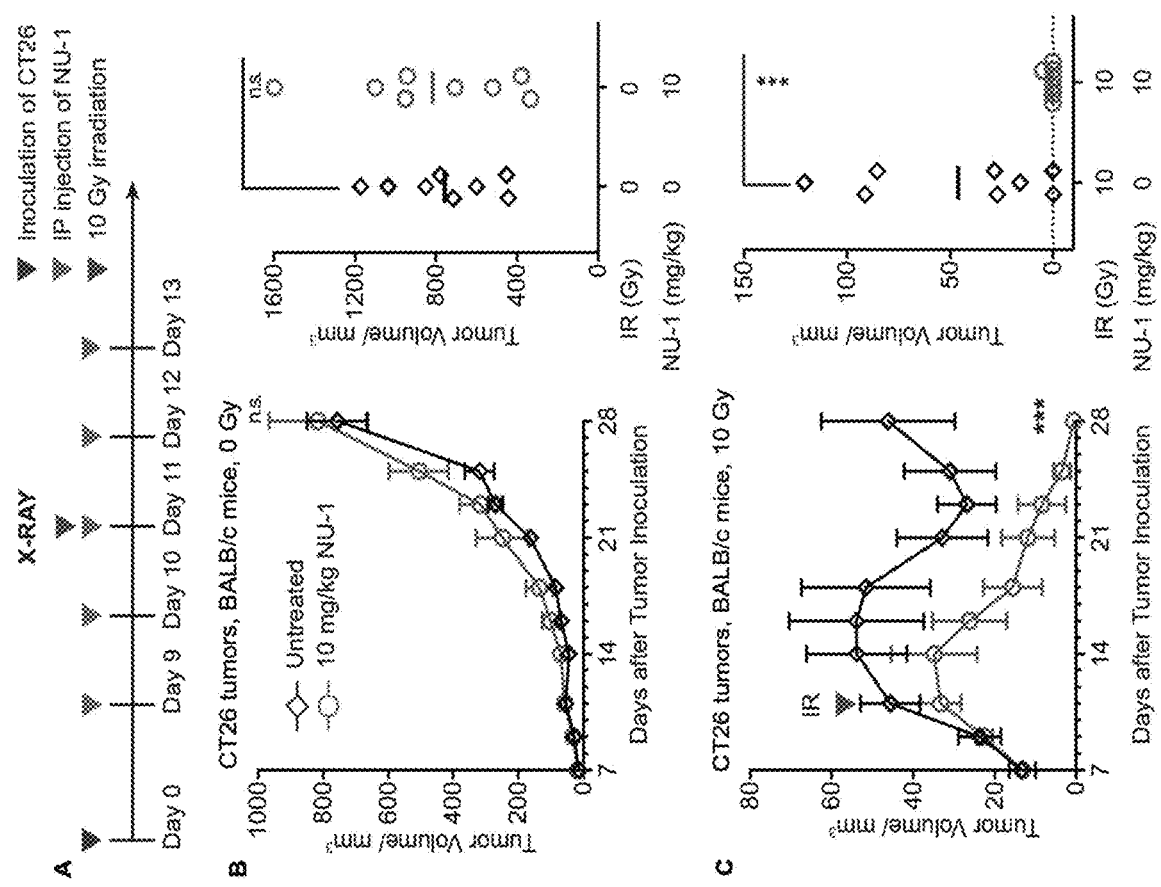
FIG. 6. NU-1 confers immunogenic radiation sensitization that leads to tumor elimination. (A) Experimental schema for treating mice bearing CT26 subcutaneous tumors. (B and C) Tumor growth in BALB/c mice treated with NU-1 alone (B) or in combination with 10 Gy irradiation (IR) (C). Shown are tumor growth kinetics (left, mean±SEM) and tumor volumes on Day 28 (right, individual volume and mean). (D) Hematoxylin and eosin (H&E) staining of tumor sections collected on Day 18. Shown are representative whole section scanning (scale bar=2.5 mm) and selected enlarged regions (scale bar=60 µm). (E-G) Representative pseudo-colored images of staining for Ki67 (red) or γH2AX (red) (E), or CD45 (yellow) and CD11c (red) (F), or CD8 (yellow) and Granzyme B (red) (G), overlaid with DAPI (blue). Serial sections with D were used. Scale bars=20 µm. (H) Tumor growth in NSG mice treated with IR±NU-1. Shown are tumor growth kinetics (left, mean±SEM) and tumor volumes on Day 28 (right, individual volume and mean). (I) Representative H&E staining examples of tumor sections collected from NSG mice on Day 18. Scale bar=2.5 mm (upper) or 60 µm (lower). (J) Representative images of staining for Ki67 (red) or γH2AX (red), overlaid with DAPI (blue). Scale bars=20 µm. ***P<0.001, *P<0.05, n.s. P>0.05 (unpaired t-test).
Figure 6:
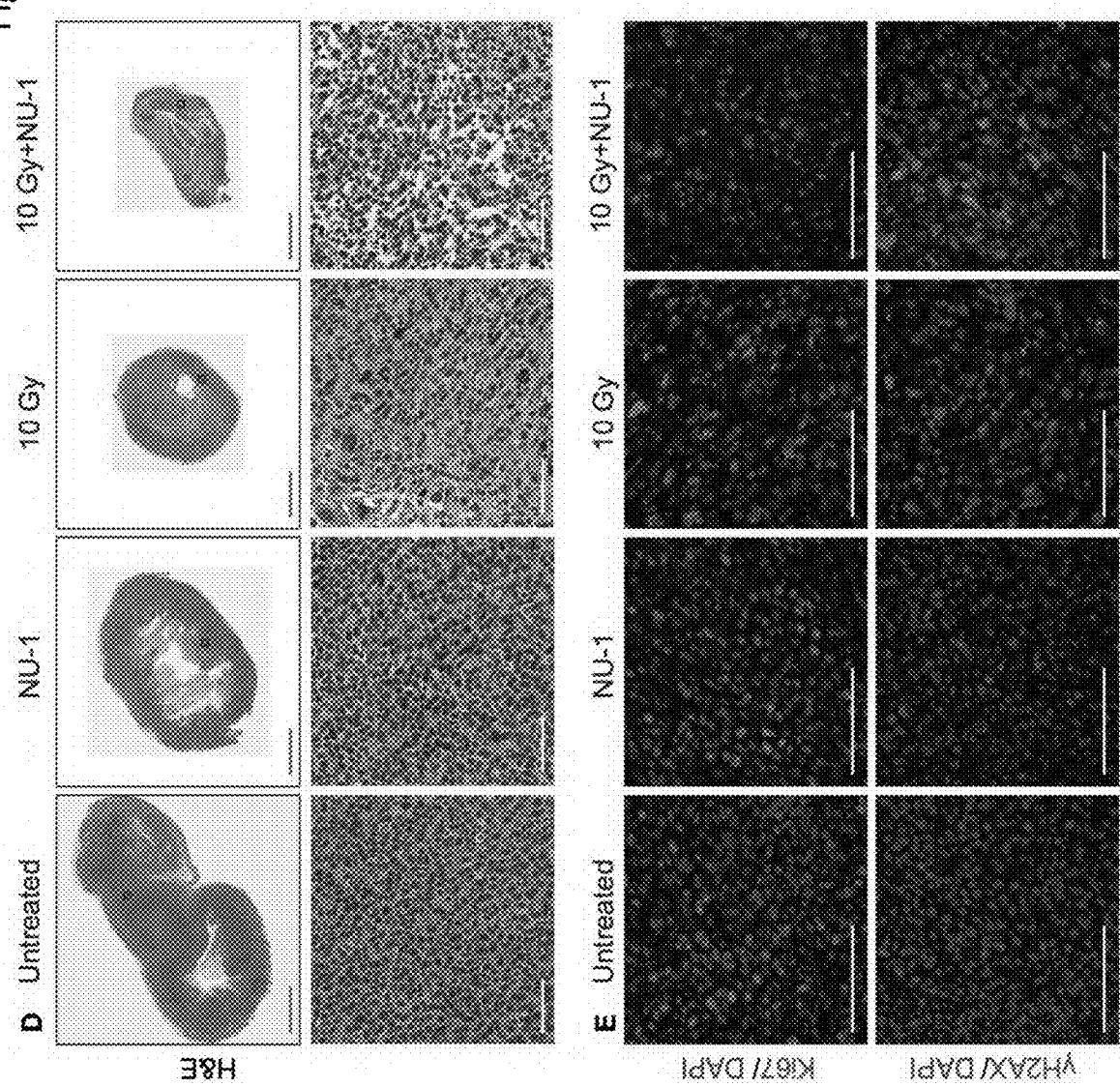
Figure 6:
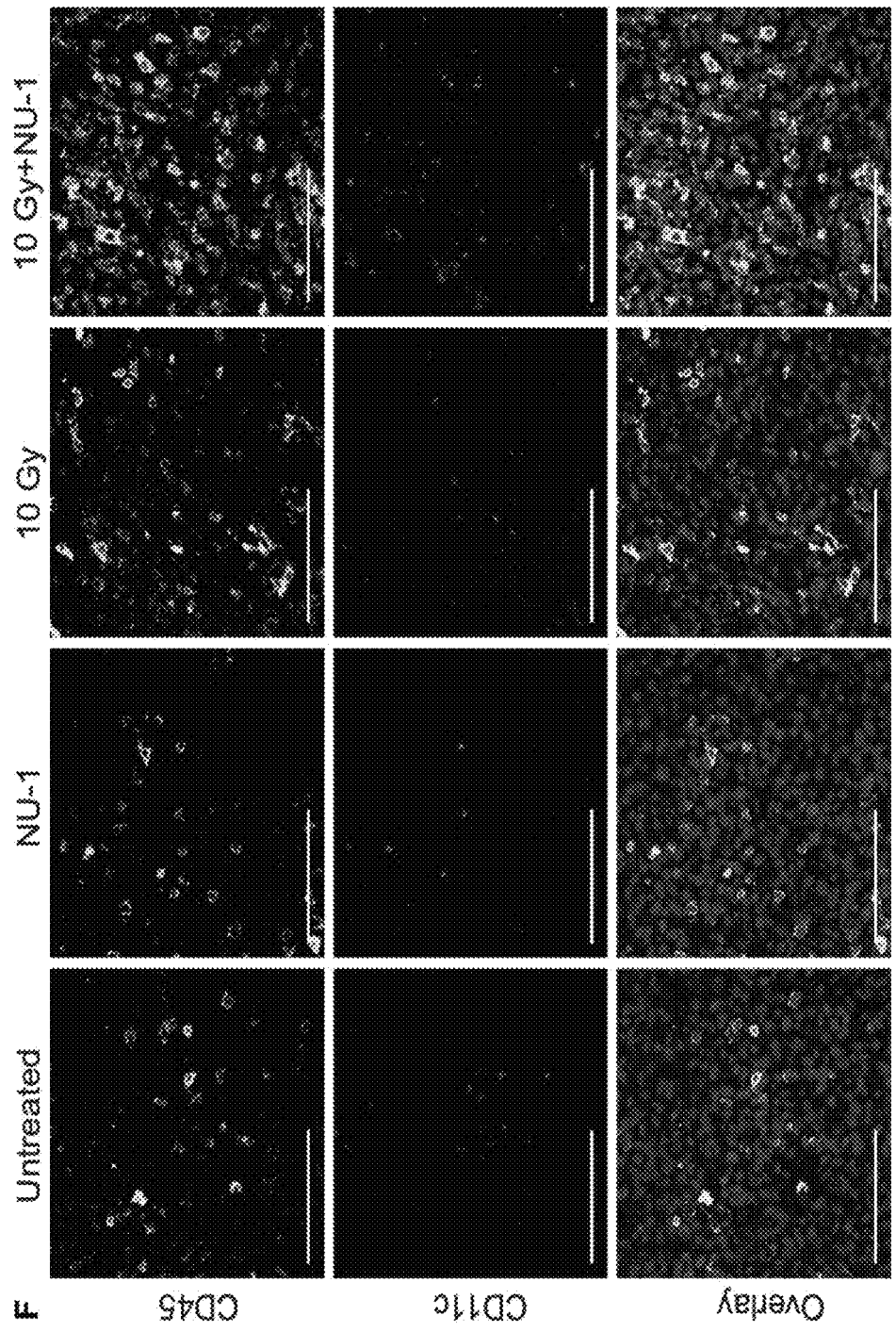
Figure 6:
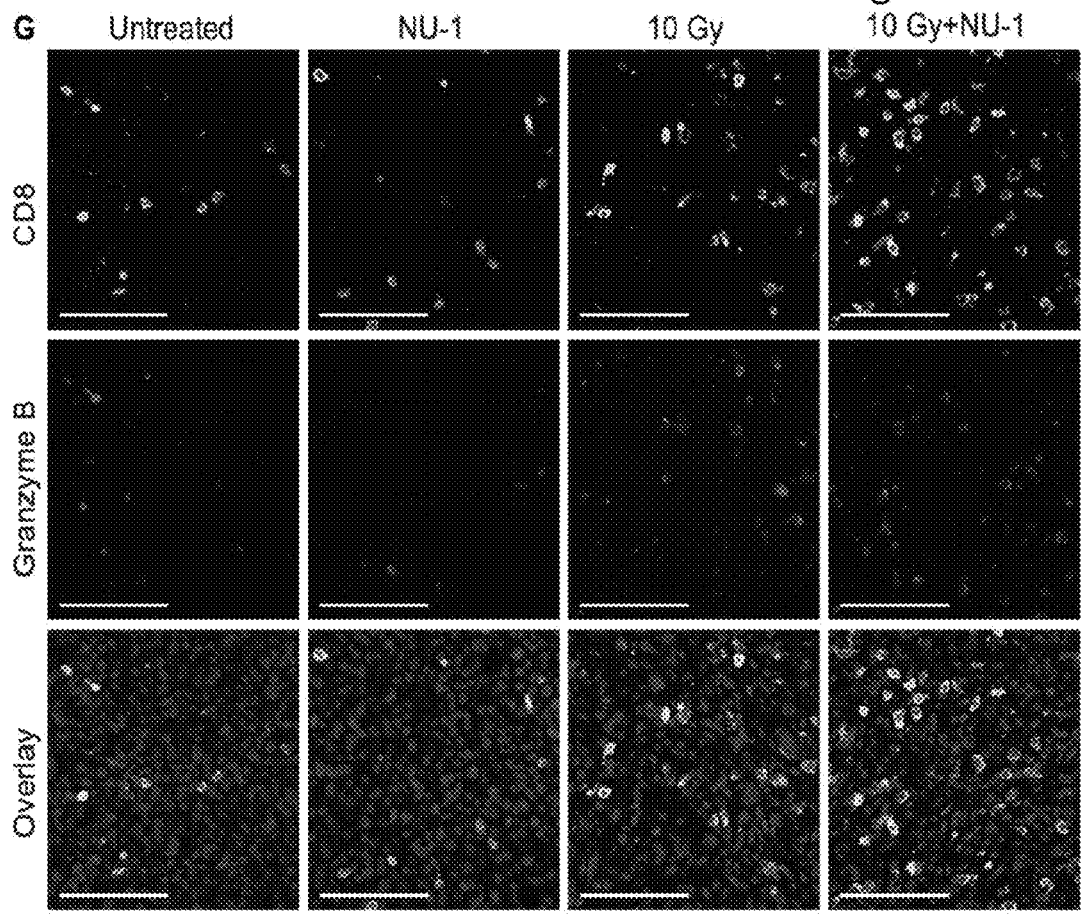
Figure 6:
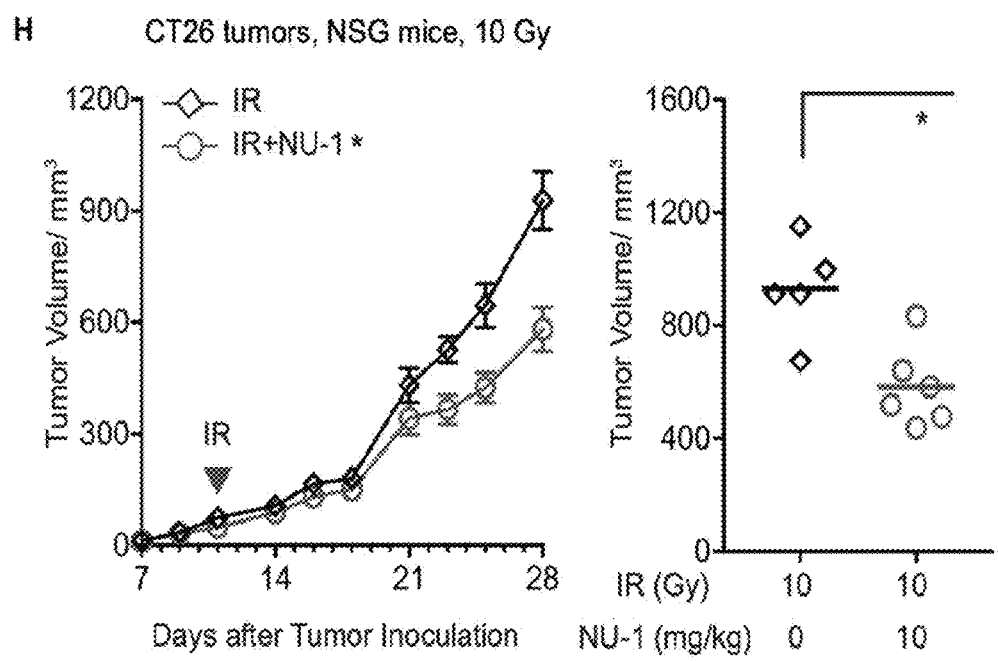
Figure 6:
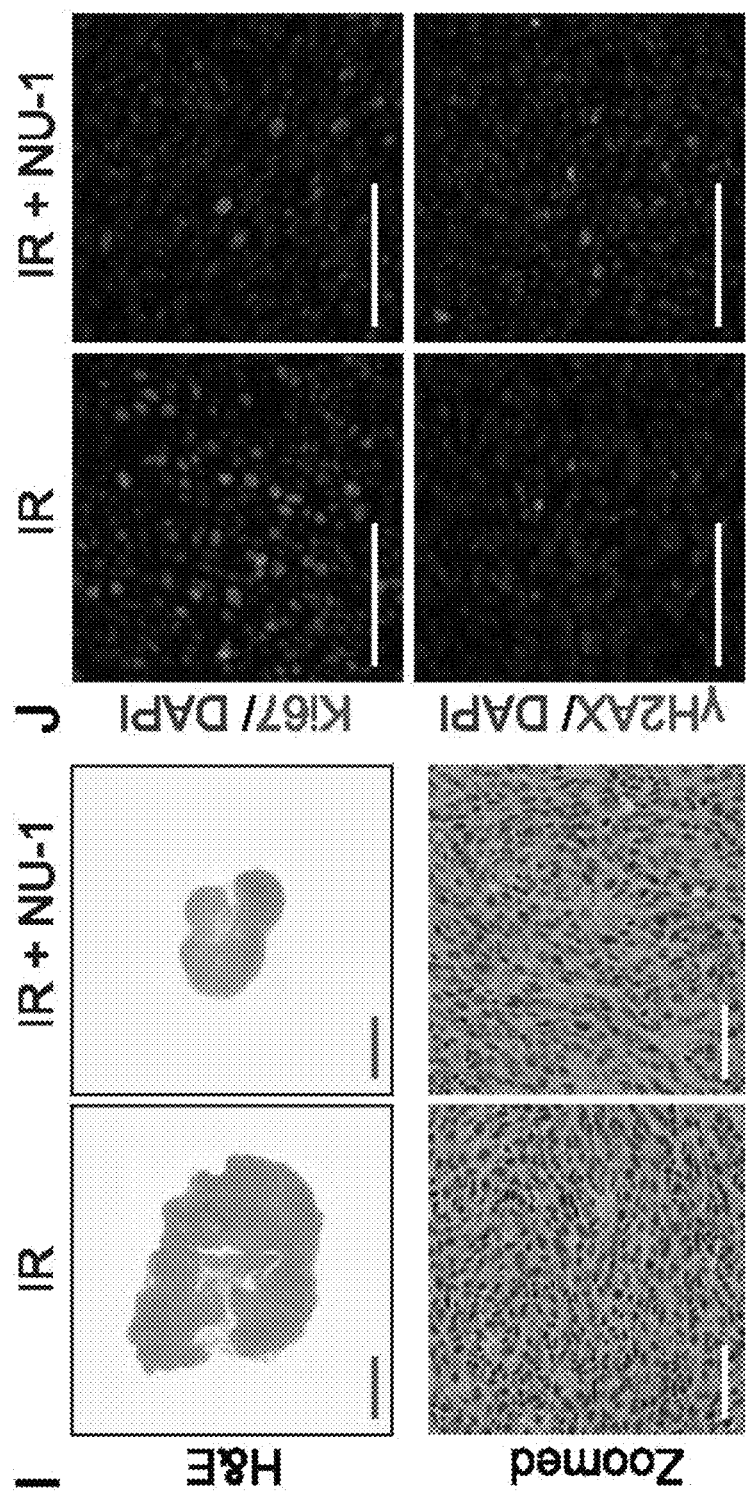
Figure 9:
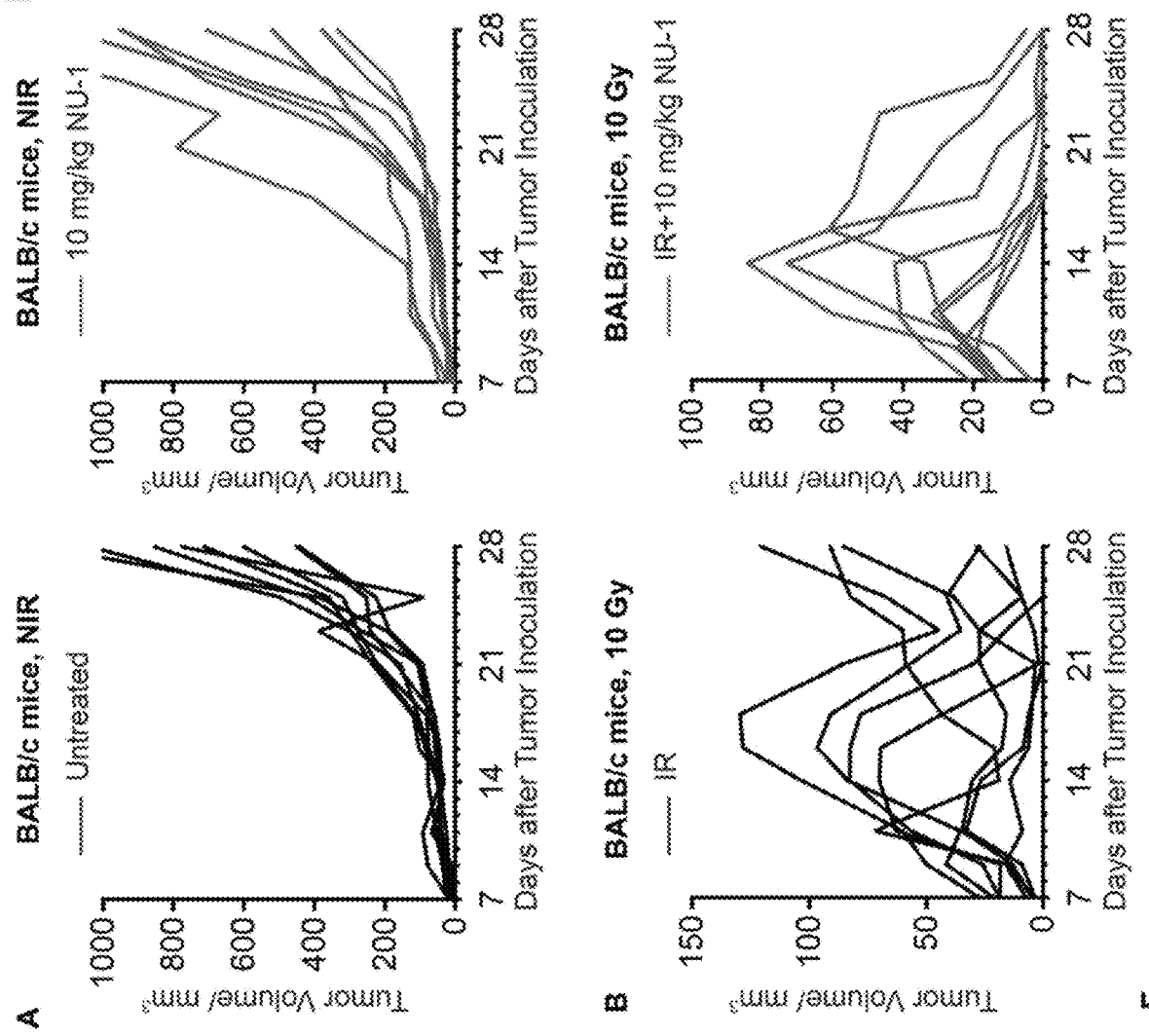
FIG. 9. TERT inhibition sensitizes CT26 tumors to radiation. (A-C) Growth curve of individual CT26 tumors in BALB/c mice. A and B, Tumor growth in individual BALB/c mice shown in FIGS. 6B and 8C. C, Tumors were measured for 54 days after CT26 cell inoculation in BALB/c mice after radiation alone or combined with NU-1 (n=3 for each). (D) Bar graphs showing quantification of proliferating cells (Ki67+) and DNA damage (γH2AX+) in stained tumors shown in FIG. 6E. Data from >3 non-overlapping images, mean±SEM. (E) Tumor growth in individual NSG mice as shown in FIG. 6H. (F) Bar graphs showing quantification of proliferating cells (Ki67+) and DNA damage (γH2AX+) in tumors stained as in FIG. 6E. Data from >3 non-overlapping images, mean±SEM. *P<0.001; 0.001<P<0.01; *0.01<P<0.05; n.s. P>0.05 compared to DMSO (unpaired t-test).
Figure 9:
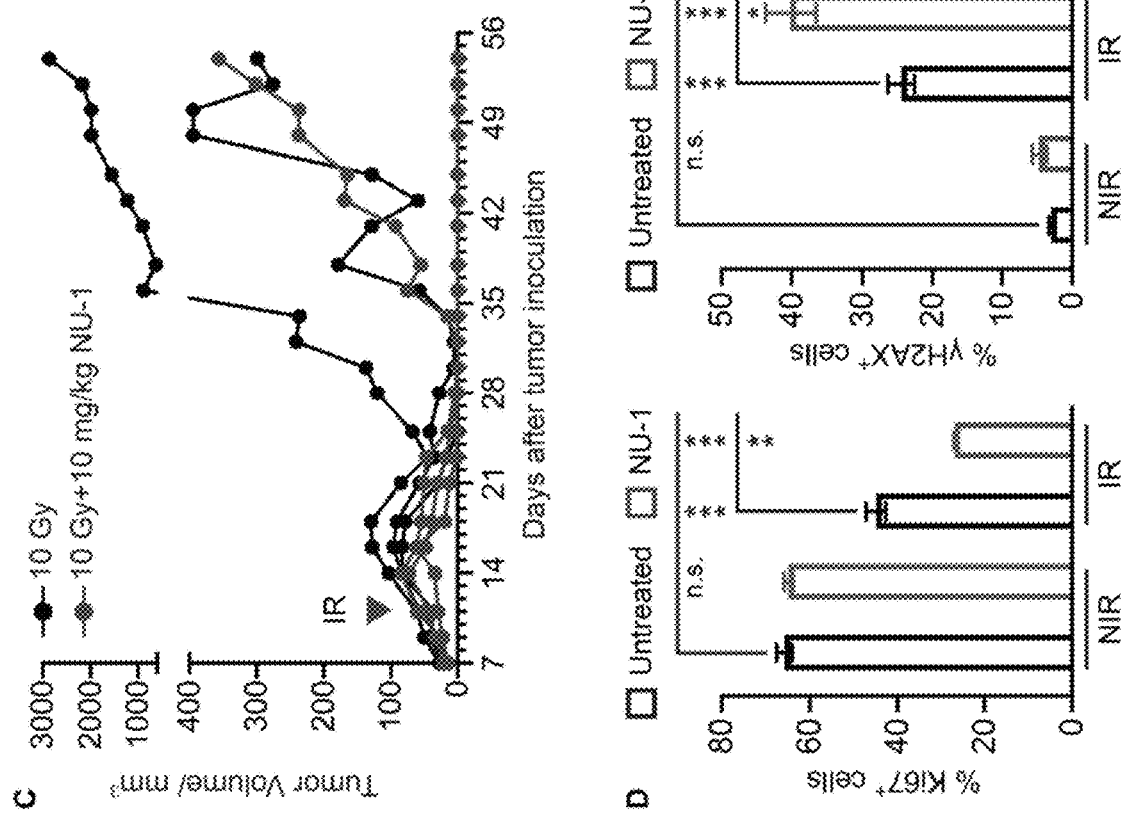
Figure 9:
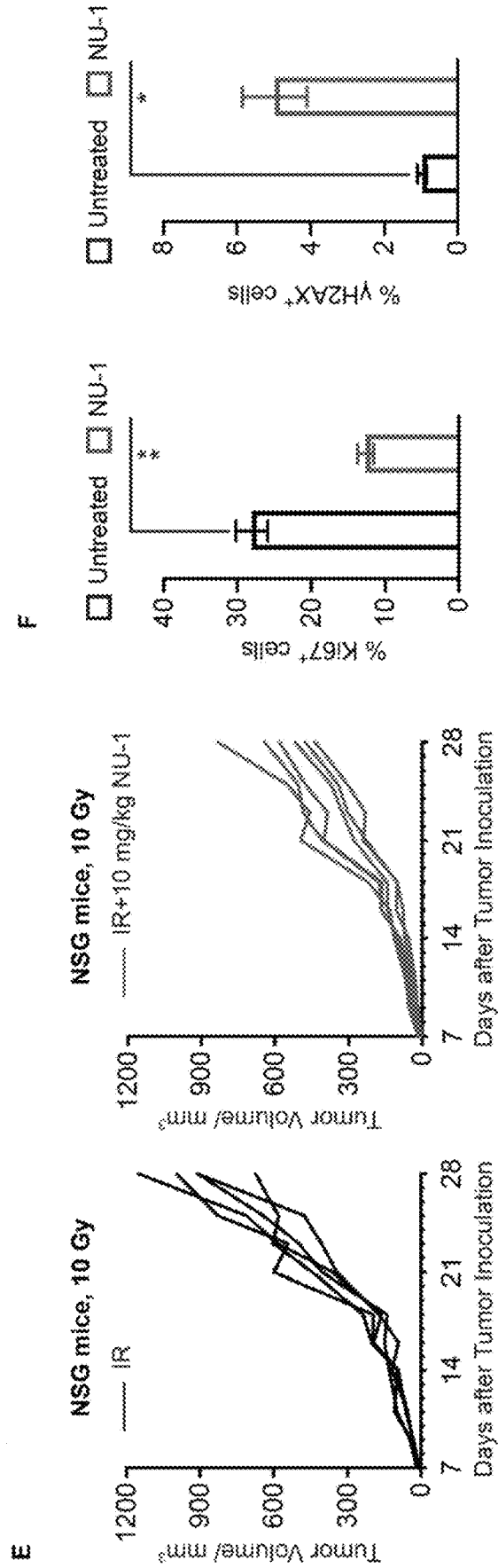

Toward enabling in vivo studies in an immunocompetent host, we assessed NU-1 effects on the BALB/c-derived colon carcinoma cell line CT26. 1 µM NU-1 and 2 µM MST were tolerated in a clonogenic assay while BIBR was non-toxic even at 20 µM, consistent with its known inactivity on murine TERT (Pascolo et al., 2002) (FIG. 2A). Non-toxic doses of NU-1 and MST sensitized CT26 cells to radiation and enhanced senescence induction by IR while BIBR had no similar effects (FIG. 2B-D, Table 1). After confirming that NU-1 was well-tolerated by BALB/c mice, we then evaluated the growth of subcutaneous CT26 tumors treated with daily intraperitoneal (IP) injections of NU-1 on Days 9 to 13 after tumor inoculation, with or without a single 10 Gy radiation dose on Day 11 (FIG. 6A). NU-1 had no appreciable effect on its own while IR produced a moderate growth delay (FIGS. 6B, C, 9A and B). Tumors treated with IR+NU-1 displayed a marked growth delay, with 7 of 8 tumors being eliminated within two weeks after treatment. Once tumors were cleared, they did not recur (FIG. 9C). Histology analysis of tumors removed on Day 18 revealed marked tissue destruction and loss of cellularity after IR+NU-1 treatment while immunofluorescence revealed lower expression of proliferation marker Ki-67 and upregulation of persistent γH2AX compared to IR alone (FIGS. 6D, E, and 9D).

The elimination of tumors by combined NU-1 and radiation treatment suggested the potentiation of anti-tumor immune response. Therefore, we probed the serial tumor sections to detect CD45⁺ immune infiltrate, CD11c⁺ dendritic cells (DCs), CD8⁺ cytotoxic T lymphocytes (CTLs) and cytotoxic protease granzyme B. IR+NU-1 treated tumors displayed markedly higher tumor immune infiltration, including increased DCs (FIG. 6F) along with higher levels of CTLs, many of which appeared activated (CD8⁺/granzyme B, FIG. 6G).

Figure 7:
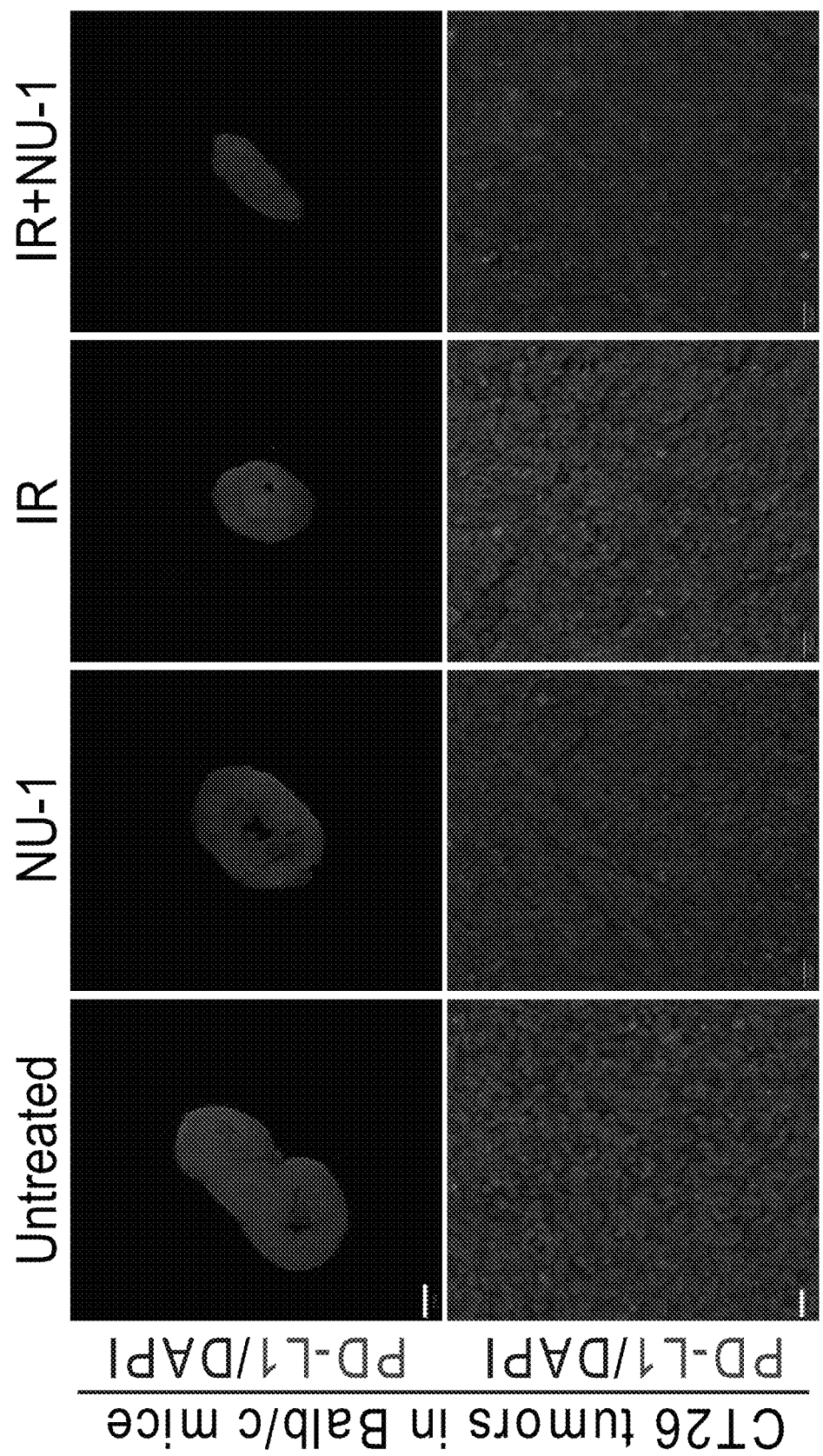
FIG. 7. NU-1 suppresses PD-L1 expression after irradiation. Immunoflourescence analysis of serial sections of CT26 tumors shown in FIGS. 6D, E and F reveals the expected PD-L1 induction by 7 d after treatment with 10 Gy IR. Combined treatment with NU-1 reduces PD-L1 compared to 10 Gy alone. Scale bar, 1 mm (low magnification), 20 µm (high magnification).

Importantly, staining treated tumors for PD-L1 revealed the expected induction of PD-L1 after IR alone but less increase in PD-L1 in IR+NU-1 treated tumors (FIG. 7). This pattern is consistent with immunogenic radiosensitization by NU-1 and interruption of the pathway of rebound immunosuppression, enabling an effective anti-tumor immune response.

To examine the role of adaptive immunity further, CT26 tumors formed in immunodeficient NSG mice lacking mature B, T or NK cells were treated with IR alone or combined with NU-1, again following the schema in FIG. 6A. Unlike CT26 tumors in wildtype BALB/c mice, IR alone failed to induce tumor regression or prolonged growth delay in NSG mice. While concomitant treatment with NU-1 enhanced growth delay in NSG mice (FIGS. 6H and 9E) and decreased tumor cell proliferation and increased DNA damage response (FIGS. 6I, J, and 9F), the compound effect was no longer sufficient to eliminate tumors.

Senescent CT26 Cells Formed by TERT Inhibition and Radiation Activate DCs to Prime T Cells A prerequisite for priming CTL-mediated immune response is for DCs to present tumor antigens in the context of the major histocompatibility complex (MHC) (Sánchez-Paulete et al., 2017). To model the process in vitro, we treated CT26 cells with DMSO, NU-1, or MST for 5 days and with 0 or 10 Gy and co-cultured them overnight with bone marrow-derived CD11c$^+$/CD103$^+$ dendritic cells (BMDCs) (Mayer et al., 2014) (FIG. 8A). Overall, co-culture with senescent irradiated CT26 cells promoted DC surface expression of CD86, CD80, and H-2K$^d$ Class I MHC (FIGS. 8B and 7C), corresponding to DC maturation/activation. The TERT inhibitors further increased the level of H-2K$^d$, which may be limiting for CD8$^+$ T cell stimulation.

Figure 10:
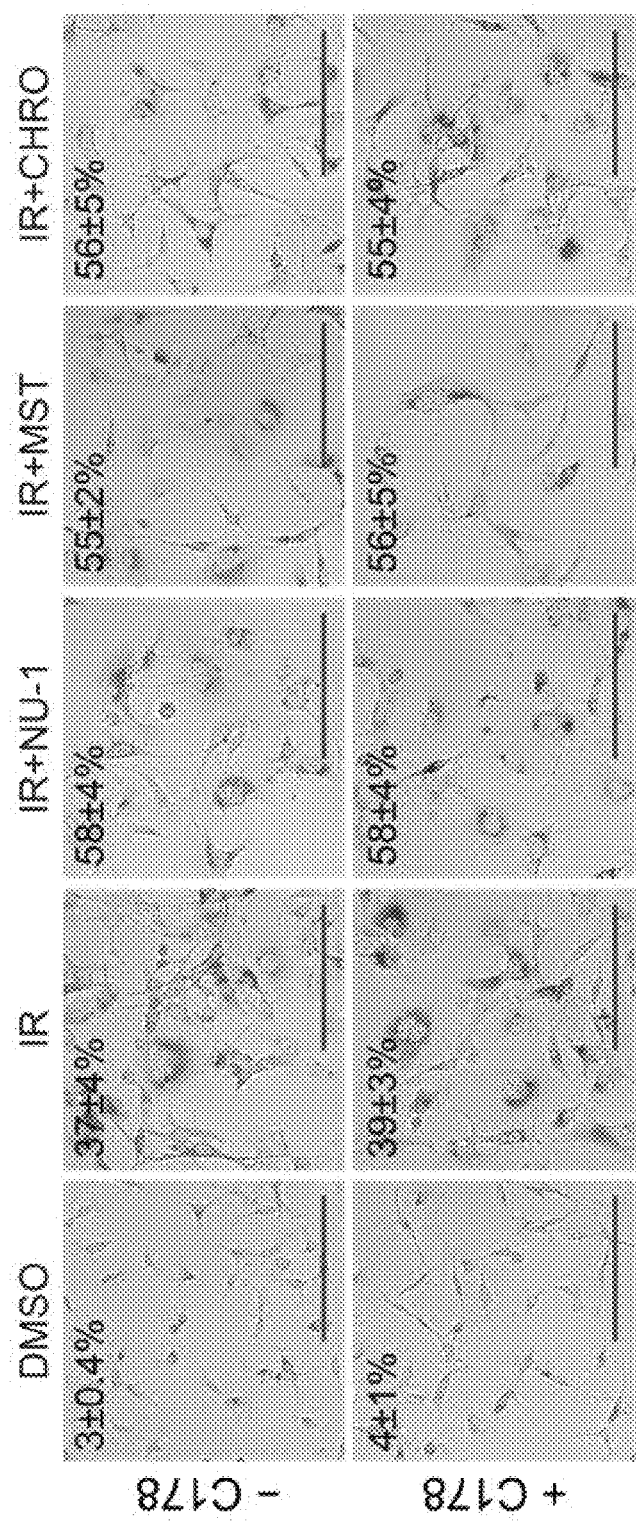
FIG. 10. STING is not required for senescence in CT26 cells. SA-β-Gal staining of CT26 cells. CT26 cells were treated with IR (10 Gy), IR+NU-1 (1 µM), IR+MST (2 µM), IR+CHRO (1 µM), or DMSO control in the presence or absence of STING inhibitor C178 (4 µM). Cells were fixed and stained 5 days after irradiation. Representative 20× images are shown. Percentage of SA-β-Gal+ cells are indicated (mean±SD). Scale bars=200 µm.

To examine DC APC function, we combined BMDCs prestimulated by CT26 cells with splenocytes that were obtained from CT26 immunized mice and labeled with carboxyfluorescein succinimidyl ester (CFSE) (Quah et al., 2007). CFSE dilution was examined after 5 days by flow cytometry (FIG. 7D). DCs stimulated by unirradiated CT26 cells, treated with TERT inhibitors or not, drove proliferation of 10-16% of CD8$^+$ T cells. DCs co-cultured with senescent CT26 cells increased proliferating CD8$^+$ cells to 26.4% while NU-1 or MST treated and irradiated CT26 cells yielded 33.5% and 30.4% proliferating CD8$^+$ T cells respectively (FIGS. 8C and 10A). BMDCs cocultured with senescent CT26 cells also induced more CD4$^+$ T cell proliferation, though with little appreciable impact from TERT inhibitors (FIGS. 8D and 10B). Overall, the pattern confirms the potential for combining NU-1 and radiation to promote a cytotoxic T cell-mediated anti-tumor immune response.

Persistent chromosomal damage and other triggers of senescence can lead to cytoplasmic DNA accumulation and activation of cGAS-STING signaling (Hopfner and Hornung, 2020), an innate immune pathway that drives DC activation and function (Yum et al., 2019). To explore interactions between TERT and STING, we treated proliferating CT26 cells with the covalent STING inhibitor C178 (Haag et al., 2018) prior to IR with or without TERT inhibitors. C178 did not prevent irradiated cells from entering senescence (FIG. 10C) but reduced stimulation of DCs to that of unirradiated controls (FIG. 8E). These results implicate cytoplasmic DNA sensing and STING activation as mediators of DC activation by senescent cells, but leave open how TERT inhibition may further stimulate anti-tumor immune response.

Experimental Model and Subject Details

Cell Lines

MCF7 (a breast cancer cell line from a 69-year-old white female in 1970), Saos-2 (an osteosarcoma cell line from an 11-year-old white female in 1973), and CT26 (a colorectal carcinoma cell line from a female BALB/c mouse) cells were obtained from ATCC. 293T (an immortalized cell line exhibiting epithelial morphology isolated from female fetal kidney in 1973) and MCF7 stably expressing the tetracycline-regulated transactivator Tet-On Advanced were obtained from Takara. MCF7-FUCCI cell line with FUCCI cell cycle reporter constructs was reconstructed here by transduction with lentivirus expressing mVenus-hGeminin (1/110)/pCSII-EF-MCS and mCherry-hCdt1 (30/120)/pC-SII-EF-MCS (Sakaue-Sawano et al., 2008). Cells with positive expression were selected by fluorescence-activated cell sorting (FACS). The cells were maintained at 37° C. and 5% $CO_2$ in DMEM containing 4.5 g/l glucose (Thermo Fisher Scientific) supplemented with 10% Tet-approved FBS (Atlanta Biologicals) and 1% penicillin/streptomycin (Thermo Fisher Scientific). The cells were tested for mycoplasma contamination and authenticated by a short tandem repeat profile (IDEXX BioResearch) prior to performing experiments. All experiments were performed within 3 to 10 passages after thawing cells.

Mice

BALB/c wildtype mice were purchased from Envigo. NOD.Cg-Prkdc$^{scid}$ Il2rg$^{tm1Wjl}$/SzJ, NSG mice were originally purchased from The Jackson Laboratory and bred inhouse. Mice of both sexes were used, with no sex difference observed. Naive healthy mice aged 7-9 weeks with an average weight of 20 g were used and maintained according to the guidelines of the Institutional Animal Care and Use Committee. In experiments involving tumor growth, the tumor bearing mice were randomly divided into groups of at least 5 for each treatment condition. No animals died before the final day shown for each experiment except for those sacrificed due to their tumors reaching a humane endpoint. All animal studies were performed as approved by the IACUC of the University of Chicago.

Bone Marrow Dendritic Cells (BMDCs)

Bone marrow dendritic cells (BMDCs) were differentiated as previously described (Mayer et al., 2014). Briefly, bone marrow was isolated from 7-8 week female BALB/c mice, maintained at 37° C. and 5% $CO_2$ in basic murine immune cell culture medium supplemented with 1 ng/ml mouse recombinant GM-CSF (PeproTech) and 200 ng/mL mouse recombinant Flt-3 ligand (PeproTech) for 14 days to form immature BMDCs. The basic murine immune cell culture medium was RPMI medium (Thermo Fisher Scientific) supplemented with 10% heat-inactivated FBS (Thermo Fisher Scientific), 1% penicillin/streptomycin (Thermo Fisher Scientific), and 50 μM β-mercaptoethanol (Thermo Fisher Scientific). All animal studies were performed as approved by the IACUC of the University of Chicago.

Splenocytes From CT26 Cell Immunized BALB/c Mice

CT26 immunized mice were prepared by subcutaneously injecting 7-9 week female BALB/c mice with 0.5×10$^6$ irradiated (20 Gy) CT26 cells twice at 10 day intervals. 5 days after the second injection, spleens were isolated from mice, transferred under cell culture hood, quickly immersed in 70% ethanol for 20-30 s for sterilization, then immediately transferred onto the 70 μm strainer in 10 mL cold PBS in 10-cm petri dish. Spleens were then meshed, and the cell strainer was rinsed with 10 mL PBS. The cell suspension was transferred into a 50 mL tube and pelleted by centrifuging for 5 min at 300 g. Red blood cells were lysed using RBC Lysis Buffer (BioLegend, Cat #420301) according to the manufacturer's protocol. After washing, the splenocytes were ready for the downstream application. All animal studies were performed as approved by the IACUC of the University of Chicago.

Chemical Probes

Chrolactomycin was isolated from *Actinospica* (Iorio et al., 2012) and NU-1 and the des-exomethylene analog NU-2 were synthesized and purified as described (Betori et al., 2020). BIBR 1532 and MST-312 were obtained from Cayman Chemical. Irinotecan, doxorubicin, etoposide, paclitaxel, and C178 were obtained from Selleck Chemicals.

RNA Sequencing Analysis $3 \times 10^4$/flask MCF-7 cells were seeded in a T25 flask, cultured overnight, and treated with 0.5 µM NU-1 or DMSO for 48 h. Media was removed, cells were washed 2 times with PBS, followed by chemical disassociation with TrypLe (Thermo Fisher Scientific). Media was added to quench the TrypLe, the cell suspension was centrifuged at 300 g for 5 min, then the supernatant were removed and the cell pellets were immediately froze in −80° C. The frozen cell pellets were shipped in cold shipping box with dry ice to Applied Biological Materials for RNA isolation, sequencing, reads alignment and gene abundance estimation. Briefly, RNA was isolated using Trizol (Thermo Fisher Scientific). The quality of the RNA extraction was assessed by gel electrophoresis. All the samples passed internal QC for library preparation. Sequencing libraries were prepared using Illumina TruSeq Stranded mRNA Library Preparation kit following the manufacturer's recommendations. The quality of the libraries was assessed using Qubit DNA assay, Agilent Bioanalyzer, and qPCR. All libraries passed internal QC. Sequencing was performed with an Illumina NextSeq system. After sequencing, the paired-end reads were aligned with the hg38 human reference genome by Hisat2. The abundance of genes was quantified by Htseq-count. Analysis of differentially expressed genes (DEGs) between NU-1 treated and control cells was performed with EdgeR in R studio in house, with dispersion value estimated as 0.01. Genes were considered significantly upregulated if they displayed fold change>1.5 and P value<0.1 and significantly downregulated if fold change<−1.5 and P value<0.1, comparing NU-1 treated and control cells. The DEG lists were subjected to GO analysis by Reactome (Fabregat et al., 2018), DAVID (Huang da et al., 2009), and Ingenuity Pathway Analysis (IPA) (Krämer et al., 2014) to detect enriched pathways.

Chemosensitization Studies $1 \times 10^4$/well MCF-7, A549, or Saos-2 cells were seeded in 96-well plates (black wall, flat clear bottom, Corning 3916). Cells were allowed to adhere overnight, then the old medium was replaced by fresh medium containing 0.5 µM NU-1, 0.5 µM NU-2, 10 µM BIBR 1532, 1 µM MST-312 or DMSO vehicle. After incubation for 4 h, DMSO stock solutions were diluted to a final concentration of 0.001, 0.01, 0.1, 1, 10, 100 µM for irinotecan, 0.001, 0.01, 0.1, 1, 10, 100 µM for etoposide, 1, 3, 10, 32, 100, 316, 1000 µM for doxorubicin, or 1, 2.5, 6, 16, 40, 100, 316, 1000 µM for paclitaxel. The final volume of cell culture medium in each well was 100 µL. Then the cells were continuously incubated for 24 h at 37° C. and 5% $CO_2$. After that, cell viability was measured by CellTiter-Glo assay (Promega) according to the manufacturer's protocol. Briefly, after equilibrating plates to room temperature for 30 min, 100 µL of freshly prepared CellTiter-Glo reagent was added to each well, mixed on an orbital shaker for 10 min and luminescence was recorded on a PerkinElmer Enspire multimode plate reader. Data from three independent biological replicates were acquired.

For co-administration chemosensitization studies, $1 \times 10^4$ MCF-7 cells were seeded in 96-well plates and allowed to adhere overnight. Then the old medium was replaced by 100 µL fresh medium containing 0.5 µM NU-1 or DMSO+0.001, 0.01, 0.1, 1, 10, 100 µM irinotecan. Cells were continuously cultured for 24 h at 37° C. and 5% $CO_2$. After that, the plates were collected for CellTiter-Glo assay. For post-administration chemosensitization studies, MCF7 cells were seeded and adhered in 96-well plates overnight as mentioned above. Then the old medium was replaced with fresh medium containing 0.001, 0.01, 0.1, 1, 10, 100 µM irinotecan. Cells were incubated for 4 h, followed by addition of either 0.5 µM NU-1 or DMSO and the final volume of cell culture medium in each well brought to 100 µL. Then the plates were incubated for another 24 h before CellTiter-Glo assay. Data from three independent biological replicates were acquired.

Nonlinear regression with variable slope was used to draw the dose response curve and calculate the Lethal Dose 50 for cells ($LD_{50}$) using GraphPad Prism software. Towards quantitatively measuring the extent of drug interaction, a combination index (CI) was calculated using CompuSyn software (Chou and Martin, 2005). As reported previously, the $LD_{50}$ of NU-1 in MCF7 and A549 cells is 21 µM and 35 µM respectively, while undetectable in Saos-2 cells (Betori et al., 2020).

Clonogenicity Assays

MCF7, Saos-2, or CT26 cells were seeded in 6-well plates at 100 cells per well in triplicate and allowed to attach overnight. MCF7 or CT26 cells were then treated with DMSO vehicle or TERT inhibitors in final concentration of 0.25, 0.5, 0.75, 1, 2 µM for NU-1, 2.5, 5, 7.5, 10, 20 µM for BIBR 1532, or 1, 2, 3, 4, 5 µM for MST-312. Saos-2 cells were treated with DMSO vehicle or TERT inhibitors in final concentration of 0.25, 0.5, 0.75, 1, 2 µM for NU-1 or 2.5, 5, 10, 20, 40 µM for BIBR 1532. The final volume of cell culture medium was 3 mL per well. MCF7 and Saos-2 cells were continuously cultured for 3 weeks and CT26 for 2 weeks in the presence of TERT inhibitors, fixed in methanol for 5 min, then stained with 0.5% crystal violet for 10 min at room temperature. After washing with water, the plates were dried at room temperature and imaged with an iBright Imaging System (Thermo Fisher Scientific).

To assess radiosensitivity, MCF7, Saos-2, or CT26 cells were seeded in 6-well plates at 100 cells per well in triplicate, allowed to attach overnight and treated with DMSO or TERT inhibitors at subtoxic concentrations for 1 h prior to IR. MCF7 cells were treated with 0.5 µM NU-1, 10 µM BIBR 1532, or 1 µM MST-312, Saos-2 cells with 1 µM NU-1 or 20 µM BIBR 1532 and CT26 cells with 1 µM NU-1, 20 µM BIBR 1532 or 2 µM MST-312. Doses of 0, 1, 2, 3, 4, or 5 Gy were applied using a GammaCell $^{60}$Co γ-ray source (Nordion) at a dose rate of 7.09 cGy/sec. After that MCF7 and Saos-2 cells were cultured for 3 weeks and CT26 for 2 weeks, then fixed and stained with crystal violet. Colonies of at least 50 cells were counted. Data from three independent biological replicates were acquired. The surviving fraction (SF) was calculated using the following formula:

$$SF\ (x\ Gy) = \frac{\text{No. of colonies at } x\ Gy}{\text{No. of colonies at } 0\ Gy}$$

Time-Lapse Live-Cell Analysis of Cell Proliferation

MCF7 cells were seeded in 6-well plates at $3 \times 10^4$ cells per well, recovered overnight, then treated with DMSO, NU-2 (0.5 µM), NU-1 (0.5 µM), chrolactomycin (0.5 µM), BIBR 1532 (10 µM), or MST-312 (1 µM) for 1 h and irradiated with 0 or 6 Gy using the 60Co γ-ray source at 7.09 cGy/sec. Saos-2 cells were similarly seeded and cultured and then treated with DMSO vehicle, NU-1 (1 µM), or BIBR 1532 (20 µM) for 1 h, followed by 0 or 6 Gy IR. Immediately after IR, the plates were analyzed by time-lapse imaging in an IncuCyteS3 (Sartorius) live-cell imaging system. Phase contrast channel images were acquired at 20× magnification with scanning every 2 h for 6-7 days. 25 non-overlapping fields were captured for each well. Quantitative analysis of cell confluency was performed using IncuCyteS3 2019 software.

Apoptosis Analysis

MCF7 cells were seeded in 6-well plates with $3\times10^4$ cells per well, allowed to attach, then treated with DMSO, NU-2 (0.5 µM), NU-1 (0.5 µM) or chrolactomycin (0.5 µM) and irradiated with 0 or 6 Gy. 7 days after IR, cells were incubated with 1 µM YO-PRO-1 iodide (Thermo Fisher Scientific) for 30 min at 37° C. and imaged in the IncuCyteS3. Phase contrast and green channel images were acquired at 20× magnification. 25 non-overlapping fields were captured for each well. Quantitative analysis of cell confluency was performed using IncuCyteS3 2019 software.

Senescence-Associated Beta-Galactosidase (SA-β-Gal) Assay

MCF7, Saos-2, or CT26 cells were seeded at $3\times10^4$ per well in 6-well plates and allowed to attach to plate overnight. For TERT inhibition, MCF7 cells were treated with DMSO vehicle, NU-2 (0.5 µM), NU-1 (0.5 µM), chrolactomycin (0.5 µM), BIBR 1532 (10 µM), or MST-312 (1 µM) for 1 h prior to IR, Saos-2 cells were treated with DMSO vehicle, NU-2 (1 µM), NU-1 (1 µM), chrolactomycin (1 µM), BIBR 1532 (20 µM), or MST-312 (1 µM) for 1 h prior to IR, and CT26 cells were treated with MSO vehicle, NU-2 (1 µM), NU-1 (1 µM), chrolactomycin (1 µM), BIBR 1532 (20 µM), or MST-312 (2 µM) for 1 h prior to IR. Then MCF7 and Saos-2 cells were irradiated with 0 or 6 Gy and CT26 cells with 0 or 10 Gy. After IR, MCF7 and Saos-2 cells were continuously cultured for 7 days and CT26 for 5 days, then fixed in 2% PFA and stained with staining buffer (1 mg/ml X-Gal (Golden Bio), 40 mM citric acid/sodium phosphate, 150 mM NaCl, 2 mM $MgCl_2$, 3.3 mM $K_3[Fe(CN)_6]$, 3.3 mM $K_4[Fe(CN)_6]$, pH=6) for 16 h at 37° C., then washed with warm PBS three times and imaged in PBS within a week. Images were captured on a Zeiss Axiovert 200M microscope with a 20× Plan-NeoFluar objective and Axiocam digital camera. SA-β-Gal-positive and -negative cells were counted in more than 5 fields, yielding an average percentage indicated on each SA-β-Gal image as mean±SD. Three replicates were performed.

Flow Cytometric Analysis of Cell Cycle

MCF7 cells were seeded at $3\times10^4$ per well in 6-well plates, allowed to attach overnight, then treated with DMSO, NU-1 (0.5 µM), BIBR 1532 (10 µM), or MST-312 (1 µM) for 1 h before irradiation with 0 or 6 Gy. 24 h after IR, cells were trypsinized, fixed with 70% cold ethanol and stained with 1 µg/mL DAPI. Cells were analyzed using a BD Fortessa 4-15 HTS Flow cytometer. DAPI signal was measured using a 405-nm laser for excitation and a 450/50 filter for detection. Data were analyzed by FlowJo univariate cell cycle analysis. Three replicates were performed.

Time-Lapse Live-Cell Analysis of Cell Cycle

MCF7-FUCCI cells were seeded at $3\times10^4$ per well in 6-well plates, allowed to attach overnight, then treated with 0.5 µM NU-2 control, NU-1 or chrolactomycin for 1 h, followed by 6 Gy. Then, live-cell imaging was conducted using the IncuCyteS3. Phase contrast along with green and red channels were acquired at 20× magnification with scanning every 2 h for 6 days. 16 non-overlapping fields were captured for each well. Representative consecutive images were used to create the movies using Fiji (Schindelin et al., 2012).

DNA Damage Foci Staining

MCF7 or Saos-2 cells were seeded on sterile cover glass at $2.5\times10^4$ per well in 24-well plates. MCF7 cells were treated with DMSO, NU-2 (0.5 µM), NU-1 (0.5 µM), chrolactomycin (0.5 µM), BIBR 1532 (10 µM), or MST-312 (1 µM) for 1 h, and Saos-2 cells were treated with DMSO or NU-1 (1 µM) for 1 h, followed by 0 or 6 Gy irradiation. 24 h after irradiation, cells were fixed with 4% PFA for 10 min and permeabilized with 0.2% Triton-X 100 diluted in PBS for 10 min at room temperature. After blocking with 5% BSA-PBS for 1 h, primary antibodies for γH2AX (Millipore, 05-636, 1:1000) or 53BP1 (Novus, NB100-304, 1:1000) diluted in 5% BSA-PBS were then incubated on cell slides overnight at 4° C. Following PBS washes, DAPI (1 µg/mL) and fluorescent secondary antibodies (Jackson ImmunoResearch, 1:2000, ) diluted in 5% BSA-PBS were applied for 1 h at room temperature. Cell slides were mounted with ProLong Gold Antifade Mountant (Thermo Fisher Scientific) after PBS washes. Foci images were captured on a Zeiss Axiovert 40CFL with a 40× Plan-NeoFluar objective and pseudo-colored using Fiji. Three replicates were performed.

Telomere PNA and γH2AX Double Staining

MCF7 cells were seeded onto sterile coverslips at $3\times10^4$ per well in 24-well plates and cultured overnight, then treated with DMSO, NU-2 (0.5 µM), NU-1 (0.5 µM), chrolactomycin (0.5 µM), BIBR 1532 (10 µM), or MST-312 (1 µM) for 1 h, followed by 0 or 6 Gy IR. 24 h after IR, cells were fixed with 2% PFA for 15 min at room temperature, permeabilized with 0.2% Triton-X100, blocked with 5% BSA-PBS, incubated with anti-γH2AX (Millipore, JBW301, 1:1000) antibodies overnight at 4° C. and then 1 h with Alexa Fluor 647-Goat Anti-Mouse antibody (Jackson ImmunoResearch, Cat #115-605-003) for DNA damage foci staining. After that, cells were washed with PBS three times and fixed again in 2% PFA 15 min at room temperature. Then peptide nucleic acid fluorescence in situ hybridization (PNA FISH) with Alexa488-TelG probe (PNA Bio, F1008) was performed according to the manufacturer's protocol. Briefly, cells were incubated with 100 µg/ml RNase A solution and dehydrated in 70%, 85% and 100% cold ethanol for 2 min each. 0.5 µM PNA probe in 20 µL hybridization buffer (20 mM Tris, pH 7.4, 60% formamide, 0.5% of blocking reagent (Roche 11096176001)) was heated at 85° C. for 5 min. The preheated staining solution was applied to cells at 85° C. for 10 min for denaturation followed by overnight hybridization at room temperature in the dark. Cells were washed twice in washing solution (2×SSC/0.1% Tween-20) for 10 min at 55° C., incubated with 1 µg/mL DAPI for 10 min at room temperature, and then mounted with ProLong Gold Antifade Mountant (Thermo Fisher Scientific). Images were taken using a 3i Marianas Spinning Disk Confocal with 100× oil objective and pseudo colored with Fiji. Detailed primary antibody information is provided in Key resources table.

Neutral Comet Assay

For neutral comet assays, MCF7 or Saos-2 cells were seeded at $5\times10^4$ per well in 6-well plates. MCF7 cells were treated with DMSO, NU-2 (0.5 µM), NU-1 (0.5 µM), chrolactomycin (0.5 µM), BIBR 1532 (10 µM), or MST-312 (1 µM) for 1 h, and Saos-2 cells were treated with DMSO or NU-1 (1 µM) for 1 h, followed by 0 or 6 Gy. 24 h after IR, DNA damage was evaluated by CometAssay Single Cell Gel Electrophoresis (R&D Systems) according to the manufacturer's protocol. Briefly, cells were trypsinized and resuspended in 1% FBS-PBS at a final concentration of $2\times10^5$ cells/mL. 20 µL single cell suspension was mixed with 200 µL Comet LM agarose prewarmed at 37° C. and transferred onto CometSlides. The CometSlides were incubated at 4° C. for 20 min in the dark, immersed in prechilled Lysis Solution for 1 h at 4° C., equilibrated with 1× Neutral Electrophoresis Buffer for 30 min at 4° C., and single cell electrophoresis was performed using fresh 1× Neutral Electrophoresis Buffer at 21 volts for 45 min at 4° C. After electrophoresis, slides were immersed in DNA Precipitation Solution and 70% ethanol for 30 min each at room temperature, then dried overnight at room temperature. Slides were stained with SYBR green (Thermo Fisher Scientific) and imaged on a Zeiss Axiovert 40CFL with a 10× Plan-NeoFluar objective. Two or more replicates were performed. Images were analyzed using an ImageJ comet assay macro (https://www.med.unc.edu/microscopy/resources/imagej-plugins-and-macros/comet-assay/).

Traffic Light Repair Reporter assay

Three constructs for traffic light repair reporter (TLR) system (Certo et al., 2011): pCVL SFFV-EF1s HA.NLS.Sce, pCVL Traffic Light Reporter 1.1 (Sce target) Ef1a Puro and pCVL SFFV d14GFP Donor were obtained from Addgene. Lentivirus-containing supernatant was produced by transfection of the 293T Lenti-X cell line with corresponding plasmids and packaged plasmid mix. Then lentivirus-containing supernatant was applied to MCF7 Tet-On (Takara) cell or 293T cell line. In the meantime, DMSO control, NU-1 (0.5 μM), chrolactomycin (0.5 μM) or BIBR 1532 (10 μM) were added to transfected MCF7 Tet-On cells or 293T cells. Cell were continuously cultured with the presence or absence of TERT inhibitors for 3 days, then collected and analyzed using a BD Fortessa 4-15 HTS Flow cytometer. eGFP fluorescence was measured using a 488-nm laser for excitation and a 530/30 filter for detection, while mCherry fluorescence was measured by using a 561-nm laser for excitation and a 610/20 filter for detection. Data were analyzed using FlowJo software. At least three replicates were performed.

In Vivo Studies

For tumor inoculation, 7-9 week BALB/c mice or NSG mice were subcutaneously injected in the flank with $0.5 \times 10^6$ CT26 cells in 100 μL PBS. On Day 9 (tumor average volume ~30 mm$^3$), the tumor bearing BALB/c mice were randomly divided into 4 groups of 8, while the NSG mice were randomly divided into 2 groups of 5-6. For NU-1 treatment, 10 mg/kg of NU-1 in 100 μL PBS was injected intraperitoneally once on each of the 2 days before, the day of and 2 days after irradiation. Mouse weight was measured before treatment. Tumor irradiation was conducted on Day 11 using a RadSource RS-2000 X-Ray generator operating at 160 kV and 25 mA at 10 Gy, calibrated by NIST traceable dosimetry. From Day 7 after tumor inoculation, tumors were measured by calipers every 2-3 days and volume calculated using the formula: Tumor volume (mm$^3$)=length (mm)×width (mm)×width (mm)/2. On Day 18 after tumor inoculation, tumors from 3 mice under each treatment condition were collected for histology analysis. The rest of the mice were continuously maintained and recorded until at least Day 28 or reaching the humane endpoint for tumor volume. No animals that formed tumors after injection with CT26 cells were excluded from any studies reported here.

Histology and Immunofluorescence Analysis on Tumor Sections

CT26 tumors were collected 5 days after treatment (Day 18 after tumor inoculation) and fixed in 10% neutral formalin for 24 h. Formaldehyde-fixed paraffin-embedded (FFPE) tumors were sectioned and stained with hematoxylin and eosin (H&E) by the Human Tissue Resource Center at The University of Chicago. To perform immunofluorescence analysis, tumor sections were deparaffinized in xylene for 10 min, then rehydrated with 95%, 70%, 50%, and 0% ethanol for 5 min each. After that, the tumor section was immersed in 10 mM sodium citrate buffer (pH 6.0) for 30 min at 90° C. for antigen retrieval. Then the tumor sections were blocked in 5% BSA-TBS, stained with anti-Ki67 (1:1000), anti-γH2AX (1:500), anti-CD45 (1:500), anti-CD11c (1:250), anti-CD8 (1:250), anti-granzyme B (1:250) and anti-PD-L1 primary antibodies diluted in 5% BSA-TBS at 4° C. overnight. Followed by washing with TBST, tumor sections were stained with fluorophore-conjugated secondary antibodies (1:2000, Vector Labs) and DAPI (1 μg/mL) diluted in 5% BSA-TBS for 90 min at room temperature. The H&E stained tissue sections were scanned using an Olympus VS200 SlideView Whole Slide Scanner. The fluorescent tumor sections were imaged using a 3i Marianas Spinning Disk Confocal with a 20× objective and pseudo-colored using Fiji. Detailed primary antibody information is provided in Key resources table.

In Vitro DC Activation Assays

To evaluate effects of TERT on tumor immunogenicity, CT26 cells were seeded at $2 \times 10^4$ per well in 12-well plates, allowed to attach overnight, and then treated with DMSO, NU-1 (1 μM), or MST-312 (2 μM) for 1 h, followed by 0 or 10 Gy. 5 days after IR, the media were removed, cells washed with PBS, and fresh immune cell culture medium added. CT26 cells were then cultured overnight, followed by coculturing with immature BMDCs for 12-16 h at a 1:2 ratio. After coculture, the suspension BMDCs were collected into round bottom FACS tubes, washed with PBS, and stained with Zombie yellow (1:1000, BioLegend) for 10 min at room temperature. After washing with PBS, the cells were blocked for 10 min on ice with TruStain FcX anti-mouse CD16/32 (1:100, BioLegend) diluted in Cell Staining Buffer, followed by staining with CD11c (1:200), CD103 (1:200), CD86 (1:200), CD80 (1:200), and H-2K$^d$ (1:200) antibodies for 45 min at 4° C. After PBS washing, cells were resuspended in 300 μL Cell Staining Buffer and analyzed using a BD Fortessa 4-15 HTS Flow cytometer within 2 hours. Data were then analyzed by FlowJo software. Detailed antibody information is provided in Key resources table.

To examine the roles for STING, CT26 cells were seeded at $2 \times 10^4$ per well in 12-well plates and allowed to attach overnight. STING inhibitor C178 (0 or 4 μM) was added, followed by the addition of DMSO vehicle, NU-1 (1 μM), MST-312 (2 μM) or chrolactomycin (1 μM) for 1 h prior to 0 or 10 Gy. CT26 cells were cultured for 5 days, surviving cells were washed twice in PBS and cultured in fresh immune cell culture medium overnight. The CT26 cells were then cocultured with BMDCs for 12-16 h at a 1:2 ratio, and BMDCs were collected and analyzed after coculturing, as described above.

In Vitro T Cell Priming Assays

Splenocytes isolated from CT26 immunized mice were stained with 0.5 μM carboxyfluorescein succinimidyl ester (CFSE) (Thermo Fisher Scientific, Cat #C34554) for 10 min at room temperature (Quah et al., 2007). After washing with medium twice, CFSE labeled splenocytes were co-cultured for 5 days in a 20:1 ratio with BMDCs pre-stimulated by CT26 cells as DC activation assays. After coculturing, cells were collected and incubated with Zombie yellow for 10 min at room temperature, followed by PBS washing and blocking with TruStain FcX anti-mouse CD16/32 (1:100, BioLegend). After that, cells were stained with CD4 and CD8 antibodies for 30 min at 4° C. Cells were analyzed using a BD Fortessa 4-15 HTS flow cytometer and FlowJo software. Detailed antibody information is provided in Key resources table.

Quantification and Statistical Analysis

Statistical significance was determined using the non-paired Student's 1-test. Calculations were performed using GraphPad Prism software or Excel. P≤0.05 was considered statistically significant. Power analysis for animal experiments was performed using G*Power software, power (1-β) >0.85 for all animal experiments. Details on the sample size and p value of independent experiments can be found in the Figure Legends.

REFERENCES

Ahmed, S., Passos, J. F., Birket, M. J., Beckmann, T., Brings, S., Peters, H., Birch-Machin, M. A., von Zglinicki, T., and Saretzki, G. (2008). Telomerase does not counteract telomere shortening but protects mitochondrial function under oxidative stress. Journal of cell science 121, 1046-1053.

Ak$_1$nc$_1$lar, S. C., Low, K. C., Liu, C. Y., Yan, T. D., Oji, A., Ikawa, M., Li, S., and Tergaonkar, V. (2015). Quantitative assessment of telomerase components in cancer cell lines. FEBS letters 589, 974-984.

Akiyama, M., Yamada, O., Kanda, N., Akita, S., Kawano, T., Ohno, T., Mizoguchi, H., Eto, Y., Anderson, K. C., and Yamada, H. (2002). Telomerase overexpression in K562 leukemia cells protects against apoptosis by serum deprivation and double-stranded DNA break inducing agents, but not against DNA synthesis inhibitors. Cancer Lett 178, 187-197. 10.1016/s0304-3835 (01) 00838-2.

Armanios, M., and Greider, C. W. (2015). Treating Myeloproliferation—On Target or Off? N Engl J Med 373, 965-966. 10.1056/NEJMe1508740.

Arndt, G. M., and Mackenzie, K. L. (2016). New prospects for targeting telomerase beyond the telomere. Nat Rev Cancer 16, 508-524. 10.1038/nrc.2016.55.

Arnoult, N., Correia, A., Ma, J., Merlo, A., Garcia-Gomez, S., Maric, M., Tognetti, M., Benner, C. W., Boulton, S. J., Saghatelian, A., and Karlseder, J. (2017). Regulation of DNA repair pathway choice in S and G2 phases by the NHEJ inhibitor CYREN. Nature 549, 548-552. 10.1038/nature24023.

Berardinelli, F., Coluzzi, E., Sgura, A., and Antoccia, A. (2017). Targeting telomerase and telomeres to enhance ionizing radiation effects in in vitro and in vivo cancer models. Mutat Res Rev Mutat Res 773, 204-219. 10.1016/j.mrrev.2017.02.004.

Betori, R. C., Liu, Y., Mishra, R. K., Cohen, S. B., Kron, S. J., and Scheidt, K. A. (2020). Targeted Covalent Inhibition of Telomerase. ACS Chem Biol 15, 706-717. 10.1021/acschembio.9b00945.

Boike, L., Henning, N. J., and Nomura, D. K. (2022). Advances in covalent drug discovery. Nat Rev Drug Discov. 10.1038/s41573-022-00542-z.

Certo, M. T., Ryu, B. Y., Annis, J. E., Garibov, M., Jarjour, J., Rawlings, D. J., and Scharenberg, A. M. (2011). Tracking genome engineering outcome at individual DNA breakpoints. Nature methods 8, 671-676.

Chabanon, R. M., Rouanne, M., Lord, C. J., Soria, J. C., Pasero, P., and Postel-Vinay, S. (2021). Targeting the DNA damage response in immuno-oncology: developments and opportunities. Nat Rev Cancer 21, 701-717. 10.1038/s41568-021-00386-6.

Chen, Y. A., Shen, Y. L., Hsia, H. Y., Tiang, Y. P., Sung, T. L., and Chen, L. Y. (2017). Extrachromosomal telomere repeat DNA is linked to ALT development via cGAS-STING DNA sensing pathway. Nat Struct Mol Biol 24, 1124-1131. 10.1038/nsmb.3498.

Chou, T., and Martin, N. (2005). CompuSyn for drug combinations: PC software and user's guide: a computer program for quantitation of synergism and antagonism in drug combinations, and the determination of IC50 and ED50 and LD50 values. ComboSyn, Paramus, NJ.

de Lange, T. (2018). Shelterin-Mediated Telomere Protection. Annu Rev Genet 52, 223-247. 10.1146/annurev-genet-032918-021921.

Ding, X., Cheng, J., Pang, Q., Wei, X., Zhang, X., Wang, P., Yuan, Z., and Qian, D. (2019). BIBR1532, a Selective Telomerase Inhibitor, Enhances Radiosensitivity of Non-Small Cell Lung Cancer Through Increasing Telomere Dysfunction and ATM/CHK1 Inhibition. Int J Radiat Oncol Biol Phys 105, 861-874. 10.1016/j.ijrobp.2019.08.009.

Fabregat, A., Jupe, S., Matthews, L., Sidiropoulos, K., Gillespie, M., Garapati, P., Haw, R., Jassal, B., Korninger, F., May, B., et al. (2018). The Reactome Pathway Knowledgebase. Nucleic Acids Res 46, D649-D655. 10.1093/nar/gkx1132.

Fleisig, H. B., Hukezalie, K. R., Thompson, C. A., Au-Yeung, T. T., Ludlow, A. T., Zhao, C. R., and Wong, J. M. (2016). Telomerase reverse transcriptase expression protects transformed human cells against DNA-damaging agents, and increases tolerance to chromosomal instability. Oncogene 35, 218-227. 10.1038/onc.2015.75.

Ganesan, K., and Xu, B. (2017). Telomerase Inhibitors from Natural Products and Their Anticancer Potential. Int J Mol Sci 19. 10.3390/ijms19010013.

Ghanim, G. E., Fountain, A. J., van Roon, A. M., Rangan, R., Das, R., Collins, K., and Nguyen, T. H. D. (2021). Structure of human telomerase holoenzyme with bound telomeric DNA. Nature 593, 449-453. 10.1038/s41586-021-03415-4.

Goytisolo, F. A., Samper, E., Martin-Caballero, J., Finnon, P., Herrera, E., Flores, J. M., Bouffler, S. D., and Blasco, M. A. (2000). Short telomeres result in organismal hypersensitivity to ionizing radiation in mammals. J Exp Med 192, 1625-1636. 10.1084/jem.192.11.1625.

Greider, C. W., and Blackburn, E. H. (1985). Identification of a specific telomere terminal transferase activity in Tetrahymena extracts. Cell 43, 405-413. 10.1016/0092-8674 (85) 90170-9.

Guterres, A. N., and Villanueva, J. (2020). Targeting telomerase for cancer therapy. Oncogene 39, 5811-5824. 10.1038/s41388-020-01405-w.

Haag, S. M., Gulen, M. F., Reymond, L., Gibelin, A., Abrami, L., Decout, A., Heymann, M., van der Goot, F. G., Turcatti, G., Behrendt, R., and Ablasser, A. (2018). Targeting STING with covalent small-molecule inhibitors. Nature 559, 269-273. 10.1038/s41586-018-0287-8.

Herbert, B. S., Gellert, G. C., Hochreiter, A., Pongracz, K., Wright, W. E., Zielinska, D., Chin, A. C., Harley, C. B., Shay, J. W., and Gryaznov, S. M. (2005). Lipid modification of GRN163, an N3'→P5' thio-phosphoramidate oligonucleotide, enhances the potency of telomerase inhibition. Oncogene 24, 5262-5268. 10.1038/sj.onc.1208760.

Hopfner, K. P., and Hornung, V. (2020). Molecular mechanisms and cellular functions of cGAS-STING signalling. Nat Rev Mol Cell Biol 21, 501-521. 10.1038/s41580-020-0244-x.

Huang da, W., Sherman, B. T., and Lempicki, R. A. (2009). Systematic and integrative analysis of large gene lists using DAVID bioinformatics resources. Nat Protoc 4, 44-57. 10.1038/nprot.2008.211.

Iorio, M., Maffioli, S. I., Gaspari, E., Rossi, R., Mauri, P., Sosio, M., and Donadio, S. (2012). Chrolactomycins from the actinomycete actinospica. J Nat Prod 75, 1991-1993. 10.1021/np300470f.

Kim, M. M., Rivera, M. A., Botchkina, I. L., Shalaby, R., Thor, A. D., and Blackburn, E. H. (2001). A low threshold level of expression of mutant-template telomerase RNA inhibits human tumor cell proliferation. Proc Natl Acad Sci U S A 98, 7982-7987. 10.1073/pnas.131211098.

Koh, C. M., Khattar, E., Leow, S. C., Liu, C. Y., Muller, J., Ang, W. X., Li, Y., Franzoso, G., Li, S., Guccione, E., and Tergaonkar, V. (2015). Telomerase regulates MYC-driven oncogenesis independent of its reverse transcriptase activity. J Clin Invest 125, 2109-2122. 10.1172/jci79134.

Kondo, Y., Kondo, S., Tanaka, Y., Haqqi, T., Barna, B. P., and Cowell, J. K. (1998). Inhibition of telomerase increases the susceptibility of human malignant glioblastoma cells to cisplatin-induced apoptosis. Oncogene 16, 2243-2248. 10.1038/sj.onc.1201754.

Krämer, A., Green, J., Pollard Jr, J., and Tugendreich, S. (2014). Causal analysis approaches in ingenuity pathway analysis. Bioinformatics 30, 523-530.

Lamy, E., Goetz, V., Erlacher, M., Herz, C., and Mersch-Sundermann, V. (2013). hTERT: another brick in the wall of cancer cells. Mutat Res 752, 119-128. 10.1016/j.mrrev.2012.12.005.

Lechner, M. G., Karimi, S. S., Barry-Holson, K., Angell, T. E., Murphy, K. A., Church, C. H., Ohlfest, J. R., Hu, P., and Epstein, A. L. (2013). Immunogenicity of murine solid tumor models as a defining feature of in vivo behavior and response to immunotherapy. J Immunother 36, 477-489. 10.1097/01. cji.0000436722.46675.4a.

Li, S., Crothers, J., Haqq, C. M., and Blackburn, E. H. (2005). Cellular and gene expression responses involved in the rapid growth inhibition of human cancer cells by RNA interference-mediated depletion of telomerase RNA. J Biol Chem 280, 23709-23717. 10.1074/jbc.M502782200.

Liu, Y., Efimova, E. V., Ramamurthy, A., and Kron, S. J. (2019). Repair-independent functions of DNA-PKcs protect irradiated cells from mitotic slippage and accelerated senescence. J Cell Sci 132. 10.1242/jcs.229385.

Liu Y., Betori R. C., Pagacz J., Frost G. B., Efimova E. V., Wu D., Wolfgeher D. J., Bryan T. M., Cohen S. B., Scheidt K. A., and Kron S. J. (2022). Targeting telomerase reverse transcriptase with the covalent inhibitor NU-1 confers immunogenic radiation sensitization. Cell Chem Biol 29, 1517-1531. e7. 10.1016/j.chembiol.2022.09.002

Low, K. C., and Tergaonkar, V. (2013). Telomerase: central regulator of all of the hallmarks of cancer. Trends in biochemical sciences 38, 426-434.

Maciejowski, J., and de Lange, T. (2017). Telomeres in cancer: tumour suppression and genome instability. Nat Rev Mol Cell Biol 18, 175-186. 10.1038/nrm.2016.171.

Mao, Z., Bozzella, M., Seluanov, A., and Gorbunova, V. (2008). DNA repair by nonhomologous end joining and homologous recombination during cell cycle in human cells. Cell Cycle 7, 2902-2906. 10.4161/cc.7.18.6679.

Mascarenhas, J., Komrokji, R. S., Palandri, F., Martino, B., Niederwieser, D., Reiter, A., Scott, B. L., Baer, M. R., Hoffman, R., Odenike, O., et al. (2021). Randomized, Single-Blind, Multicenter Phase II Study of Two Doses of Imetelstat in Relapsed or Refractory Myelofibrosis. J Clin Oncol 39, 2881-2892. 10.1200/jco.20.02864.

Massard, C., Zermati, Y., Pauleau, A. L., Larochette, N., Metivier, D., Sabatier, L., Kroemer, G., and Soria, J. C. (2006). hTERT: a novel endogenous inhibitor of the mitochondrial cell death pathway. Oncogene 25, 4505-4514. 10.1038/sj.onc.1209487.

Masutomi, K., Possemato, R., Wong, J. M., Currier, J. L., Tothova, Z., Manola, J. B., Ganesan, S., Lansdorp, P. M., Collins, K., and Hahn, W. C. (2005). The telomerase reverse transcriptase regulates chromatin state and DNA damage responses. Proc. Natl. Acad. Sci. U S A 102, 8222-8227.

Mayer, C. T., Ghorbani, P., Nandan, A., Dudek, M., Arnold-Schrauf, C., Hesse, C., Berod, L., Stüve, P., Puttur, F., and Merad, M. (2014). Selective and efficient generation of functional Batf3-dependent CD103+ dendritic cells from mouse bone marrow. Blood, The Journal of the American Society of Hematology 124, 3081-3091.

Mender, I., Gryaznov, S., Dikmen, Z. G., Wright, W. E., and Shay, J. W. (2015). Induction of telomere dysfunction mediated by the telomerase substrate precursor 6-thio-2'-deoxyguanosine. Cancer Discov 5, 82-95. 10.1158/2159-8290. CD-14-0609.

Mender, I., Zhang, A., Ren, Z., Han, C., Deng, Y., Siteni, S., Li, H., Zhu, J., Vemula, A., Shay, J. W., and Fu, Y. X. (2020). Telomere Stress Potentiates STING-Dependent Anti-tumor Immunity. Cancer Cell 38, 400-411. e406. 10.1016/j.ccell.2020.05.020.

Meng, Y., Efimova, E. V., Hamzeh, K. W., Darga, T. E., Mauceri, H. J., Fu, Y. X., Kron, S. J., and Weichselbaum, R. R. (2012). Radiation-inducible immunotherapy for cancer: senescent tumor cells as a cancer vaccine. Mol Ther 20, 1046-1055. 10.1038/mt.2012.19.

Mitchell, M., Gillis, A., Futahashi, M., Fujiwara, H., and Skordalakes, E. (2010). Structural basis for telomerase catalytic subunit TERT binding to RNA template and telomeric DNA. Nat Struct Mol Biol 17, 513-518. 10.1038/nsmb.1777.

Nakai, R., Ishida, H., Asai, A., Ogawa, H., Yamamoto, Y., Kawasaki, H., Akinaga, S., Mizukami, T., and Yamashita, Y. (2006). Telomerase inhibitors identified by a forward chemical genetics approach using a yeast strain with shortened telomere length. Chem Biol 13, 183-190. 10.1016/j.chembiol.2005.11.010.

Oikawa, S., and Kawanishi, S. (1999). Site-specific DNA damage at GGG sequence by oxidative stress may accelerate telomere shortening. FEBS Lett 453, 365-368. 10.1016/s0014-5793 (99) 00748-6.

Olive, P. L., and Banáth, J. P. (2006). The comet assay: a method to measure DNA damage in individual cells. Nat Protoc 1, 23-29. 10.1038/nprot.2006.5.

Pascolo, E., Wenz, C., Lingner, J., Hauel, N., Priepke, H., Kauffmann, I., Garin-Chesa, P., Rettig, W. J., Damm, K., and Schnapp, A. (2002). Mechanism of human telomerase inhibition by BIBR1532, a synthetic, non-nucleosidic drug candidate. J Biol Chem 277, 15566-15572. Doi 10.1074/Jbc.M201266200.

Perera, O. N., Sobinoff, A. P., Teber, E. T., Harman, A., Maritz, M. F., Yang, S. F., Pickett, H. A., Cesare, A. J., Arthur, J. W., Mackenzie, K. L., and Bryan, T. M. (2019). Telomerase promotes formation of a telomere protective complex in cancer cells. Sci Adv 5, eaav4409. 10.1126/sciadv.aav4409.

Pirzio, L. M., Freulet-Marrière, M. A., Bai, Y., Fouladi, B., Murnane, J. P., Sabatier, L., and Desmaze, C. (2004). Human fibroblasts expressing hTERT show remarkable karyotype stability even after exposure to ionizing radiation. Cytogenet Genome Res 104, 87-94. 10.1159/000077470.

Poynter, K. R., Sachs, P. C., Bright, A. T., Breed, M. S., Nguyen, B. N., Elmore, L. W., and Holt, S. E. (2009). Genetic inhibition of telomerase results in sensitization and recovery of breast tumor cells. Mol Cancer Ther 8, 1319-1327. 10.1158/1535-7163. MCT-08-0849.

Quah, B. J., Warren, H. S., and Parish, C. R. (2007). Monitoring lymphocyte proliferation in vitro and in vivo with the intracellular fluorescent dye carboxyfluorescein diacetate succinimidyl ester. Nature protocols 2, 2049-2056.

Rad, A. N., Pollara, G., Sohaib, S. A., Chiang, C., Chain, B. M., and Katz, D. R. (2003). The differential influence of allogeneic tumor cell death via DNA damage on dendritic cell maturation and antigen presentation. Cancer research 63, 5143-5150.

Roake, C. M., and Artandi, S. E. (2020). Regulation of human telomerase in homeostasis and disease. Nat Rev Mol Cell Biol 21, 384-397. 10.1038/s41580-020-0234-z.

Sakaue-Sawano, A., Kurokawa, H., Morimura, T., Hanyu, A., Hama, H., Osawa, H., Kashiwagi, S., Fukami, K., Miyata, T., Miyoshi, H., et al. (2008). Visualizing spatiotemporal dynamics of multicellular cell-cycle progression. Cell 132, 487-498. 10.1016/j.cell.2007.12.033.

Sánchez-Paulete, A., Teijeira, A., Cueto, F. J., Garasa, S., Pérez-Gracia, J. L., Sánchez-Arráez, A., Sancho, D., and Melero, I. (2017). Antigen cross-presentation and T-cell cross-priming in cancer immunology and immunotherapy. Annals of Oncology 28, xii44-xii55.

Sanford, S. L., Welfer, G. A., Freudenthal, B. D., and Opresko, P. L. (2020). Mechanisms of telomerase inhibition by oxidized and therapeutic dNTPs. Nat Commun 11, 5288. 10.1038/s41467-020-19115-y.

Schindelin, J., Arganda-Carreras, I., Frise, E., Kaynig, V., Longair, M., Pietzsch, T., Preibisch, S., Rueden, C., Saalfeld, S., Schmid, B., et al. (2012). Fiji: an open-source platform for biological-image analysis. Nat Methods 9, 676-682. 10.1038/nmeth.2019.

Scully, R., Panday, A., Elango, R., and Willis, N. A. (2019). DNA double-strand break repair-pathway choice in somatic mammalian cells. Nature reviews Molecular cell biology 20, 698-714.

Ségal-Bendirdjian, E., and Geli, V. (2019). Non-canonical Roles of Telomerase: Unraveling the Imbroglio. Front Cell Dev Biol 7, 332. 10.3389/fcell.2019.00332.

Seimiya, H., Oh-hara, T., Suzuki, T., Naasani, I., Shimazaki, T., Tsuchiya, K., and Tsuruo, T. (2002). Telomere shortening and growth inhibition of human cancer cells by novel synthetic telomerase inhibitors MST-312, MST-295, and MST-1991. Mol Cancer Ther 1, 657-665.

Sharma, G. G., Gupta, A., Wang, H., Scherthan, H., Dhar, S., Gandhi, V., Iliakis, G., Shay, J. W., Young, C. S., and Pandita, T. K. (2003). hTERT associates with human telomeres and enhances genomic stability and DNA repair. Oncogene 22, 131-146. 10.1038/sj.onc.1206063.

Shay, J. W. (2016). Role of telomeres and telomerase in aging and cancer. Cancer discovery 6, 584-593.

Shay, J. W., and Wright, W. E. (2019). Telomeres and telomerase: three decades of progress. Nat Rev Genet 20, 299-309. 10.1038/s41576-019-0099-1.

Shin, K. H., Kang, M. K., Dicterow, E., Kameta, A., Baluda, M. A., and Park, N. H. (2004). Introduction of human telomerase reverse transcriptase to normal human fibroblasts enhances DNA repair capacity. Clin Cancer Res 10, 2551-2560. 10.1158/1078-0432. ccr-0669-3.

Singhapol, C., Pal, D., Czapiewski, R., Porika, M., Nelson, G., and Saretzki, G. C. (2013). Mitochondrial telomerase protects cancer cells from nuclear DNA damage and apoptosis. PLOS One 8, e52989. 10.1371/journal.pone.0052989.

Steensma, D. P., Fenaux, P., Van Eygen, K., Raza, A., Santini, V., Germing, U., Font, P., Diez-Campelo, M., Thepot, S., Vellenga, E., et al. (2021). Imetelstat Achieves Meaningful and Durable Transfusion Independence in High Transfusion-Burden Patients With Lower-Risk Myelodysplastic Syndromes in a Phase II Study. J Clin Oncol 39, 48-56. 10.1200/jco.20.01895.

Sutherland, R. L., Hall, R. E., and Taylor, I. W. (1983). Cell proliferation kinetics of MCF-7 human mammary carcinoma cells in culture and effects of tamoxifen on exponentially growing and plateau-phase cells. Cancer Res 43, 3998-4006.

Thompson, C. A. H., and Wong, J. M. Y. (2020). Non-canonical Functions of Telomerase Reverse Transcriptase: Emerging Roles and Biological Relevance. Curr Top Med Chem 20, 498-507. 10.2174/1568026620666200131125110.

Uhlén, M., Fagerberg, L., Hallström, B. M., Lindskog, C., Oksvold, P., Mardinoglu, A., Sivertsson, Å., Kampf, C., Sjöstedt, E., Asplund, A., et al. (2015). Proteomics. Tissue-based map of the human proteome. Science 347, 1260419. 10.1126/science. 1260419.

von Zglinicki, T., Pilger, R., and Sitte, N. (2000). Accumulation of single-strand breaks is the major cause of telomere shortening in human fibroblasts. Free Radic Biol Med 28, 64-74. 10.1016/s0891-5849 (99) 00207-5.

Wang, K., Wang, R. L., Liu, J. J., Zhou, J., Li, X., Hu, W. W., Jiang, W. J., and Hao, N. B. (2018). The prognostic significance of hTERT overexpression in cancers: A systematic review and meta-analysis. Medicine (Baltimore) 97, e11794. 10.1097/md.0000000000011794.

Wang, Y., Sun, C., Mao, A., Zhang, X., Zhou, X., Wang, Z., and Zhang, H. (2015). Radiosensitization to X-ray radiation by telomerase inhibitor MST-312 in human hepatoma HepG2 cells. Life Sci 123, 43-50. 10.1016/j.lfs.2014.12.027.

Wennerberg, E., Lhuillier, C., Vanpouille-Box, C., Pilones, K. A., García-Martínez, E., Rudqvist, N. P., Formenti, S. C., and Demaria, S. (2017). Barriers to Radiation-Induced In Situ Tumor Vaccination. Front Immunol 8, 229. 10.3389/fimmu.2017.00229.

Wheelhouse, R. T., Sun, D., Han, H., Han, F. X., and Hurley, L. H. (1998). Cationic porphyrins as telomerase inhibitors: the interaction of tetra-(N-methyl-4-pyridyl) porphine with quadruplex DNA. Journal of the American Chemical Society 120, 3261-3262.

Wong, K. K., Chang, S., Weiler, S. R., Ganesan, S., Chaudhuri, J., Zhu, C., Artandi, S. E., Rudolph, K. L., Gottlieb, G. J., Chin, L., et al. (2000). Telomere dysfunction impairs DNA repair and enhances sensitivity to ionizing radiation. Nat Genet 26, 85-88. 10.1038/79232.

Yum, S., Li, M. H., Frankel, A. E., and Chen, Z. J. J. (2019). Roles of the cGAS-STING Pathway in Cancer Immunosurveillance and Immunotherapy. Annu Rev Canc Biol 3, 323-344. 10.1146/annurev-cancerbio-030518-055636.

The invention claimed is:

1. A method for inhibiting induction of an immunosuppressive factor in a subject in need thereof, the method comprising co-administering an inhibitor of telomerase reverse transcriptase (TERT) and a genotoxic therapy to the subject, wherein the subject has a disease or disorder associated with TERT activity and the subject is administered a non-therapeutic amount of the inhibitor of TERT to treat the disease or disorder associated with TERT activity.

2. The method of claim 1, wherein the immunosuppressive factor is an immune checkpoint protein, a cytokine, a chemokine, an enzyme, or any combination thereof.

3. The method of claim 2, wherein the immunosuppressive factor is PD-L1.

4. The method of claim 1, wherein the genotoxic therapy is a radiotherapy or a chemotherapy.

5. The method of claim 1, wherein the subject has a cell proliferative disease or disorder, wherein the cell proliferative disease or disorder is a cancer of the (1) adrenal gland, bladder, blood, bone, bone marrow, brain, breast, cervix, gall bladder, ganglia, gastrointestinal tract, heart, kidney, liver, lung, muscle, ovary, pancreas, parathyroid, prostate, skin, testis, thymus, or uterus or (2) the cell proliferative disease or disorder is an adenocarcinoma, a leukemia, a lymphoma, a melanoma, a myeloma, a sarcoma, an embryonal malignancy, or a teratocarcinoma.

6. The method of claim 1, wherein the inhibitor of TERT is a 3-methylideneoxan-4-one compound or a derivative thereof.

7. The method of claim 6, wherein the inhibitor of TERT is:

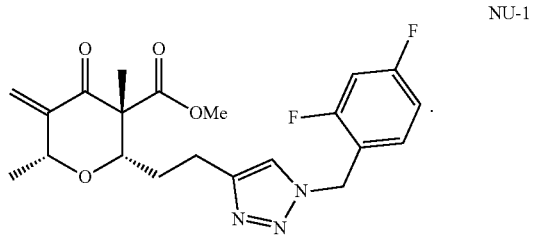 [SMILES: C=C1C(=O)[C@](C)(C(=O)OC)[C@H](CCc2cn(Cc3ccc(F)cc3F)nn2)O[C@@H]1C]

8. The method of claim 1, wherein the inhibitor of TERT is a reversible inhibitor of TERT.

9. The method of claim 1, wherein the subject is co-administered an immunotherapy or a molecularly targeted therapy.

* * * * *